(12) United States Patent
Umeda

(10) Patent No.: US 8,273,273 B2
(45) Date of Patent: Sep. 25, 2012

(54) MANUFACTURING METHOD FOR OPTICAL FILM

(75) Inventor: Hiroki Umeda, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 813 days.

(21) Appl. No.: 12/438,494

(22) PCT Filed: Aug. 16, 2007

(86) PCT No.: PCT/JP2007/065953
§ 371 (c)(1),
(2), (4) Date: Feb. 23, 2009

(87) PCT Pub. No.: WO2008/026454
PCT Pub. Date: Mar. 6, 2008

(65) Prior Publication Data
US 2010/0239789 A1    Sep. 23, 2010

(30) Foreign Application Priority Data
Aug. 31, 2006   (JP) .................................. 2006-235361

(51) Int. Cl.
*B29D 11/00*   (2006.01)

(52) U.S. Cl. ......... 264/1.6; 264/1.34; 264/2.7; 264/216; 264/217

(58) Field of Classification Search ................... 264/1.1, 264/1.6, 2.6, 2.7, 1.7, 1.34, 212, 216, 217
See application file for complete search history.

(56) References Cited

U.S. PATENT DOCUMENTS
2004/0091642 A1 * 5/2004 Murakami et al. ........... 428/1.31
2005/0128421 A1 * 6/2005 Oguchi et al. ................ 349/155

FOREIGN PATENT DOCUMENTS
| | | |
|---|---|---|
| JP | 2006028251 | 2/2006 |
| JP | 2006072340 | 3/2006 |
| JP | 2006212917 | 8/2006 |
| WO | WO 2009/011226 | * 1/2009 |

* cited by examiner

*Primary Examiner* — Mathieu D. Vargot
(74) *Attorney, Agent, or Firm* — Lucas & Mercanti, LLP

(57) ABSTRACT

A manufacturing method for an optical film via a solution casting method on a transparent substrate film comprising the steps of: (i) ejecting a micro-particle dispersion containing micro-particles having a average particle diameter of at least 25-200 nm as liquid droplets by use of an ink-jet head when a residual solvent content in a web is 5-400 weight %, and (ii) depositing the liquid droplets to adhere onto one side surface of a web and to form a micro convex structure, and further to form 1-10,000 points of convex parts per 10,000 $\mu m^2$ having a height of the convex parts of the convex structure of 0.01-0.5 $\mu m$.

10 Claims, 9 Drawing Sheets

FIG. 3 (a)
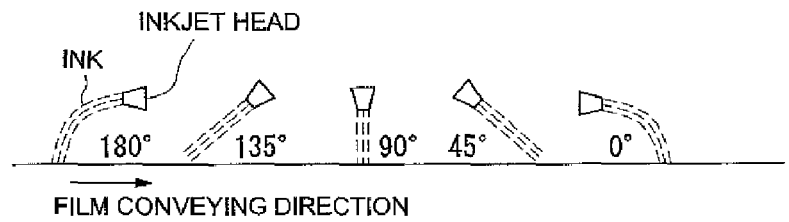
FIG. 3 (b)
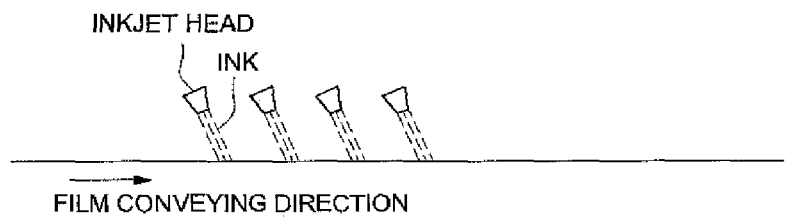
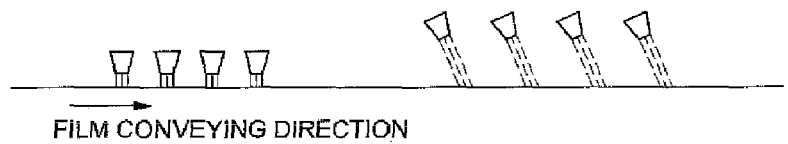
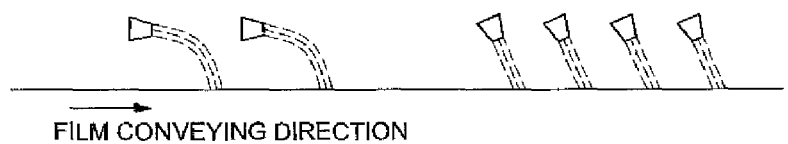
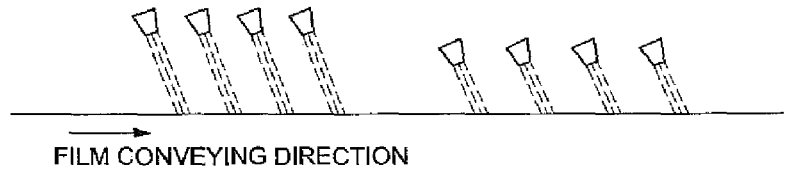
FIG. 3 (c)
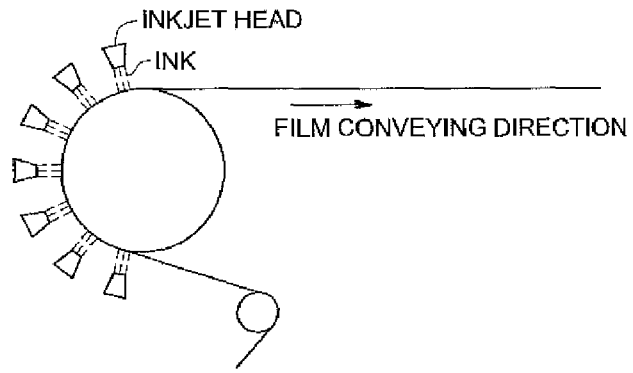

FIG. 6 (a) LINE-HEAD TYPE
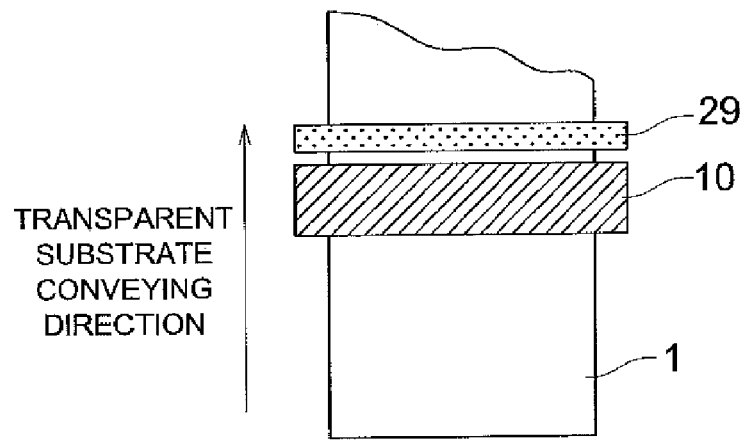
FIG. 6 (b) FLAT-HEAD TYPE
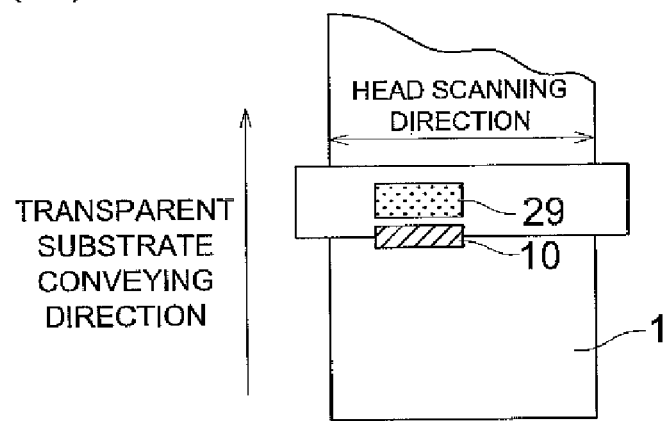
FIG. 6 (c) CAPSTAN TYPE
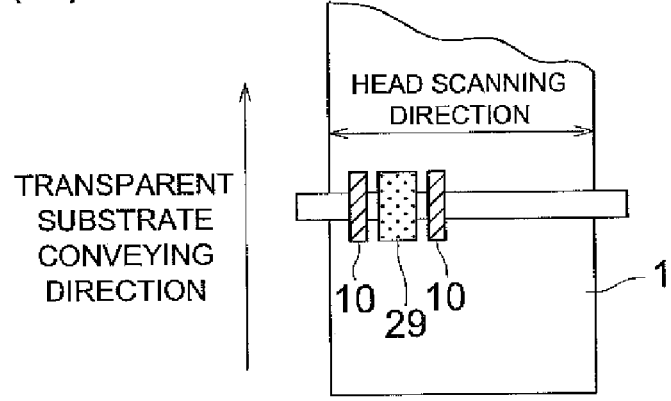

MANUFACTURING METHOD FOR OPTICAL FILM

This is a U.S. National Phase Application under 35U.S.C. 371 of International Application PCT/JP2007/065953 filed on Aug. 16, 2007, which claims the priority of Japanese Application No. 2006-235361, filed Aug. 31, 2006, the entire content of both Applications are hereby incorporated by reference.

FIELD OF THE INVENTION

The present invention relates to an optical film, a polarizing plate and a display device, and particularly relates to an optical film, which is provided with excellent sliding property and improved front contrast even as a film substrate having increased width or decreased thickness, and a manufacturing method thereof; and a polarizing plate and a display device utilizing the same.

BACKGROUND OF THE INVENTION

There are various films Such as cellulose ester type film represented by triacetyl cellulose, cycloolefin type film and polycarbonate type film, as materials utilized for a liquid crystal display device, however, in recent years, further decreased thickness, increased width and increased length are required with these films to achieve a thinner and lighter-weighted liquid crystal display device in addition to improved productivity and cost down of a polarizing plate.

However, there may cause various defects at the time of winding film when these films are made to have decreased thickness and increased length as they are. Therefore, there is a counter measure to add one sheet of film or to increase the amount of a matting agent to improve sliding property. However, sliding property may be improved when the amount of a matting agent is increased while a problem such as decreased front contrast of a display device due to scattering of light incident into film may be caused to deteriorate the quality.

Further, addition of one sheet of film for sliding property improvement is an effective means to improve such as sliding property and a roll-set, while there is a problem of cost up of a raw material and increased size of a wound roll, or an environmental problem at the time of disposal of film provided with sliding property (for example, refer to patent documents 1-3).

Patent Document 1: Unexamined Japanese Patent Application Publication No. (hereinafter, referred to as JP-A No.) 2001-183528
Patent Document 2: JP-A 2001-64422
Patent Document 3: JP-A 2001-83327

DISCLOSURE OF THE INVENTION

Problems to be Solved by the Present Invention

An object of this invention is to provide an optical film, which exhibits improved sliding property with a decreased amount of a matting agent in an optical and improved front contrast in addition to adaptability to an increased width, decreased thickness and increased length; a manufacturing method thereof; and a polarizing plate and a display device utilizing the same.

Means to Solve the Problems

The above-described object according to this invention can be achieved by the following means.

Item 1. A manufacturing method for an optical film via a solution casting method on a transparent substrate film comprising the steps of:
(i) ejecting a micro-particle dispersion containing micro-particles having a average particle diameter of at least 25-200 nm as liquid droplets by use of an ink-jet head when a residual solvent content in a web is 5-400 weight %, and
(ii) depositing the liquid droplets to adhere onto one side surface of a web and to form a micro convex structure, and further to form 1-10,000 points of convex parts per 10,000 $\mu m^2$ having a height of the convex parts of the convex structure of 0.01-0.5 $\mu m$.

Item 2. The manufacturing method of the optical film described in aforesaid Item 1, wherein an atmospheric solvent concentration around the web at the time of a micro convex structure being formed on the one side surface of the aforesaid web is 50-10,000 ppm.

Item 3. The manufacturing method of the optical film described in aforesaid Item 1 or 2, wherein the aforesaid micro-particle dispersion adheres by use of an ink-jet head onto one side surface of the aforesaid web in a state of the other surface being attached to a back roll having a diameter of 50-1,000 mm.

Item 4. The manufacturing method of the optical film described in any one of aforesaid Items 1-3, wherein the web surface is brought in contact with a conveying roll within 0.1-240 seconds after micro-particle dispersion has adhered onto the aforesaid web.

Item 5. The manufacturing method of the optical film described in any one of aforesaid Items 1-4, wherein the web is subjected to a stretching treatment of 1.05-2.5 times in the direction perpendicular to the conveying direction of the web within 1-300 seconds after micro-particle dispersion has adhered onto the aforesaid web.

Item 6. The manufacturing method of the optical film described in any one of aforesaid Items 1-5, wherein the web is subjected to a stretching treatment of 1.05-2.5 times in the direction perpendicular to the conveying direction of the web within 0.5-240 seconds after the web surface on which micro-particle dispersion has adhered has been firstly brought in contact with the conveying roll.

Item 7. The manufacturing method of the optical film described in aforesaid Item 5 or 6, wherein a residual solvent content at the time of the aforesaid stretching is 0.5-100 weight % and a residual solvent content difference between before and after the stretching treatment is 0.4-99 weight %.

Item 8. The manufacturing method of the optical film described in any one of aforesaid items 1-7, wherein a width of the aforesaid transparent substrate film is 1.4-5 m.

Item 9. The manufacturing method of the optical film described in any one of aforesaid Items 1-8, wherein a roll length of the aforesaid transparent substrate film is 2,000-10,000 m and a film thickness is 5-55 $\mu m$.

Item 10. The manufacturing method of the optical film described in any one of aforesaid Items 1-9, wherein the aforesaid transparent substrate film contains at least one type of a polymer compound selected from cellulose ester, cycloolefin type polymer, polycarbonate and polylactic acid.

Item 11. An optical film manufactured by the manufacturing method described in any one of Items 1-9, wherein an optical anisotropic layer is provided onto at least one surface of a transparent substrate film.

Item 12. The optical film described in Item 11, wherein the aforesaid optical anisotropic layer is an actinic ray curable layer.

Item 13. The optical film described in Item 11 or 12, wherein Ro and Rt at a wavelength of 589 nm are 1 to 400 nm and −400 to 400 nm, respectively.

Item 14. The optical film described in any one of Items 11 to 13, wherein a layer selected from a hardcoat layer, an antiglare layer, an antireflection layer and an antistatic layer is provided on at least one surface of the foresaid optical film.

Item 15. A polarizing plate comprising the optical film described in any one of Items 11-13.

Item 16. A display device comprising the optical film described in any one of Items 11-14.

Item 17. A liquid crystal display device comprising the polarizing plate described in aforesaid Item 15.

Effects of the Invention

It is possible to provide an optical film, in which sliding property is improved with a decreased amount of a matting agent in an optical film to provide improved front contrast in addition to adaptability to increased width, decreased thickness and increased length and a manufacturing method thereof, as well as to provide a polarizing plate and a display device utilizing the same.

Further, cost down is also possible by a means of this invention.

BRIEF DESCRIPTION OF THE DRAWINGS

FIGS. 3a-3c are outline drawings to show an ejection angle and an ejection method of micro-particle dispersion (ink)

FIGS. 6a-6c are schematic drawings to show an example of an ink-jet method preferably utilized in this invention

DESCRIPTION OF SYMBOLS

Figure 1:
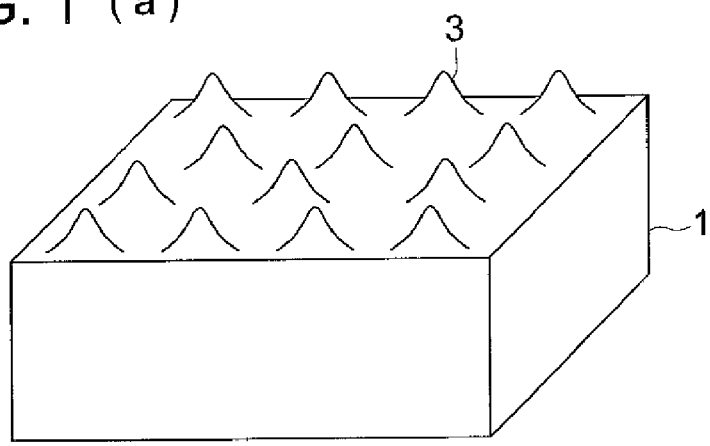
FIGS. 1a-1c are schematic drawings to show an example of transparent film on which a micro convex structure having an anti-blocking function is provided by an ink-jet method
Figure 1:
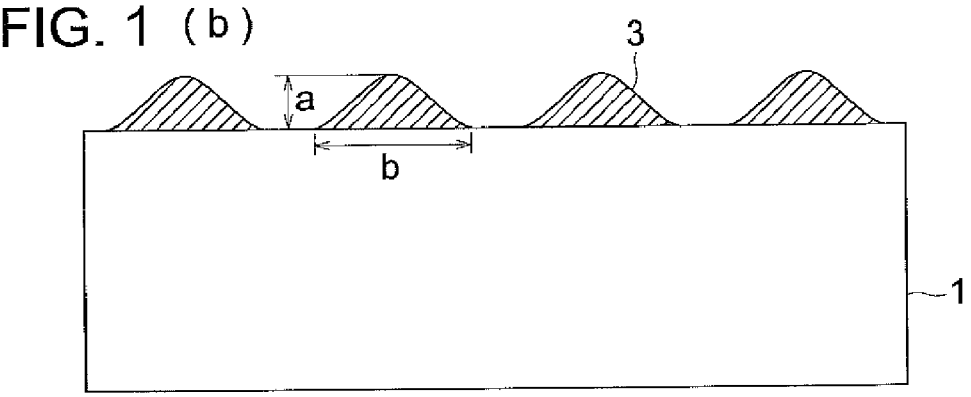
Figure 1:
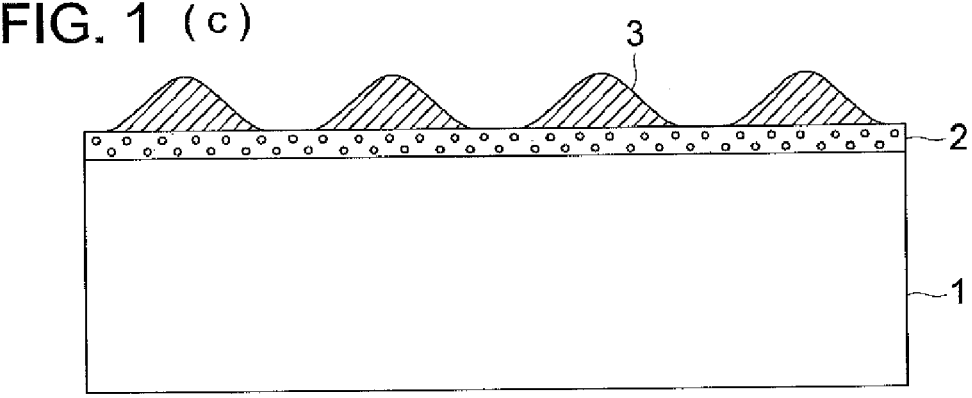

| 1, 14, 502: | transparent substrate |
| 2: | functional layer |
| 3: | micro-particle dispersion (ink) droplet |
| 4: | micro-particle |
| 10: | ink-jet head |
| 11: | support |
| 12: | cast die |
| 21: | melt die |
| 22: | casting roll |
| 501: | film roll |
| 503: | first coater |
| 504A, B: | back-roll |
| 505A, B: | drying zone |
| 506: | ultraviolet irradiation portion |
| 508: | ink supply tank |
| 509: | ink-jet ejection portion |

DESCRIPTION OF THE PREFERRED EMBODIMENT

A manufacturing method of an optical film of this invention is a film forming method of a transparent substrate film by a solution casting method which is characterized in that micro-particle dispersion containing at least micro-particles, which form a matting agent, having a average particle diameter of secondary particles of 25-200 nm comprising micro-particles (primary particles) is ejected as droplets by use of an ink-jet head to make land and adhere on one surface of a web to form a micro convex structure when a residual solvent content in a web is 5-400 weight %, and 1-10,000 points per 10,000 $\mu m^2$ of convex portions having a height of a convex portion of 0.01-0.5 $\mu m$ are formed. In the description of this invention, to make land and adhere comes under the category of coating.

Herein, an optical film of this invention, and a polarizing plate and a display device utilizing the same have been realized by the aforesaid invention of a manufacturing method.

In the following, this invention and the constitution elements will be detailed.

(Micro-Particle Dispersion)

Micro-particle dispersion according to this invention is required to contain a composition which forms micro convex structure by an ink-jet method; however, components of said composition preferably contain thermoplastic resin, actinic ray curable resin or thermosetting resin in addition to micro-particles as a necessary component.

(Micro-Particles)

Micro-particle dispersion according to this invention is characterized by containing micro-particles having a average particle diameter of 25-200 nm. Said average particle diameter is preferably 50-150 nm. Further, it is more preferably 80-120 nm.

Herein, a average particle diameter of micro-particles determined by observing particles through an electron microscope to measure the particle size of arbitrary 1,000 particles and calculating a simple mean value thereof. Herein, a particle size of each particle is a diameter of an equivalent supposed circle having the same projected area.

In this invention, micro-particles which can be contained in micro-particle dispersion include, for example, inorganic micro-particles or organic micro-particles.

Inorganic micro-particles preferably include such as a compound containing silicon, silicon dioxide, aluminum oxide, zirconium oxide, calcium carbonate, talc, clay, calcined kaolin, calcined calcium silicate, calcium silicate hydrate, aluminum silicate, magnesium silicate and calcium phosphate; more preferably inorganic compounds containing silicon and zirconium oxide; and specifically preferably silicone dioxide is utilized. These may include particles having a form of such as spherical, tabular and amorphous.

As micro-particles of silicon dioxide, products available on the market such as Aerosil R972, R972V, R972CF, R974, R812, 50, 200, 200V, 300, R202, OX50, TT600 and MOX170 (manufactured by Nippon Aerosil Co., Ltd.) can be utilized.

As micro-particles of zirconium oxide, products available on the market such as Aerosil R976 and R811 (manufactured by Nippon Aerosil Co., Ltd.) can be utilized.

Further, organic micro-particles include such as polymethacrylic acid methyl acrylate resin micro-particles, acryl styrene type resin micro-particles, polymethylmethacrylate resin micro-particles, silicone type resin micro-particles, polystyrene type resin micro-particles, polycarbonate resin micro-particles, benzoguanamine type resin micro-particles, melamine type resin micro-particles, polyolefin type resin micro-particles, polyester type resin micro-particles, polyamide type resin micro-particles, polyimide type resin micro-particles, polyfluoroethylene type resin micro-particles and cellulose ester type resin. For example, MS-300K and MS-300X (particle size of 0.1 μm) as polymethylmethacrylate cross-linked particles, and MP1451 as acryl monodispersed particles (all are manufactured by Soken Chemical & Engineering Co., Ltd.) are preferably utilized.

A refractive index difference between resin and micro-particles which are contained in micro-particle dispersion is preferably within ±0.02, and a refractive index difference between resin contained in micro-particle dispersion and substrate film is also preferably within ±0.02.

As for a ratio of resin and micro-particles contained in micro-particle dispersion, micro-particles preferably occupy 1-99% of the total solid and more preferably 5-95%.

Micro-particle dispersion is preferably utilized by being further diluted. The concentration can be appropriately adjusted depending on the liquid quantity, viscosity of a coating solution and required density in coating through an ink-jet head, however, the coating density of one spot per 50-500 μm square, or 1-20 points of secondary particles in the aforesaid region when a secondary particle size of micro-particles is in a range of this invention, can secure sliding property and maintain high front contrast of a final display device. As a diluted solution, micro-particle dispersion may be diluted by approximately 1,000-1,000,000 times.

(Resin Component)

Micro-particle dispersion according to this invention may contain thermoplastic resin, actinic ray curable resin or thermosetting resin as a component other than micro-particles.

First, thermoplastic resin utilized in this invention will be explained.

Thermoplastic resin according to this invention is not specifically limited, and includes such as cellulose ester, polycarbonate, acrylic resin, cycloolefin polymer, polyester and polyvinyl alcohol as a preferable example, however, is not limited thereto.

Thermoplastic resin utilizable in micro-particle dispersion of this invention specifically preferably contains cellulose ester as a primary component, and cellulose ester utilized in transparent substrate film, which will be described later, is preferably utilized. That is, cellulose esters such as cellulose acetate, cellulose diacetate, cellulose acetate butyrate, cellulose acetate propionate, cellulose acetate phthalate, cellulose triacetate and cellulose nitrate are preferable, and cellulose acetate, cellulose diacetate and cellulose acetate propionate are specifically preferable. Cellulose ester having a total acyl group substitution degree of 2.0-3.0 is preferably utilized. Cellulose ester having a substitution degree same as or lower than said cellulose ester is preferably utilized when cellulose ester is utilized as transparent substrate film. Said cellulose ester is specifically preferably utilized when the surface provided with a convex portion is subjected to an alkaline saponification treatment to be pasted up with a polarizer. Cellulose ester can be utilized as a micro-particle dispersion composition by having been dissolved in an organic solvent described later.

Next, actinic ray curable resin utilizable in this invention will be explained.

Actinic ray curable resin includes such as ultraviolet ray curable resin and electron ray curable resin as typical ones, however, also may be resin curable by actinic ray irradiation other than ultraviolet rays or electron rays.

Ultraviolet ray curable resin includes such as ultraviolet ray curable acrylurethane type resin, ultraviolet ray curable polyester acrylate type resin, ultraviolet ray curable epoxy acrylate type resin, ultraviolet ray curable polyol acrylate type resin or ultraviolet ray curable epoxy resin.

Specific examples include such as trimethylolpropane triacrylate, dimethylolpropane tetraacrylate, pentaerythritol triacrylate, pentaerythritol tetraacrylate, dipentaerythritol hexaacrylate and alkyl modified dipentaerythritol pentaacrylate.

Ultraviolet ray curable resin generally includes those easily formed by making a product, which has been obtained by making polyester polyol react with isocyanate monomer or prepolymer, react with a monomer of an acrylate type having a hydroxyl group such as 2-hydroxyethyl acrylate, 2-hydroxyethyl methacrylate (hereinafter, only acrylate is described as acrylate includes methacrylate) and 2-hydroxyporpyl acrylate; and those described in JP-A 59-151110 can be utilized.

Ultraviolet ray curable polyester acrylate type resin includes those easily formed by making polyol polyester react with a monomer of a 2-hydroxyethyl acrylate or 2-hydroxyacrylate type monomer, and those described in JP-A 59-151112 can be utilized.

Specific examples of ultraviolet ray curable epoxy acrylate type resin include those prepared from epoxy acrylate as oligomer which is added and made to react with a reactive diluent and a photo-initiator, and those described in JP-A 1-105738 can be utilized.

These photoreaction initiators include, specifically, benzoin and derivatives thereof; and acetophenone, benzophenone, hydroxybenzophenone, Michler's ketone, α-amyloxime ester, and thioxanthone and derivatives thereof. These may be utilized in combination with a photo-sensitizer.

Resin monomer includes ordinary monomer such as methylacrylate, ethylacrylate, butylacrylate, benzylacrylate, cyclohexylacrylate, vinyl acetate and styrene, as monomer having one unsaturated double bond.

As a product available on the market of ultraviolet ray curable resin utilizable in this invention, employed by appropriate selection can be such as Adekaoptomer KR•BY series: KR-400, KR-410, KR-550, KR-566, KR-567 and BY-320B (manufactured by Asahi Denka Co., Ltd.); Koeihard A-101-KK, A-101-WS, C-302, C401-N, C-501, M-101, M-102, T-102, D-102, NS-101, FT-102Q8, MAG-1-P20, AG-106 and M-101-C (manufactured by Koei Chemicals Co., Ltd.); Seikabeam PHC2210, PHC X-9 (K-3), PHC2213, DP-10, DP-20, DP30, P1999, P1100, P1200, P1300, P1400, P1500, P1600 and SCR900 (manufactured by Dainichi Seika Kogyo Co., Ltd.); KRM7033, KRM7039, KRM7130, KRM7131, UVECRYL29201 and UVECRYL29202 (manufactured by Daicel•U.C.B. Co., Ltd.); RC-5015, RC-5016, RC-5020, RC-5031, RC-5100, RC-5102, RC-5120, RC-5122, RC-5152, RC-5171, RC-5180 and RC-5181 (manufactured Dainippon Ink & Chemicals, Inc.); Olex No.340 Clear (manufactured by Chugoku Marin Paints, Ltd.); Sunrad H-601, RC-700 and RC-750 (manufactured by Sanyo Chemicals Co., Ltd.); SP-1509 and SP-1507 (manufactured by Syowa Polymer Co., Ltd.); RCC-15C (manufactured by Grace Japan Co., Ltd.); Aronix M-6100, M-8030 and M8060 (Toagosei Co., Ltd.)

These actinic ray curable resins, can be cured by a method well known in the art; however, in the case of this invention, actinic ray irradiation treatment is preferably performed before a web is brought in contact with the first roll after coating.

As a light source to cure ultraviolet ray curable resin by a photo-curing reaction, any light source provided generating ultraviolet rays can be utilized without limitation. For example, such as a low pressure mercury lamp, a medium pressure mercury lamp, a high pressure mercury lamp, an ultrahigh pressure mercury lamp, a carbon arc lamp, a metal halide lamp and a xenon lamp can be utilized. The irradiation condition may differ depending on each lamp; however, irradiation quantity of actinic rays may be approximately 20-10,000 mJ/cm$^2$ and preferably 50-2,000 mJ/cm$^2$.

As an organic solvent utilized for micro-particle dispersion containing ultraviolet ray curable resin, for example, utilized can be hydrocarbons, alcohols, ketones, esters, glycol ethers and other organic solvents, by suitable selection or by mixing them. For example, the above-described organic solvent containing propyleneglycol monoalkylether (a carbon number of an alkyl group of 1-4) or propyleneglycol monoalkylether acetic acid ester (a carbon number of an alkyl group of 1-4) at preferably not less than 5 weight % and more preferably 5-80 weight % is preferably utilized.

In addition to this, micro-particle dispersion can be added with approximately 0.01-5.0% of a surfactant such as a fluorine type surfactant, a silicone type surfactant or a nonionic surfactant.

Next thermosetting resin utilizable in this invention will be explained.

Thermosetting resin utilizable in this invention includes such as unsaturated polyester resin, epoxy resin, vinyl ester resin, phenol resin, thermosetting polyimide resin and thermosetting polyamideimide resin.

As unsaturated polyester resin, for example, listed are orthophthalic acid type resin, isophthalic acid type resin, terephthalic acid type resin, bisphenol type resin and propylene glycol-maleic acid type resin; low styrene volatile resin comprising unsaturated polyester, the molecular weight is lowered by introduction of cyclobutadiene or a derivative thereof or which is added with a film forming wax compound; low shrinking resin added with thermoplastic resin (such as polyvinyl acetate, styrene butadiene copolymer, polystyrene and saturated polyester); reactive type resin in which unsaturated polyester is directly brominated by Br$_2$ or is copolymerized with Het acid or dibromneopentyl glycol; non-flammable resin of an addition type which utilizes a combination of halogenide such as chlorinated paraffin, tetrabrombisphenol with antimony trioxide or phosphor compound, or aluminum hydroxide as an additive; and strengthened resin having strong property (high strength, high module of elasticity, high elongation percentage) which is made to be hybridized or to be a PN type with polyurethane or silicone.

Epoxy resin includes such as glycidyl ether type epoxy resin including a bisphenol A type, a novolak phenol type, a bisphenol F type and brominated bisphenol A type: and specific epoxy resin including a glycidyl amine type, a glycidyl ester type, a alicyclic type and a heterocyclic epoxy type.

Vinyl ester resin is, for example, one comprising oligomer prepared by an open ring addition reaction of ordinary epoxy resin with unsaturated monobasic acid is dissolved in monomer such as styrene. Further, listed is a specific type which is provided with a vinyl group on the molecular end or side chain and contains vinyl monomer. Glycidyl ether type epoxy resin includes such as a bisphenol type, a novolak type and a brominated bisphenol type; and specific vinyl ester resin includes such as a vinyl urethane type, a vinyl isocyanurate type and a side chain vinyl ester type.

Phenol resin can be prepared by polycondensation of phenols and formaldehyde as starting materials, and includes aresol type and a novolak type.

Thermosetting polyimide resin includes maleic acid type polyimide such as polymaleimide amine, polyamino bismaleimide, bismaleimide.O,O'-diallyl bisphenol-A resin and bismaleimide.triazine resin; nadic acid modified polyimide and acetylene terminal polyimide.

Further, a part of actinic ray curable resin described above can be utilized as thermosetting resin.

Herein, in micro-particle dispersion containing thermosetting resin according to this invention, an antioxidant and an ultraviolet absorbent may be appropriately utilized.

In this invention, in the case of convex portion formed by means of an ink-jet method containing thermosetting resin, it is preferable to perform a heating treatment immediately after liquid droplets of micro-particle dispersion have landed on a transparent substrate as a heating method.

Immediately after liquid droplets of micro-particle dispersion having landed on a transparent substrate, which is referred to in this invention, specifically means that heating is preferably started at the same time as or within 5 seconds after liquid droplets have landed, and the temperature of a transparent substrate can be raised in advance. For example, transparent substrate is wound on a heat roll and liquid droplets of micro-particle dispersion can be made to land thereon; and it is more preferable that the heating is started at the same time as or within 2.0 seconds after landing. Further, it should be noted not to cause nozzle clogging due to curing at the nozzle portion when distance between a nozzle portion and a heating portion becomes excessively cross to make heat reach a head portion. Further, it is also possible to prepare a smooth convex structure due to fluidization and deformation of liquid droplets of micro-particle dispersion having landed by appropriately making a heating interval to exceed 5.0 seconds.

To prevent the above-described heat conduction to a nozzle portion at the time of heating, in an ink-jet method of this invention, a heating portion is preferably arranged at a position not to be made directly contact with a nozzle portion of an ink-jet head.

As a heating method, it is preferable to utilize a method employing such as a heat plate, a heat roll, a thermal head, or blowing of a hot wind onto the surface of micro-particle dispersion having landed. Further, heating may be also continuously provided by utilizing a back roll, which is arranged on the opposite side against an ink-jet ejection portion sandwiching a transparent support, as a heating roll. The heating temperature depends on types of thermosetting resin utilized and cannot be indiscriminately determined, however, is preferably within a temperature range not to affect a transparent substrate to cause such as heat deformation, that is, 30-200° C., more preferably 50-120° C. and specifically preferably 70-100° C.

In micro-particle dispersion according to this invention, any of the above-described thermoplastic resin, actinic ray curable resin and thermosetting resin can be utilized; however, it is preferable to utilize thermoplastic resin.

In the above-described micro-particle dispersion according to this invention, 0-99.9 weight % of a solvent can be appropriately incorporated. For example, the above-described thermoplastic resin component, actinic ray curable resin monomer component or thermosetting resin monomer component may be dissolved or dispersed in a water-based solvent, or an organic solvent may be also utilized. An organic solvent can be utilized by appropriately selecting from those having either a low boiling point or a high boiling point, and it is preferable to suitably adjust the addition amount, type and composition of these solvents to adjust the viscosity of micro-particle dispersion. Further, at the time of ink-jet coating, it is preferable to utilize micro-particle dispersion by being further diluted.

A solvent utilizable in micro-particle dispersion according to this invention includes alcohols such as methanol, ethanol, 1-propanol, 2-propanol and butanol; ketones such as acetone, methyl ethyl ketone, methyl isobutyl ketone and cyclohexanone; ketone alcohols such as diacetone alcohol; aromatic hydrocarbons such as benzene, toluene and xylene; glycols such as ethylene glycol, propylene glycol and hexylene glycol; glycol ethers such as ethyl cellosolve, butyl cellosolve, ethyl carbitol, butyl carbitol, diethyl cellosolve, diethyl carbitol, propylene glycol monomethyl ether; esters such as N-methyl pyrrolidone, dimethyl formamide, methyl lactate, ethyl lactate, methyl acetate, ethyl acetate and amyl acetate; ethers such as dimethyl ether and diethyl ether; and water; and they can be utilized alone or in combination of at least two types. Further, one having an ether bond in a molecule is specifically preferable, and glycol ether is also preferably utilized.

Glycol ethers specifically include the following solvents, however, are not limited thereto. Listed are such as propylene glycol monomethyl ether, propylene glycol monoethyl ether, propylene glycol monobutyl ether, propylene glycol dimethyl ether, ethylene glycol monomethyl ether, ethylene glycol monoethyl ether Ac, ethylene glycol monobutyl ether, ethylene glycol monoethyl ether, ethylene glycol monoethyl ether Ac and ethylene glycol diethyl ether, wherein Ac represents acetate. In micro-particle dispersion according to this invention, a solvent having a boiling point of lower than 100° C. is preferably utilized among them. These solvents are preferably evaporated immediately after ejection through an ink-jet head and rapidly evaporated and dried also after landing so as to maintain a desired convex form. In addition, it is possible to control a convex form by mixing solvents having different volatility and changing the ratio thereof.

As a solvent utilized in micro-particle dispersion is preferably comprised of a solvent to dissolve substrate film and a solvent not to dissolve substrate film being mixed, and the mixing ratio is preferably 1/9-9/1 and is appropriately adjusted.

(Formation of Micro Convex Structure)

A micro convex structure according to this invention is characterized by being formed by ejection of micro-particle dispersion, containing micro-particles having a average particle diameter of 25-200 nm, as liquid droplets, which are made to land and adhere on one surface of a web, by use of an ink-jet head, when residual solvent content in the web is 5-400 weight %, in a manufacturing method of transparent substrate film by means of solution casting method.

Herein, a micro convex structure described above may be formed as a layer or a state of micro convex portions comprising liquid droplets of micro-particle dispersion being dotted on a substrate without having a layer structure.

The residual solvent content in the aforesaid web according to this invention is preferably 20-300 weight % and more preferably 50-150 weight %. The atmospheric solvent content concentration around said web, at the time of forming a micro convex structure on one surface of a web is necessarily 50-10,000 ppm. Familiarity of micro-particle dispersion against a web may be poor when a solvent concentration of the atmosphere is too low, and the concentration is preferably approximately 500-8,000 ppm and more preferably approximately 1,000-7,000 ppm.

The measurement of the atmospheric solvent concentration can be performed by gathering 1,000 cm$^3$ of the atmospheric air at a position remote by 30 cm from a coating head along the conveying direction of a transparent substrate (a web), in an enclosure at the time of ordinary solution casting and by means of a gas chromatographic method.

Adhesion (coating) of micro-particle containing solution in this invention is preferably performed on one surface of transparent substrate film (a web) in a state of the other surface being attached to a back roll, and the diameter of said back roll is preferably 50-1,000 mm and more preferably 95-950 mm. When the diameter becomes small, there will caused problems of bending of a web being large or a portion, where a distance between adhering (coating) surface and an ink-jet head is stable, being narrow to cause inclined adhesion (coating) or wrinkle generation. When the diameter of a back roll is excessively large, securing of stability becomes difficult due to complicated control of back roll temperature in addition to a problem of installation space.

Since the adhered portion contacts with a roll before it become familiar with a web when the time from adhesion (coating) to adhered (coated) surface being brought in contact with a conveying roll is too short, the adhered portion may be peeled off. Further, the adhered portion may be peeled off due to excessive progress of drying when the time is excessively long. Therefore, it is necessary to bring said web surface in contact with a conveying roll within 0.1-240 seconds after adhesion (coating) of micro-particle dispersion on a web. This time is preferably in a range of 0.1-150 seconds and more preferably of 0.1-65 seconds.

It is preferable that said web is subjected to a stretching treatment by 1.05-2.5 times in the direction perpendicular to the conveying direction within 1-300 seconds, preferably within 5-200 seconds and more preferably within 5-180 seconds, after adhering (coating) micro-particle dispersion on a web, in view of solving problems according to this invention. Further, within 0.5-240 seconds after the web surface adhered with micro-particle dispersion is first brought in contact with a conveying roll, said web is preferably subjected to a stretching treatment by 1.05-2.5 times in the direction perpendicular to the conveying direction. Herein, it is preferable that a residual solvent content at the aforesaid stretching treatment is 0.5-100 weight % and a residual solvent content difference between before and after the stretching treatment is preferably 0.4-99 weight %.

As liquid droplets of the aforesaid micro-particle dispersion by means of an ink-jet method, one type of micro-particle dispersion may be utilized, however, droplets of at least two types of micro-particle dispersions having different compositions or liquid droplets of at least two types of micro-particle dispersions having different particle sizes may be utilized. Further, it is preferable to incorporate micro-particles in liquid droplets of micro-particle dispersion, and to control solvent content in micro-particle dispersion, surface energy of micro-particle dispersion and surface energy of the surface to be adhered with micro-particle dispersion; the effects of this invention can be shown more effectively thereby.

Further, an optical film of this invention may adopt either a constitution in which said micro convex structure defined above is directly formed on transparent substrate film, or a structure in which said micro convex structure of this invention is provided on transparent substrate film having been provided with at least one functional layer in advance.

A micro convex structure according to this invention can be controlled by such as increasing the number of convex portion, increasing the height with the same number, or increasing the inclination of a convex portion to improve sliding property. Further, according to this invention, the number of convex portions in the width direction can be also easily varied. For example, it is possible to increase convex portion number in the edge portion and decrease it in the film center, or vice versa. Further, it is possible to change a convex portion number along the long length direction of film. For example, it is possible to increase the number or to increase the height of convex portions at the central portion of a role, where depressed deformation and blocking defects are liable to be generated, and to vary the number or the height of convex portions as it goes to the outer side of a role. Particularly, in the case of the film width of as wide as 1.4-4 m, remarkable improvement has come to be possible by this invention although conventional methods were not possible to sufficiently meet the situation. This invention is also superior with respect that suitable sliding property can be easily provided after film has been subjected to various processes. Further, it is easy to vary the number of convex portions depending on types of film products, resulting in remarkable improvement of productivity. An ink-jet method is extraordinary superior with respect to these easy controls.

It is necessary that convex portion formed in this invention has a height "a (refer to FIG. 1)" of 0.01-0.5 μm and the number of convex portions is 10-10,000 points/10,000 μm². Anti-blocking property may be insufficient in the case the number of not more than one point, while blocking property is all right but decreased productivity and deteriorated haze may be caused in the case of the number of not less 10,000 points. The number is preferably 10-10,000 points/10,000 μm².

Further, it is preferable to provide 10-10,000 points/10,000 μm² of convex potions having height "a" of 0.02-0.3 μm, and more preferably 10-1,000 points/10,000 μm² of convex potions having height "a" of 0.02-0.2 μm.

Further diameter "b (refer to FIG. 1)" of a convex portion is preferably 0.01-1 μm, and more preferably 0.01-0.3 μm. The relation ship between height "a" and diameter "b" is preferably 1-100, more preferably 1.5-30 and specifically preferably 2-10, as b/a. The convex portion formed may be peeled off to generate a foreign matter defect in the case of b/a being less than 1, while anti-blocking property may be insufficient or substrate film may be liable to be deformed in the case of b/a being over 100.

FIG. 1 is a schematic drawing to show an example in which a micro convex structure having an anti-blocking function is provided on transparent substrate film by an ink-jet method.

FIG. 1(a) is an oblique view and FIG. 1(b) is a cross-sectional view, of a micro convex structure.

In FIG. 1(b), an example of a micro convex structure comprising liquid droplets 3 of micro particle dispersion formed by an ink-jet method is shown, wherein height "a" of a convex portion defined in this invention is a height (μm) from the transparent substrate film surface, which is a base surface as a bottom portion, to the top of a convex structure, and diameter "b" is defined as the maximum length of the bottom of a convex portion which is in contact with a substrate.

A micro convex portion on the surface can be measured by a surface roughness meter with a stylus available on the market or a surface roughness meter by optical interference available on the market. For example, a surface roughness meter by optical interference measures two-dimensionally with respect to a region of approximately 10,000 μm² (100 μm×100 μm) and a convex portion is displayed by being classified by color similar to a contour line from the bottom side.

Herein, the number of convex portions was expressed by the number per an area of 10,000 μm² by counting the number of convex portions having height "a" of 0.01-0.5 μm based on the film surface as a standard. The measurement is performed to determine a mean value thereof when arbitrary 10 points of said portions in an optical film are measured, In this invention, shown is an example of a convex portion formed by a liquid droplet of micro-particle dispersion which has landed as a Konide type convex portion in FIG. 1(b) as a convex structure for an anti-blocking processing; however, this invention is not limited to a convex structure of the above-described form.

FIG. 1(c) is a schematic drawing of a micro convex structure by an ink-jet method which has been provided on a functional layer having been prepared in advance. A functional layer is not specifically limited and includes such as a back-coat layer, an anti-curl layer, an antistatic layer, a sub-coat layer, an optical scattering layer and an adhesive layer.

Figure 2:
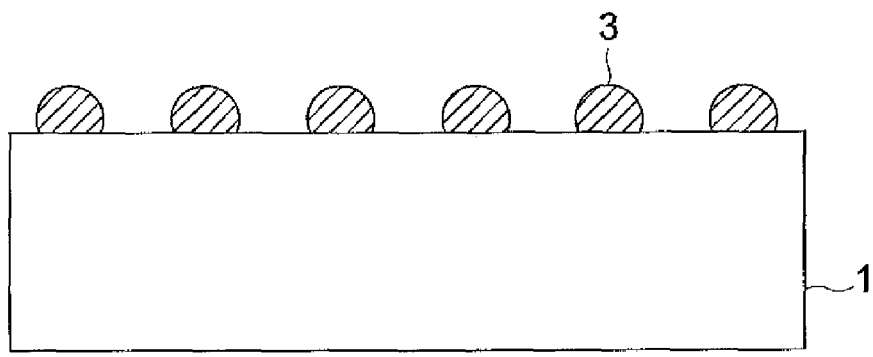
FIGS. 2a-2c are cross-sectional drawings to show another example of a convex structure
Figure 2:
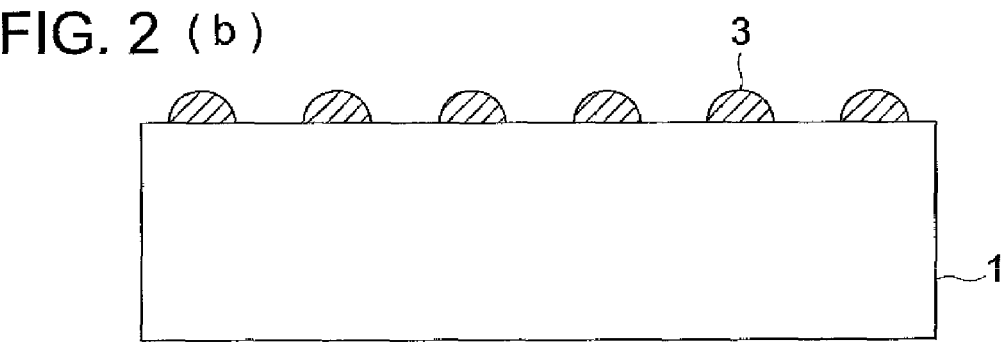
Figure 2:
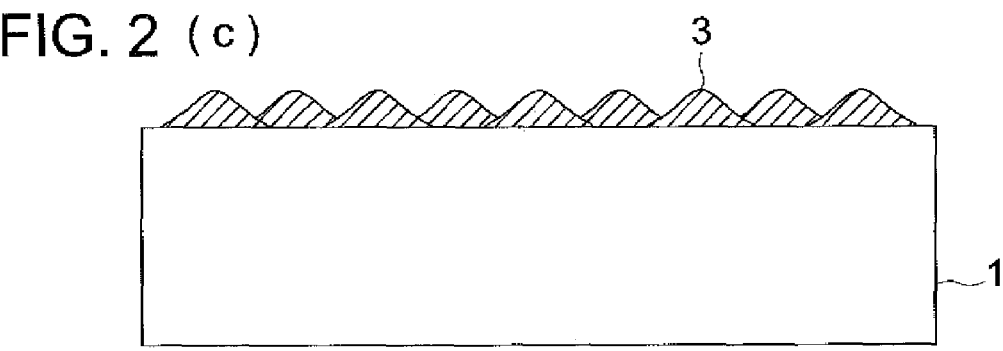

FIG. 2 is a cross-sectional drawing to show an example of another micro convex structure.

FIG. 2(a) is an example of a convex structure which has landed in a spherical form and a convex structure having such a form can be prepared by appropriately controlling such as a viscosity of liquid droplets of micro-particle dispersion ejected, an ejection speed of micro-particle dispersion, a contact angle between liquid droplets of micro-particle dispersion and the landing surface of micro-particle dispersion, and a distance between an ink-jet head and a substrate. A distance between an ink-jet head and a substrate is preferably 0.2-100 mm and can be varied depending on a form of a convex structure to be formed. A contact angle between a liquid droplet of micro-particle dispersion and the landing surface of micro-particle dispersion is appropriately adjusted within a range of 0-180°, and preferably within 5-120°. Further, it is possible to form a finer convex portion to make finer liquid droplet of micro-particle dispersion by breaking up liquid droplet of micro-particle dispersion after ejection with such as an increased ejection speed of micro-particle dispersion, or to form a larger convex portion or a convex portion having a regular form by depressing an ejection speed. These conditions of an ink-jet part can be set in reference to conditions employed in ink-jet for printing. Further, it is also possible to crush a convex portion comprising a micro-particle dispersion liquid droplet by an impact of landing with an increased ejection speed of micro-particle dispersion.

As for an ejection speed of micro-particle dispersion, speed V1 at the liquid droplet top end of micro-particle dispersion can be controlled generally over a range of 0.1-20 m/s by varying voltage to be applied on a piezo element of a piezo type ink-jet apparatus. It is preferably in a range of 1-20 m/s. Further, the lower limit of speed V1 of the liquid droplet top end is preferably 5 m/s and the upper limit is 12 m/s. Speed V2 of the liquid droplet back end is smaller than speed V1 of the liquid droplet top end and is generally 0.1-10 m/s. Speed V2 of the above-described micro-particle dispersion liquid droplet back end is determined by a dispersion state of micro-particle dispersion, that is, by the surface tension and viscosity of micro-particle dispersion.

Ejection time t is set within 3 μs-1 ms corresponding to a control condition of voltage applied to a piezo element. The control condition of voltage applied to a piezo element is set corresponding to such as a wave form control condition, the surface tension and viscosity of micro-particle dispersion so as to enable stable ejection of micro-particle dispersion.

Liquid droplets are ejected in a column form as described later, and there are cases of being split and of not being split before landing on a substrate. Even in the case of not being split, the speed of the liquid droplet top end and that of the back end approximately become identical when spherical liquid droplets are formed in the air before landing. Strictly speaking, the speed of the liquid droplet at landing differs from the speed of the liquid droplet top end or that of the back end at ejection, however, the difference is small against the speed of a liquid droplet because a liquid droplet having a column form becomes to a spherical form. On the other hand, in the case of being split into a few liquid droplets, it is considered that the speed of the liquid droplet top end at landing is the speed of the top liquid droplet and the speed of the liquid droplet back end at ejection is the speed of the last liquid droplet at landing. Herein, a liquid droplet is generally not split when the speed of the liquid droplet top end is not more than 3 m/s, while a liquid droplet is generally split when the speed of the liquid droplet top end is 3-20 m/s.

A forming method of a convex structure by an ink-jet method of this invention is mainly characterized by capability of forming a convex structure having an arbitrary form and specifically of making a different convex form along either the width direction or the longitudinal direction or of varying the adhesion quantity. In addition, rapid correspond to various types of products is possible because of capability of varying a pattern to be formed during manufacturing. Further, there is freedom of addition depending on a processing on the opposite side surface.

FIG. 2(b) is a cross-sectional view to show an example of anti-blocking treatment comprising a convex structure having a half circle form.

As an arrangement of the above-described convex structure, an example in which convex portions are made to land leaving intervals is shown in the explanation of the above drawing, however, possible is that the whole landing surface is covered with convex portions as shown in FIG. 2(c). In this invention, a micro-particle convex structure can be varied by changing the size and form of a convex portion in this manner.

Convex portion 3 formed by micro-particle dispersion may be an approximate circle or an ellipse when being observed from the vertical direction of film. For example, it may be an ellipse having a vertical to horizontal ratio of 1.01-10. Convex portions having an ellipse form can be prepared by performing adhesion of micro-particle dispersion while conveying the film side or an ink-jet head portion at a high speed.

FIG. 3 is a schematic drawing to show an ejection angle and an ejection method of micro-particle dispersion.

The angle at the time of ejecting micro-particle dispersion from an ink-jet head toward film, which is shown in FIG. 3(a), can be set within a range of 0°-180°, when the vertical direction to film is 90°, the conveying direction of film having been adhered with micro-particle dispersion is 0°, and the direction of film being supplied is 180°. It is preferable to be set in a range of 0°-90° because a relative speed difference between the flying speed of micro-particle dispersion and the conveying speed of film can be made small, and a desired convex form can be formed easier. It is more preferably in a range of 5°-85°.

FIG. 3(b) shows a method to continuously eject micro-particle dispersion by arranging plural number of ink-jet heads having various angles against the film surface. At this time, it is possible to arbitrarily change not only angles but also heights from the film surface.

FIG. 3(c) shows a state to eject micro-particle dispersion onto the film surface being conveyed while holding a back roll around which plural ink-jet heads are arranged. In this way, the film surface on which micro-particle dispersion lands may be either a flat surface or a curved surface.

Next an ink-jet method according to this invention will be explained.

Figure 4:
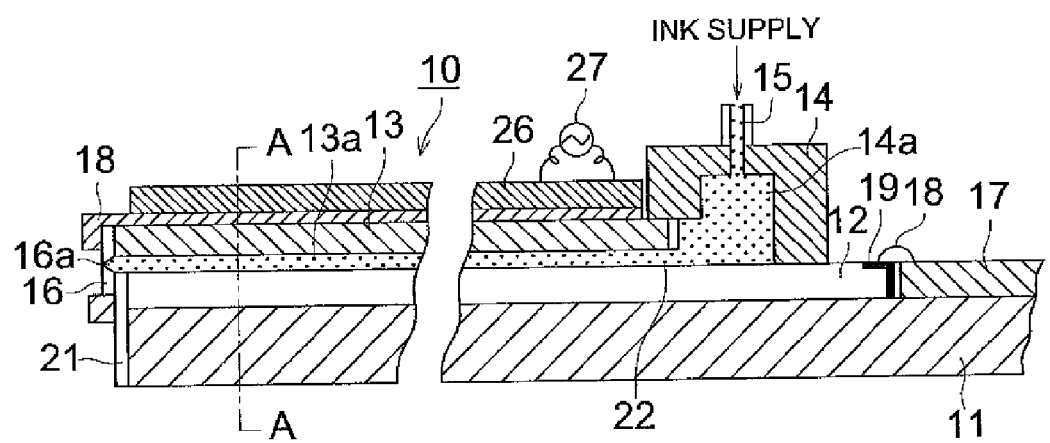
FIGS. 4a and 4b are outline drawings to show an example of an ink-jet head utilizable in an ink-jet method according to this invention
Figure 4:
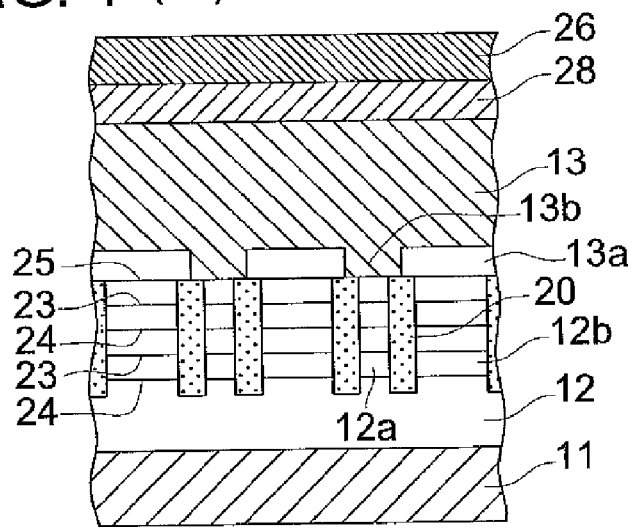

FIG. 4 is a cross-sectional view to show an example of an ink-jet head which can be utilized in an ink-jet method according to this invention.

FIG. 4(a) is a cross-sectional view of an ink-jet head, and FIG. 4(b) is a magnified drawing of a sectional view taken in the direction of the arrows substantially along the line A-A of FIG. 4(a). In the figures, 11 is a substrate, 12 is an piezo element, 13 is a flow pass plate, 13a is a flow pass of micro-particle dispersion, 13b is a wall portion, 14 is a common solution constituting member, 14a is a common solution, 15 is a micro-particle dispersion supply pipe, 16 is a nozzle plate, 16a is a nozzle, 17 is a printed circuit board (PCB) for drive, 18 is a lead portion, 19 is a drive electrode, 20 is a groove, 21 is a protective board, 22 is a fluid resistance, 23 and 24 are electrodes, 25 is an upper barrier wall, 26 is a heater, 27 is a heat conduction member, and 10 is an ink-jet head.

In integrated ink-jet head 10, accumulated piezo element 12 having electrodes 23 and 24 is provided with a groove processing corresponding to flow path 13a along said flow path 13a direction, and is divided into groove 20, drive piezo element 12b and non-drive piezo element 12a. Filler is sealed in groove 20. In piezo element 12 having been subjected to a groove processing, flow path plate 13 is joined via upper barrier wall 25. That is, above-described upper barrier wall 25 is supported by non-drive piezo element 12a and wall portion 13b which separates the adjacent flow path. The width of drive piezo element 12b is slightly narrower than flow path 13a, and drive piezo element 12b selected by a drive circuit on printed circuit board (PCB) for drive changes in the thickness direction to change the volume of flow path 13a via upper barrier wall 25 when a pulse form signal voltage is applied, whereby a micro-particle dispersion liquid droplet is ejected through nozzle 16a of nozzle plate 16.

Heater 26 adheres respectively on flow path plate 13 via heat conduction member 28. Heat conduction member 28 is arranged turning around-the nozzle surface. Heat conduction member 28 is aimed to efficiently conduct heat from heater 26 to flow path plate 13 and to convey heat from heater 26 around the nozzle surface neighborhood so that the air neighboring the nozzle surface is heated. Therefore, a material having good heat conductivity is utilized. Metal such as aluminum, iron, nickel, copper and stainless; or ceramics such as SiC, BeO and AlN; is listed as preferable materials.

A piezo element shifts along the vertical direction against the longitudinal direction of a flow path, when being driven, to change the volume of a flow path, and micro-particle dispersion liquid droplet is jet through a nozzle by the volume change. A signal is applied to a piezo element so as to always maintain flow path volume to be decreased, and after having been shifted to the direction to increase a flow path volume corresponding to a selected flow path, applied is a pulse signal which provides a shift to decrease the volume of a flow path again, whereby micro-particle dispersion is jet as micro-particle dispersion droplets through a nozzle corresponding to the flow path.

Figure 5:
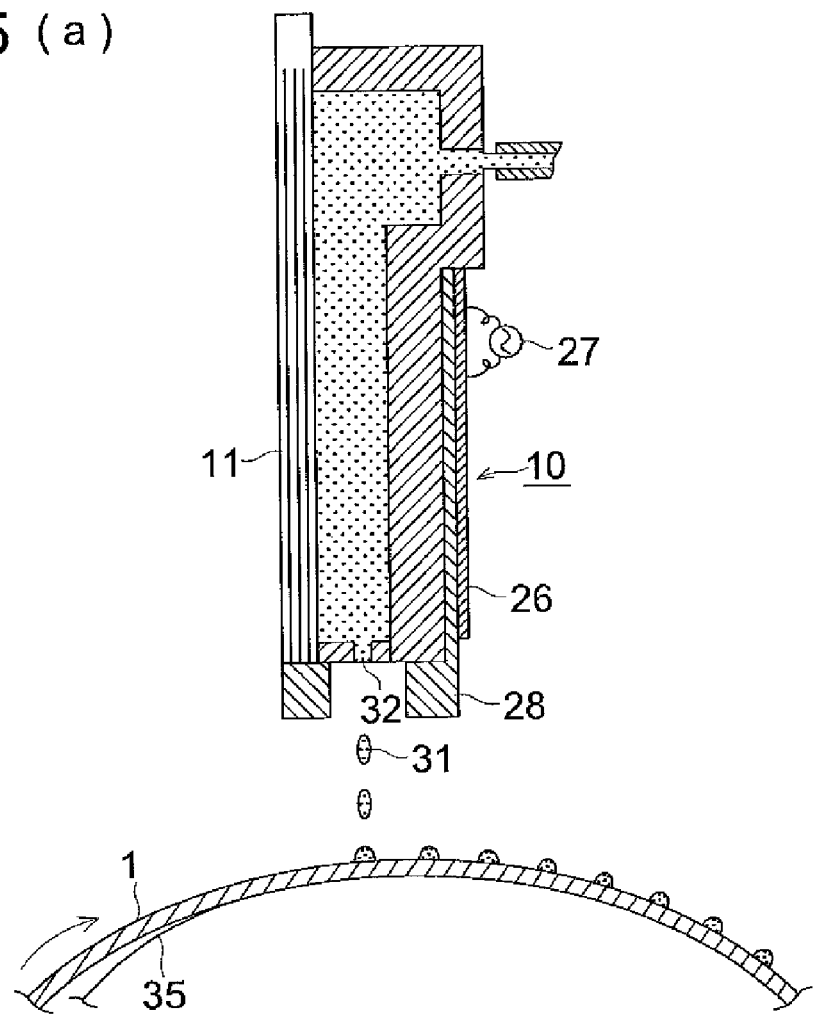
FIGS. 5a and 5b are outline drawings to show an example of an ink-jet head portion and a nozzle plate
Figure 5:
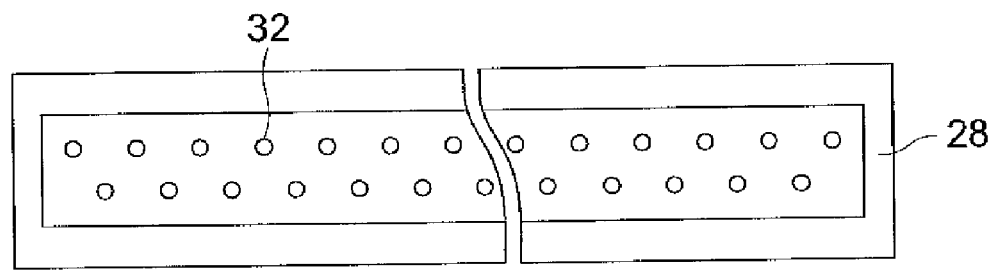

FIG. 5 is a schematic drawing to show an example of an ink-jet head portion and a nozzle plate, which can be utilized in this invention.

In FIG. 5, FIG. 5(a) is a cross-sectional view of a head portion, and FIG. 5(b) is a plane drawing of a nozzle plate. In the drawing, 1 is a transparent substrate, 31 is a micro-particle dispersion liquid droplet, and 32 is a nozzle. Micro-particle dispersion 31 jet through nozzle 32 flies toward transparent substrate 1 to adhere thereon. Micro-particle dispersion liquid droplets having landed on transparent substrate 1 are dried to form convex portions.

In this invention, as described in FIG. 5(b), nozzles of an ink-jet head portion are preferably arranged in a staggered form, and further, provided in multi-steps and parallel to the conveying direction of transparent substrate 1. Further, it is preferable that an ink-jet head portion is provided with micro vibration at the time of ejection of micro-particle dispersion so as to make micro-particle dispersion randomly land on a transparent substrate. Thereby, generation of interference fringes can be restrained. Micro vibration can be provided by such as high frequency voltage, sonic waves and ultrasonic waves; however, it is not limited thereto. Further, ejection of micro-particle dispersion liquid droplet 31 by an ink-jet method is performed under controlled air flow not to be disturbed to cause deviation or unwanted unevenness due the air surrounding transparent substrate 1 which is conveyed.

As an ink-jet head, an electrostatic ejection type ink-jet head described in JP-A 2004-58505 can be also diverted for an anti-blocking processing of this invention; and a liquid ejection head described ion JP-A 2004-58532, an ink-jet patterning apparatus described in JP-A 2004-54271 can be also diverted for an anti-blocking processing of this invention. A jet head described in JP-A 2004-55520, an ink-jet head described in Japanese Patent No. 3,5000,636, and an ink-jet recording system described in Japanese Patent No. 3,501,583 can be also diverted for an anti-blocking processing of this invention.

Further, it is preferable to confirm whether clogging is generated or not by a test ejection before ejecting micro-particle dispersion to form convex portions, and to perform head cleaning in the case of recognizing clogging or at start of production. Head cleaning may be performed by use of either micro-particle dispersion or a cleaning solution primarily comprising a solvent. As a solvent of a cleaning solution, those utilizable in micro-particle dispersion can be preferably utilized. A surfactant (such as a nonionic type, a fluorine type and a silicone type) may be appropriately incorporated at a content of approximately 0.01-1%.

It is preferable to suitably adjust the ejection density of micro-particle dispersion to form a convex portion, and for example, the ejection density of micro-particle dispersion to form a smaller convex portion is preferably made higher compared to the ejection density of micro-particle dispersion to form a larger convex portion.

In the case of clogging of a head being detected during production, it is preferable to stop supply of micro-particle dispersion to said head. It is also preferable to increase ejection quantity of micro-particle dispersion from another head. In the case of employing a multi-step ink-jet head, it is preferable to perform head cleaning of a clogged ink-jet head while continuing production; in this case, it is preferable to convert the ejection direction of micro-particle dispersion not to make a cleaning solution adhere on substrate film to be processed, or to make ejection toward a separate member which accept a cleaning solution. During head cleaning, it is preferable to continue production while increasing ejection quantity of micro-particle dispersion from another ink-jet head or employing a spare ink-jet head.

Further, it is preferable to provide marking by ink-jet on the edge of a film substrate in the case of any disorder such as clogging of a head being confirmed during production. Marking is preferably performed by colored micro-particle dispersion and to make the disordered portion clear so that said portion can be easily removed from a product later.

As a forming method of a micro convex structure utilized in this invention, preferably employed is an ink-jet method to form the structure by ejection of micro-particle dispersion through a nozzle, and FIG. 6 shows an example of an ink-jet method preferably utilizable in this invention.

In FIG. 6, FIG. 6(a) is a method in which ink-jet heads 10 are arranged along the width direction of transparent substrate 1 and a micro convex structure is formed on the surface thereof while conveying transparent substrate 1 (a line head method), FIG. 6(b) is a method in which a micro convex form is formed on the surface of transparent substrate 1 while ink-jet head 10 is shifted along the horizontal scanning direction (a flat head method), and FIG. 6(c) is a method in which a micro convex structure is formed on the surface of transparent substrate 1 while ink-jet head 10 scans along the width direction thereon (a capstan method); any one of these methods can be employed; however, a line head method is preferable in this invention in view of productivity. By utilizing such an ink-jet head, it is possible to easily form a convex portion having an arbitrary form at arbitrary position on a transparent substrate. Therefore, a method by means of ink-jet has a higher degree of freedom to be superior compared to a conventional method to incorporate a matting agent.

Herein, 29 described in FIGS. 6(a)-(c) is an actinic ray irradiation portion utilized in the case of employing actinic ray curable resin, which will be described later, as micro-particle dispersion 29 is not necessary when thermoplastic resin is employed as micro-particle dispersion.

Further, in this invention, another actinic ray irradiation portion may be arranged on the downstream side in the conveying direction of a transparent substrate of FIGS. 6(a), (b) and (c). The interval between an ink-jet portion and an actinic ray irradiation portion is preferably approximately 0.1-20 m and is suitably set. Further, the set position is preferably changeable or adjustable.

In this invention, a micro-particle dispersion liquid droplet is preferably 0.01-100 pl, more preferably 0.1-50 pl and specifically preferably 0.1-10 pl, to form a micro convex portion. It is possible to prepare an optical film having a micro convex potion which provides excellent haze by ejecting micro-particle dispersion in the above-described condition.

In this invention, micro-particle dispersion ejected through an ink-jet head may adhere on the convex portion forming surface in a prolonged column form following the top edge portion of said micro-particle dispersion before being split from the aforesaid ink-jet head, however, preferably made to adhere as a micro-particle dispersion liquid droplet after micro-particle dispersion has been split from an ink-jet head. A micro-particle dispersion liquid droplet ejected from a head preferably adheres on the, convex portion forming surface without being split, or made into fine micro-particle dispersion liquid droplets by setting an ejection condition to be intentionally split and whereby convex portion formation is preferably performed by adhesion of said fine micro-particle dispersion liquid droplets; the ejection condition can be adjusted depending on a convex form to be formed.

Further, the viscosity of micro-particle dispersion is preferably not higher than 25 mPa·s and more preferably not higher than 10 mPa·s. The viscosity of micro-particle dispersion at the time of landing is preferably higher than that of micro-particle dispersion at the time of ejection, more preferably not lower than 15 mPa·s and more preferably not lower than 25 mPa·s. The higher is the viscosity at landing, a convex portion having the larger Ra is liable to be formed, and the viscosity is suitably adjusted to form a desired convex form.

Next, micro-particle dispersion utilized in an ink-jet method to form a micro convex structure according to this invention will be explained.

Figure 7:
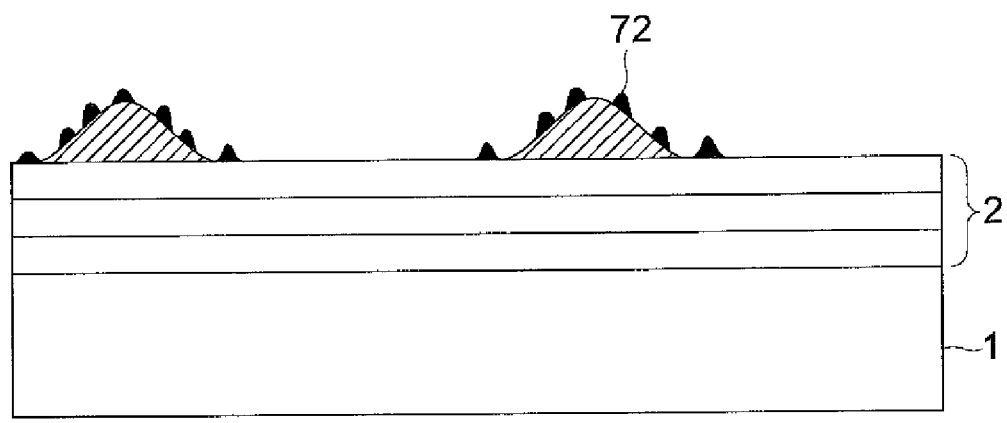
FIGS. 7a and 7b are schematic drawings to show an example in which a micro convex structure is further formed with ink droplets having smaller particle size after a micro convex structure has been formed with larger ink droplets
Figure 7:
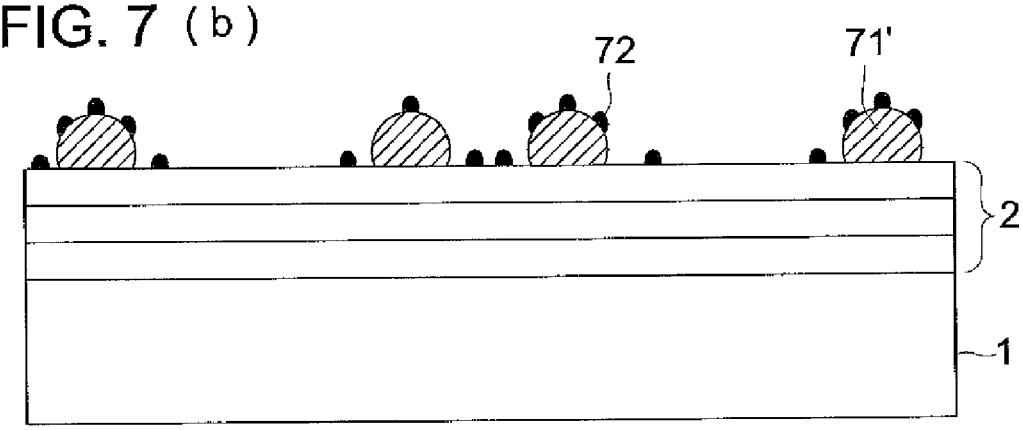

FIG. 7 is a schematic drawing to show an example in which further finer micro convex structure 72 is formed by micro-particle dispersion having a smaller particle size on a transparent substrate after micro convex structure 71 has been formed by a micro-particle dispersion liquid droplet having a larger particle size, by means of an ink-jet method.

FIG. 7(a) is an example in which, after convex portion 71 of a Konide form had been formed by use of micro-particle dispersion having a relatively low viscosity, finer convex portion 72 was provided on the surface thereof and on the portion without landing; and FIG. 7(b) is an example in which, after convex portion 71' having a spherical form had been formed by controlling a contact angle between a micro-particle dispersion liquid droplet and a substrate, finer convex portion 72 was provided on the surface thereof and on the portion without landing.

Also in this case, it is necessary to control the height, the diameter and the forming number of convex potion to be formed by a liquid droplet having a larger particle size within a range of this invention.

In this manner, a micro convex portion having an excellent anti-blocking effect can be formed by forming a convex structure by use of micro-particle dispersion liquid droplets having different particle sizes to form a micro convex structure. Each micro-particle dispersion liquid droplet is preferably 0.01-100 pl, more preferably and specifically preferably 0.1-10 pl. In the case of utilizing micro-dispersion liquid droplets having at least two types of sizes, the volume of micro-particle dispersion liquid droplets having the smallest average particle diameter is 0.1-80 weight %, more preferably 1-60 volume % and specifically preferably 3-50 weight %, against micro-particle dispersion liquid droplets having the largest average particle diameter. Further, to combine not less than 3 types of micro-particle dispersions having different volumes is a more preferable embodiment.

Further, in the case of utilizing micro-particle dispersion of not less than two types, micro-particle dispersions having a different solid concentration from each other can be utilized. For example, it is possible to form a finer convex potion by setting a lower solid concentration of smaller liquid droplets to evaporate a solvent while micro-particle dispersion is flying or after landing. In this manner, it is possible to easily control formation or a form of a micro convex structure by appropriately adjusting each solid concentration of micro-particle dispersion.

Further, in this invention, in the case of forming a convex structure by combining micro-particle dispersions of different volumes, it is preferable to make finer liquid droplets of micro-particle dispersion land after having made larger liquid droplets of micro-particle dispersion land on a transparent substrate.

As another example of a micro convex structure in this invention, it is also preferable to incorporate micro-particles in liquid droplets of micro-particle dispersion.

Figure 8:
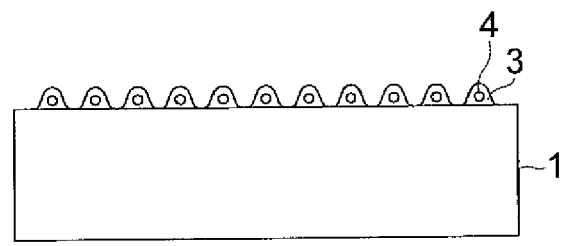
FIGS. 8a-8d are cross-sectional drawings to show an example of a convex portion comprising micro-particle dispersion (ink) containing micro-particles
Figure 8:
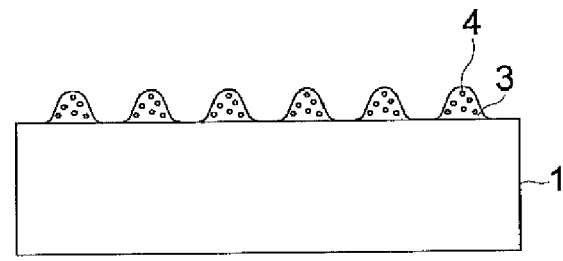
Figure 8:
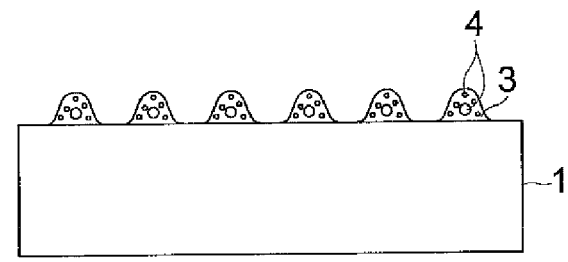
Figure 8:
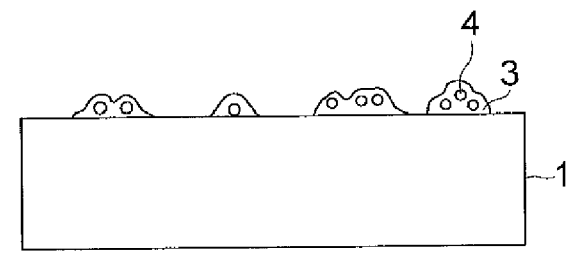

FIG. 8 is a cross-sectional view to show an example of a convex portion in which micro-particles are incorporated in micro-particle dispersion.

Next, a manufacturing method of an optical film of this invention will be explained.

Figure 9:
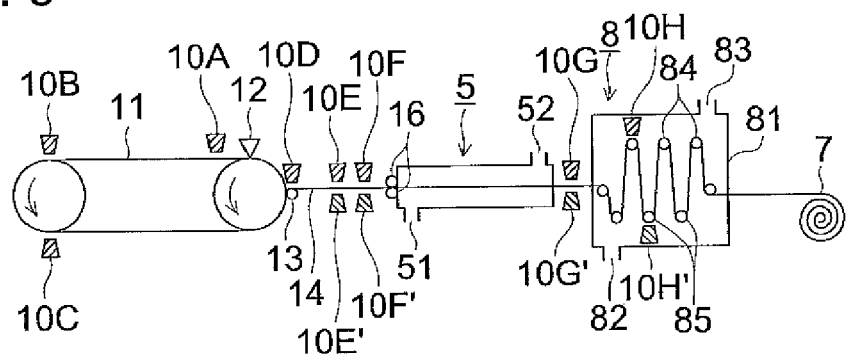
FIG. 9 is a schematic drawing to show a flow in which a process to provide a micro convex structure by an ink-jet method is added to a process to manufacture a transparent substrate by solution casting

FIG. 9 is a schematic drawing to show a flow added with a process to provide a micro convex structure by an ink-jet method to a process of manufacturing a transparent substrate by means of solution casting.

In FIG. 9, 11 is a support which is endlessly traveling. As a support, a mirror surfaced band form metal is utilized. 12 is a die to cast a dope comprising transparent substrate forming resin dissolved in a solvent on support 11. 13 is a peeling roll which peels off film comprising dope having been cast on support 11 having been solidified, and 14 is peeled off film. 5 is a tenter conveying-drying process, 51 is an exhausting opening, and 52 is a drying wind introducing opening. Herein, exhausting opening 51 and drying wind introducing opening 52 may be reversed. 6 is a tension cut means. A tension cut means includes such as a nip roll and a suction roll. Herein, a tension cut means may be provided between each process.

8 is a roll conveying-drying process, 81 is a drier box, 82 is an exhausting opening, and 83 is a drying wind introducing opening. Herein, exhausting opening 81 and drying wind introducing opening 83 may be reversed. 84 is an upper conveying roll and 85 is an under conveying roll. Said conveying rolls 84 and 85 at up and down make one set, and plural sets are arranged. 7 is a wound roll film.

Ink-jet head portion 10, which ejects micro-particle dispersion liquid droplets, according to this invention may be arranged at any position among a dope casting portion, between a peeling-tenter portion, between a tenter-drying portion and in a dryer box; and can be specifically arranged at a position of 10A-11 in the drawing. At this time, ink-jet head portions may be arranged either on one side or on both sides of film. The arrangement number of ink-jet head portions 10 is not specifically limited and may be one or plural, however, it is preferable to arrange plural number of ink-jet head portions.

Figure 10:
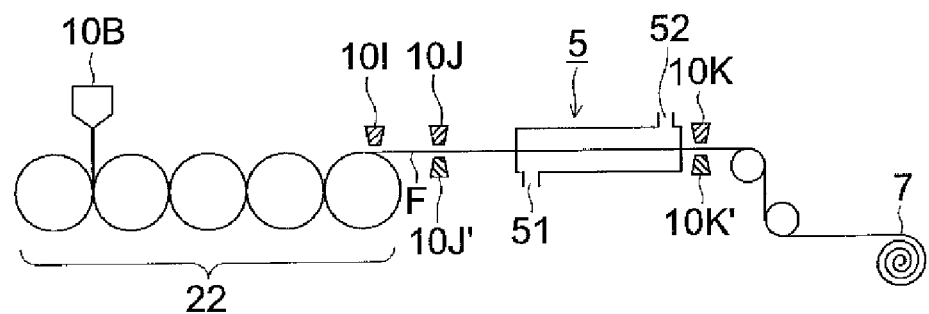
FIG. 10 is a schematic drawing to show a flow in which a process to provide a micro convex structure by an ink-jet method is added to a process to manufacture a transparent substrate by melt casting

FIG. 10 is a schematic drawing to show a flow added with a process to provide a micro convex structure by an ink-jet method to a process of manufacture a transparent substrate by means of melt casting.

In FIG. 10, 21 is a melt casting die through which melt polymer, which will be described later, is extruded to be a film F via casting roll 22. Successively, film F is stretched in tenter conveying-drying process to be wound via a roll to be roll form film 7.

Ink-jet head portion 10, which ejects micro-particle dispersion liquid droplets, according to this invention may be arranged at a position of 10I-K in the drawing. At this time, ink-jet head portions may be arranged either on one side or on the both sides of film. The arrangement number of ink-jet head portions 10 is not specifically limited and may be one or plural, however, it is preferable to arrange plural number of ink-jet head portions.

Figure 11:
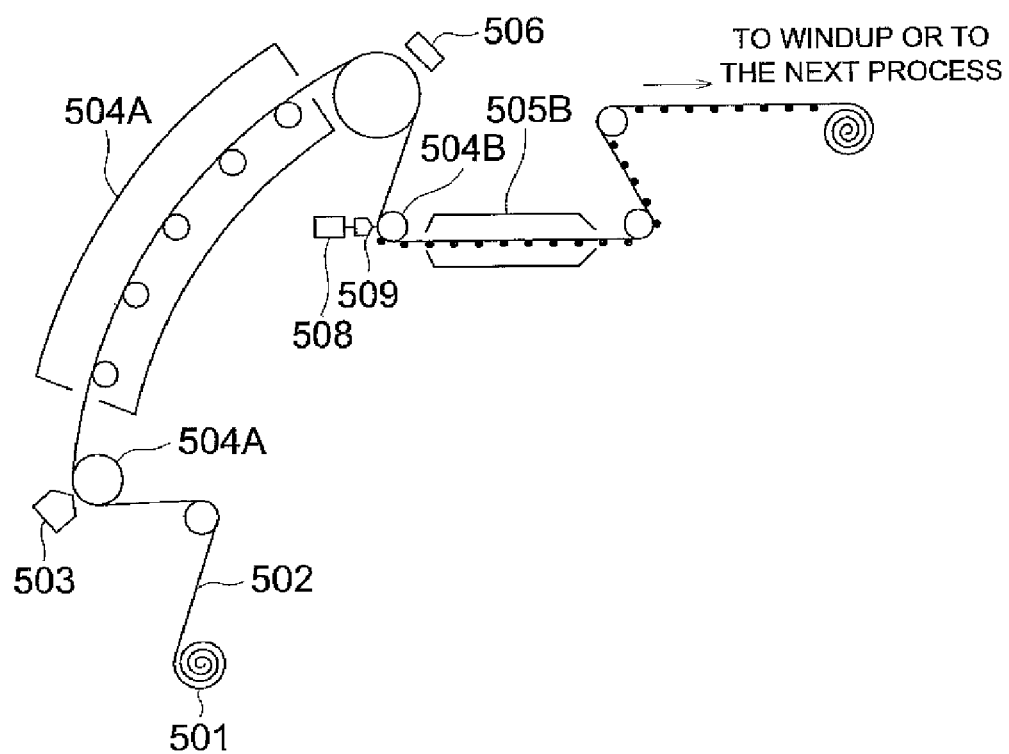
FIG. 11 is a schematic drawings to show of another process to provide a micro convex structure by an ink-jet method

FIG. 11 is a schematic drawing to show a flow of another process to provide a micro convex structure by an ink-jet method. In detail, shown is a flow to form a micro convex structure on the back surface side by an ink-jet method after a functional layer such as an ultraviolet curable resin layer and an anti-reflection layer having been coated on a transparent substrate by means of coating method.

In FIG. 11, transparent substrate 502 fed from roll 501 is conveyed and coated with a functional layer by first coater 503 at first coater station A. At this time, a functional layer may be comprised of one layer or plural layers. Transparent substrate 502 having been coated with a functional layer is successively subjected to drying in drying zone 505A. In the drying process, the both surfaces of transparent substrate 502 are subjected to a hot wind the temperature of which is controlled.

Successively, the film is conveyed to second coater station B to provide a micro convex structure utilizing an ink-jet method. Ink-jet ejection portion 509 is connected with micro-particle dispersion supplying tank 508 wherefrom micro-particle dispersion is supplied. Ink-jet ejection portion 509, in which plural ink-jet nozzles are arranged in a staggered form all over the width as shown in. 5(*b*), ejects micro-particle dispersion liquid droplets on a functional layer to form a convex structure on the surface thereof. Further, in the case of ejecting not less than two types of micro-particle dispersion liquid droplets, each micro-particle dispersion liquid droplets may be ejected through not less than two rows of ink-jet nozzles arranged or randomly through an arbitrary ink-jet nozzle. Further, plural ink-jet ejection portions may be arranged to eject different micro-particle dispersion liquid droplets through each micro particle dispersion ejection portion. In this invention, since flying of micro-particle dispersion liquid droplets is liable to be affected by the outer air flow due to micro liquid droplets as minute as 0.01-100 pl and preferably 0.01-10 pl being ejected, it is preferable to cover the whole second coater station B by such as a barrier wall to prevent turbulence of the atmospheric pressure. Further, to highly precisely fly very minute liquid droplets of not more than 1 pl, it is also preferable to electrically assist flying stability of micro-particle dispersion liquid droplets by applying voltage between ink-jet ejection portion 509 and transparent substrate 502 or between back-rolls 504B to provide micro-particle dispersion liquid droplets with a charge. In addition, it is preferable to provide a static charge elimination measure such as to arrange a static charge eliminating bar to prevent static charge accompanied with transport of film throughout the whole process, not so as to cause unevenness due to static charge of film. Further, it is also preferable to adopt a method to rapidly lower fluidity of micro-particle dispersion liquid droplets by cooling a transparent substrate, to prevent deformation of micro-particle dispersion liquid droplets having landed. In addition, it is preferable to make micro-particle liquid droplets land in a state of a decreased solvent content by evaporating a solvent contained while flying until landing after micro-particle dispersion liquid droplets having been ejected, to form a finer convex structure. Therefore, also preferable is a method to raise the temperature or to control the atmospheric pressure to be not higher than 1 atmospheric pressure such as 20-100 kPa, in a micro-particle dispersion flying space. For example, it is possible to make landing while decreasing the solvent content in micro-particle dispersion liquid droplets to 1/100-99/100 against a solvent content at ejection.

Further, it is preferable to make gentle landing not to make the form of a convex portion be largely deformed or be crushed due to impact of landing, and for example, it is also preferable to increase the distance between an ejection portion and a landing portion of micro-particle dispersion or to performing ejection against gravity or electric charge to soften the impact of landing. In addition, it is also preferable to eject micro-particle dispersion liquid droplets into the air flowing toward film and arranging film in the space containing these micro-particle dispersion liquid droplets, and whereby to make micro-particle dispersion liquid droplets adhere on the film.

In the case that micro-particle dispersion liquid droplets utilizes thermoplastic resin, also preferable is a method to heat employing back-roll 504E as a heat roll.

Transparent substrate 502, having been subjected to a curing treatment as much as to maintain a convex structure comprising micro-particle dispersion liquid droplets having landed, is subjected to an evaporation process of such as an unnecessary organic solvent in a drying zone 505B to complete curing.

In a method of this invention to provide sliding property by adhesion of micro-particle dispersion liquid droplets, a film substrate is preferably formed while being transported at 1-200 m/min and preferably at 3-150 m/min.

Electric charging of substrate film at the time of landing of micro-particle dispersion is preferably free of spottiness, and the film is preferably subjected to charge elimination or may be uniformly charged, immediately before landing.

Further, it is preferable to measure physical properties such as haze and transparent visibility of a convex portion, which is formed by landing of micro-particle dispersion, to confirm to be a predetermined value; and it is preferable to vary and control an ejection condition or a curing condition of micro-particle dispersion by feeding back said results, in the case, of confirming deviation or variation. The measurement is preferably performed after forming all of convex portions and curing resin, and may be performed during formation of convex portions. For example, it is possible to perform more suitable feed back control by performing measurement after forming relatively large roughness as well as after forming finer convex portions successive thereto.

This invention is not limited to the above-described ink-jet recording apparatuses and image forming methods, in addition to these, a micro-particle dispersion ejection quantity measuring method described in JP-A 9-118024 and an apparatus thereof are also preferably diverted, whereby uniform convex portions can be formed in a wide range. Further, it is also preferable to divert an ink-jet head and a bend adjusting method described in JP-A 10-151748. It is also preferable to divert an image forming apparatus and an image forming method utilizing ink-jet recording heads described in such as JP-A 2006-3511, JP-A 2006-36865, JP-A 2005-306022 and JP-A 2001-260368. It is also preferable to divert an ink-jet printer and an ink-jet recording method described in JP-A 2003-136740. It is also preferable to divert an ink-jet recording apparatus provided with a cleaning mechanism described in JP-A 2003-154671. It is also preferable to divert an ink-jet recording apparatus described in JP-A 2003-165232, JP-A 2003-182092, JP-A 2003-182093, JP-A 2003-182097, JP-A 2003-182098, JP-A 2003-182121, JP-A 2003-191478 and JP-A 2003-191479.

Further, it is preferable to divert such as an image forming method, ink and recorder described in JP-A 2003-191594, and in particular, it is also preferable to divert an image forming method in which micro-particle dispersion curable with actinic ray irradiation is ejected by a recording head having plural nozzles capable of selective ejection control of micro-particle dispersion, wherein a condition of actinic ray irradiation is varied depending on a type of a recording material, to this invention. In addition, it is also preferable to divert an ink-jet recording method and an ink-jet recording apparatus described in JP-A 2003-211651 to this invention.

In addition, it is also preferable to divert radiation curable ink-jet ink and an ink-jet recording method described in JP-A 2003-213183 to this invention. Further, it is also preferable to divert an ink-jet recording apparatus and an ink-jet recording method described in JP-A 2003-231267 to this invention. Further, it is also preferable to divert an image forming method, ink and recording apparatus described in JP-A 2003-237061 to this invention. Further, it is also preferable to divert an image forming method described in JP-A 2003-251796 to this invention. Further, it is also preferable to divert actinic ray curable ink and an image forming method utilizing the same described in JP-A 2003-261799 to this invention. Further, it is also preferable to divert an image forming method and an ink-jet recording apparatus described in JP-A 2003-260790 to this invention. Further, it is also preferable to divert an image forming method, a recording apparatus and ink described in JP-A 2003-276175 to this invention. Further, it is also preferable to divert an image forming method, ink and an image forming apparatus described in JP-A 2003-276256 to this invention. Further, it is also preferable to divert an image forming method, printed matter and a recording apparatus described in JP-A 2003-277654 to this invention. Further, it is also preferable to divert ink-jet ink and an image forming method described in JP-A 2003-292837 to this invention. Further, it is also preferable to divert an image forming method, ink and a recording apparatus and ink described in JP-A 2003-305839 to this invention. Further, it is also preferable to divert an image forming method and a recording apparatus described in JP-A 2003-312120 to this invention. Further, it is also preferable to divert an image forming method and a recording apparatus described in JP-A 2003-313464 to this invention. Further, it is also preferable to divert an image forming method and a recording apparatus described in JP-A 2003-327875 to this invention. Further, it is also preferable to divert an actinic ray curable ink-jet recording method described in JP-A 2004-9360 to this invention. Further, it is also preferable to divert an image forming method and ink-jet recording apparatus utilized therefore described in JP-A 2004-25480 to this invention. Further, it is also preferable to divert an ink-jet printer described in JP-A 2004-34543 to this invention. Further, it is also preferable to divert an ink-jet recording method, ink and an ink-jet printer described in JP-A 2004-34545 to this invention. Further, it is also preferable to divert an image forming method, printed matter and a recording apparatus described in JP-A 2004-51656 to this invention. Further, it is also preferable to divert an actinic ray curable ink, an image forming method and a recording apparatus utilized therefore described in JP-A 2004-51922 to this invention. Further, it is also preferable to divert an actinic ray curable ink, an image forming method and a recording apparatus described in JP-A 2004-51923 to this invention. Further, it is also preferable to divert a storage method of ink-jet recording ink and an image forming method described in JP-A 2004-51924 to this invention. Further, it is also preferable to divert an ink-jet apparatus and an ink ejection condition described in JP-A 2004-37855 to this invention.

(Transparent substrate Film)

In this invention, thermoplastic resin film is preferably utilized as transparent substrate film for an optical film.

Thermoplastic resin utilized in this invention is not specifically limited and includes such as cellulose ester, cycloolefin polymer, polycarbonate, polylactic acid type polymer, acrylic resin and polyester as preferable examples, however, is not limited thereto. These may be film prepared either by solution casting or by melt casting.

Thermoplastic film utilized in this invention preferably contains at least polymer selected from cellulose ester, cycloolefin polymer, polycarbonate and polylactic acid. Further, the film is preferably polarizing plate protective film or phase difference film.

Herein, in this invention, transparent substrate film is preferably provided with a width of 1.4-5 m, a roll length of 2,000-10,000 m and a thickness of 5-55 μm, in view of continuous production adaptability.

(Cellulose Ester)

Ratio of a weight average molecular weight (Mw) to a number average molecular weight (Mn) of cellulose ester utilized in this invention is preferably 1.4-3.0. Herein, in this invention, cellulose ester having Mw/Mn value of 1.4-3.0 may be incorporated, however, Mw/Mn value of the whole cellulose ester (preferably cellulose triacetate or cellulose acetate propionate) contained in film is more preferably in a range of 1.4-3.0. It is difficult to make Mw/Mn of less than 1.4 during synthesis of cellulose ester and it is possible to prepare cellulose ester having a uniform molecular weight by means of gel filtration. However, this method is much cost consuming. Further, it is preferable to maintain flatness when Mw/Mn is not more than 3.0. It is more preferably 1.7-2.2.

The molecular weight of cellulose ester utilized in this invention is preferably 80,000-200,000 of a number average molecular weight (Mn), more preferably 100,000-200,000, and specifically preferably 150,000-200,000.

The molecular weight and molecular weight distribution of cellulose ester utilized in this invention can be measured by a method well known in the art employing high speed liquid chromatography. A number average molecular weight and a weight average molecular weight are calculated utilizing the result and a ratio thereof can be calculated.

The measurement condition is as follows.

Solvent: Methylene chloride
Column: Shodex K806, K805 and K803G (3 columns, manufactured by Showa Denko K.K., were utilized in connection)
Column, temperature: 25° C.
Sample concentration: 0.1 weight %
Detector: RI Model 504 (manufactured by Science Corp.)
Pump: L6000 (manufactured by Hitachi Corp.)
Flow rate: 1.0 ml/min
Calibration Curve: A calibration curve based on 13 samples of standard polystyrene STK (manufactured by Toso Co., Ltd.), having a molecular weight Mw=1,000,000–500, was utilized. 13 samples were utilized at approximately same intervals.

As cellulose ester utilized in this invention, aliphatic carboxylic ester or aromatic carboxylic ester, which have a carbon number of approximately 2-22, or mixed ester of aliphatic carboxylic ester and aromatic carboxylic ester are preferably utilized, and lower fatty acid ester of cellulose is specifically preferable. Lower fatty acid in lower fatty acid ester of cellulose means fatty acid having a carbon number of not more than 6. Specifically, such as cellulose acetate, cellulose propionate, cellulose butyrate and cellulose acetate phthalate; and mixed aliphatic acid ester such as cellulose acetate propionate and cellulose acetate butyrate, which are described in such as JP-A Nos. 10-45804 and 8-231761 and U.S. Pat. No. 2,319,052, can be utilized. Among those described above, specifically preferably utilized lower fatty acid ester of cellulose is cellulose triacetate and cellulose acetate propionate. These cellulose esters can be also utilized by mixing.

In the case of cellulose triacetate, those having a total acyl group substitution degree (acetyl group substitution degree) of 2.5-2.9 are preferably utilized.

Cellulose ester other than cellulose triacetate is cellulose ester which is provided with an acyl group having a carbon number of 2-22 as a substituent and simultaneously satisfies following equation (I) and (II) when a substitution degree of an acetyl group is X and a substitution degree of an acyl group having a carbon number of 3-22 is Y.

$$2.5 \leq X+Y \leq 2.9 \quad \text{Equation (I)}$$

$$0 \leq X \leq 2.5 \quad \text{Equation (II)}$$

Among them, cellulose acetate propionate (total acyl substitution degree=X+Y) having $1.9 \leq X \leq 2.5$ and $0.1 \leq Y \leq 1.0$ is preferable. The portion being not substituted by an acyl group generally exists as a hydroxyl group. These can be synthesized by a method well known in the art.

This acyl group substitution degree can be measured based on a method defined in ASTM-D817-96

As cellulose ester, cellulose ester synthesized from such as cotton linter, wood pulp and kenaf as a starting material can be utilized alone or by being mixed. Specifically, cellulose ester synthesized from cotton linter (hereinafter, simply referred to as linter) and wood pulp is preferably utilized alone or by being mixed.

Further, these cellulose esters prepared can be utilized by mixing at an arbitrary ratio. These cellulose esters, in the case of an acylation agent being acid anhydride (such as acetic acid anhydride, propionic acid anhydride and butyric acid anhydride), can be prepared by performing reaction of cellulose raw material by an ordinary method by utilizing organic acid such as acetic acid or an organic solvent such as methylene chloride together with a proton catalyst such as sulfuric acid.

In the case of acetyl cellulose, it is necessary to prolong the time of an acetylation reaction to increase an acetylation degree. However, decomposition will simultaneously proceed when the reaction time is too long to cause cleavage of a polymer chain or decomposition of an acetyl group, resulting in undesirable results. Therefore it is necessary to set the reaction time in a certain range to increase an acetylation degree and to depress decomposition in a certain degree. It is not preferable to define an acetylation degree by the reaction time because a reaction condition is varied and greatly changes depending on other conditions. Since molecular weight distribution becomes wider as decomposition of polymer proceeds, in the case of cellulose ester, a degree of decomposition can be defined by weight average molecular weight (Mw)/number average molecular weight (Mn) which is generally utilized. That is, a value of weight average molecular weight (Mw)/number average molecular weight (Mn) can be employed as one index of a reaction degree to perform an acetylation reaction for sufficient time for acetylation without too much decomposition due to excessively long reaction time.

An example of a manufacturing method of cellulose ester will be shown below. Cotton linter of 100 weight parts as a cellulose raw material was ground and added with 40 weight parts of acetic acid and subjected to a preliminary activation treatment at 36° C. for 20 minutes. Thereafter, the system was added with 8 weight parts of sulfuric acid, 260 weight parts of acetic acid anhydride and 350 weight parts of acetic acid to perform esterification at 36° C. for 120 minutes. The resulting system, after having been neutralized with 11 weight parts of a 24% magnesium acetate aqueous solution, was subjected to saponification ripening at 63° C. for 35 minutes, whereby acetyl cellulose was prepared. This, after having been stirred at room temperature for 160 minutes with 10 times of acetic acid aqueous solution (acetic acid/water=1/1 (weight ratio)), was filtered and dried to prepare purified acetyl cellulose having an acetyl substitution degree of 2.75. This acetyl cellulose had Mn of 92,000, Mw of 156,000 and Mw/Mn of 1.7. Similarly, cellulose ester, which has a different substitution degree and Mw/Mn ratio, can be synthesized by adjusting an esterification condition (temperature, time, stirring) and a saponification condition.

Herein, cellulose ester synthesized is also preferably subjected to such as purification to eliminate a low molecular weight component and filtration to eliminate a non-acetylated component or a low acetylation component.

Further, in the case of mixed acid cellulose ester, it can be prepared by a method described in JP-A 10-45804. A substitution degree of an acyl group can be measured based on a method defined in ASTM-D817-96.

Further, cellulose ester is also affected by a micro amount of metal component in a cellulose ester. This is considered to be related to water utilized in a production process, and component to be an insoluble nucleus is preferably the less, as well as metal ions such as iron, calcium and magnesium, which may form an insoluble substance by salt formation with a polymer decomposition product which possibly contains an organic acid group, are preferably the less. An iron (Fe) component is preferably not more than 1 ppm. A calcium (Ca) component is rich in under ground water or river water which makes hard water, which is unsuitable as drinking water when it is plenty; and a Ca component is also liable to form a coordinate compound or a complex with an acidic component such as carboxylic acid and sulfonic acid, or with variety of ligands, to form scum (insoluble sediments, muddiness) arising from various insoluble calcium.

A (Ca) calcium component is preferably not more than 60 ppm and more preferably 0-30 ppm. With respect a magnesium (Mg) component, since an insoluble substance is generated when it is excessive, it is preferably 0-70 ppm and specifically preferably 0-20 ppm. Metal components such as an iron (Fe) content, a calcium (Ca) component and a magnesium (Mg) content can be determined by analysis with ICP-AES (induction coupling plasma emission spectroscopy) after dried cellulose ester having been subjected to a preliminary treatment with a micro digest wet decomposition apparatus (sulfuric-nitric acid decomposition) and alkaline melting.

A refractive index of cellulose ester film utilized in this invention is preferably 1.45-1.60 at 550 nm. A refractive index of film is measured based on Japanese Industrial Standard JIS K 7105 by use of an Abbe's refractometer. Further, a refractive index of each layer of an antireflection layer, which will be described later, is calculated from a 5° normal reflection spectrum of thin film comprising each coated layer. Cellulose ester can be incorporated with an additive such as a plasticizer, an ultraviolet absorbent, an antioxidant and a matting agent.

(Plasticizer)

A plasticizer is not specifically limited; however, it is preferable to incorporate at least one type of plasticizer selected from such as a polyhydric alcohol ester type plasticizer, a phosphoric ester type plasticizer, phthalic ester, citric ester, fatty acid ester, a glycol type plasticizer and polybasic carboxylic ester. Among them, at least one type is preferably a polyhydric alcohol ester type plasticizer.

A polyhydric alcohol ester type plasticizer is comprised of ester of aliphatic polyhydric alcohol of not less than divalent and monocarboxylic acid, and it is preferably provided with an aromatic or cycloalkyl ring in a molecule. Preferable is aliphatic polyhydric alcohol ester having 2-20 valences.

Polyhydric alcohol utilized in this invention is represented by following general formula (1).

$$R_1—(OH)_n \quad \text{Formula (1)}$$

wherein, $R_1$ is a n-valent organic group, n is an integer of at least 2, and OH group is an alcoholic and/or phenolic hydroxyl group.

Examples of preferable polyhydric alcohol include the followings; however, this invention is not limited thereto. Preferably listed are such as adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylol propane, trimethylol ethane and xylitol. Specifically preferable are triethylene glycol, tetraethylene glycol, dipropylene glycol, tripropylene glycol, sorbitol, trimethylol propane and xylitol.

Carboxylic acid utilized in polyhydric alcohol ester of this invention is not specifically limited and such as commonly known aliphatic monocarboxylic acid, alicyclic monocarboxylic acid and aromatic monocarboxylic acid can be utilized. Alicyclic monocarboxylic acid and aromatic monocarboxylic acid are preferably employed with respect to improvement of moisture permeability and storage stability.

Examples of preferable monocarboxylic acid include the following; however, this invention is not limited thereto.

As aliphatic monocarboxylic acid, aliphatic acid provided with a straight chain or a side chain having a carbon number of 1-32 can be preferably utilized. The carbon number is more preferably 1-20 and specifically preferably 1-10. It is preferred to incorporate acetic acid because compatibility with cellulose ester is increased, and it is also preferable to utilize acetic acid and other monocarboxylic acid in combination.

Preferable aliphatic monocarboxylic acid includes saturated fatty acid such as acetic acid, propionic acid, butyric acid, valerie acid, caproic acid, enanthic acid, caprylic acid, pelargonic acid, capric acid, 2-ethyl-hexanic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acid such as undecylenic acid, oleic acid, sorbic acid, linoleic acid, linolenic acid and arachidonic acid.

Examples of preferable alicyclic monocarboxylic acid include cyclopentane carboxylic acid, cyclohexane carboxylic acid, cyclooctane carboxylic acid and derivatives thereof.

Examples of preferable aromatic monocarboxylic acid include those, in which an alkyl group is introduced in a benzene ring of benzoic acid, such as benzoic acid and toluic acid; and aromatic monocarboxylic acid provided with at least two benzene rings such as biphenyl carboxylic acid, naphthalene carboxylic acid and tetralin carboxylic acid. Specifically preferable is benzoic acid.

A molecular weight of polyhydric alcohol ester is not specifically limited, however, is preferably 300-1,500 and more preferably 350-750. The molecular weight is preferably the larger because of decreased volatility, while the molecular weigh is preferably the smaller with respect to moisture permeability and compatibility with cellulose ester.

Carboxylic acid utilized in polyhydric alcohol ester may be either one type or a mixture of at least two types. Further, OH groups in polyhydric alcohol may be all esterified or partly remain as an OH group.

In the following, specific examples of polyhydric alcohol ester will be shown.

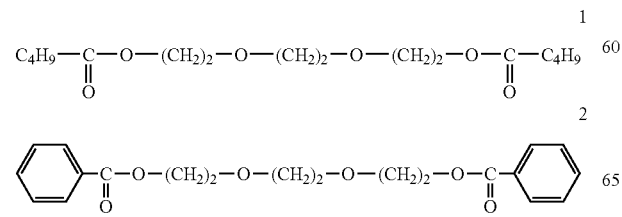

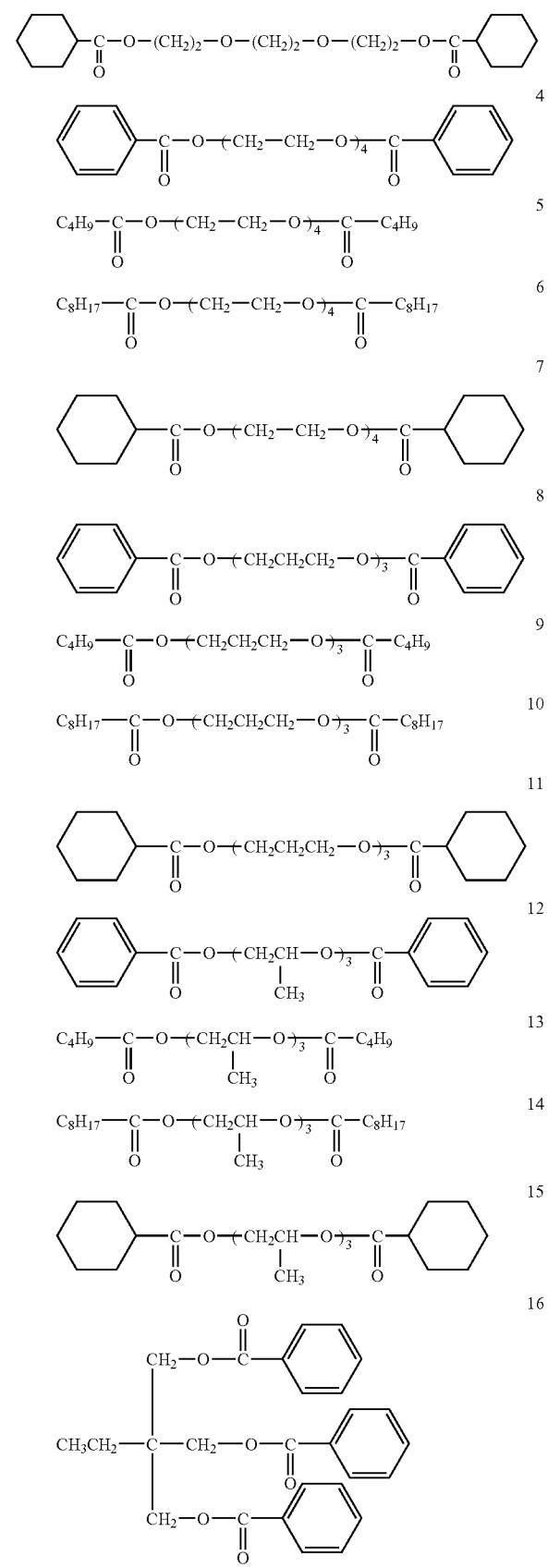

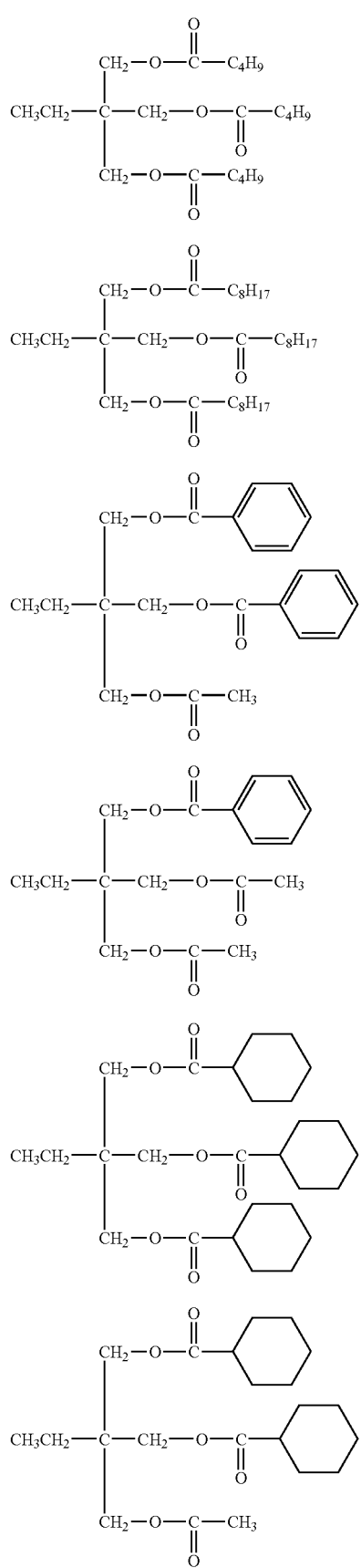
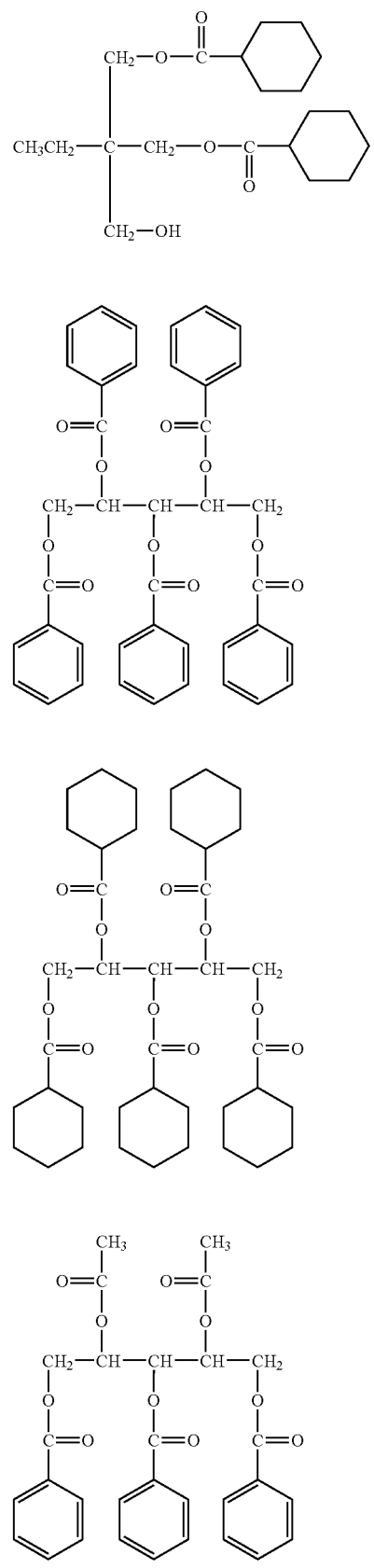

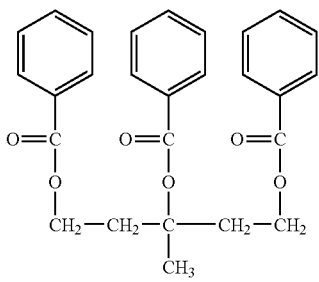

27

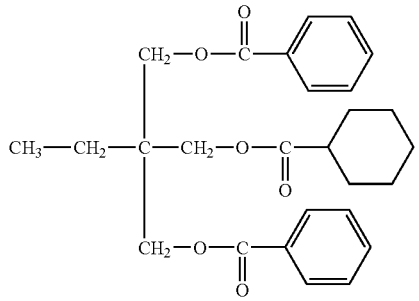

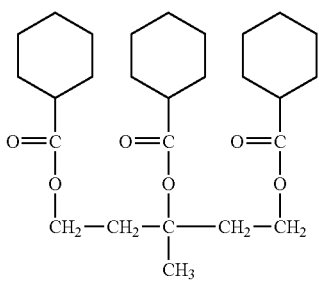

28

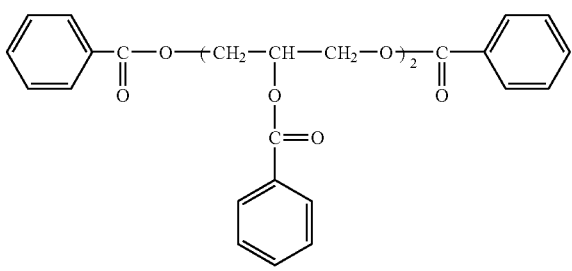

29

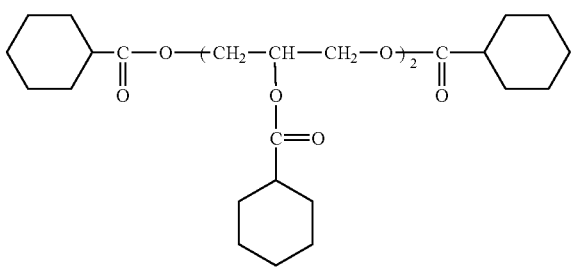

30

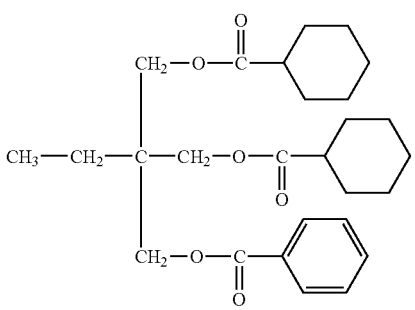

31

A glycolate type plasticizer is not specifically limited; however alkylphthalyl alkylglycolates can be preferably utilized. Alkylphthalyl alkylglycolates include such as methylphthalyl methylglycolate, ethylphthalyl ethylglycolate, propylphthalyl propylglycolate, octylphthalyl octylglycolate, methylphthalyl ethylglycolate, ethylphthalyl methylglycolate, ethylphthalyl propylglycolate, methylphthalyl butylglycolate, ethylphthalyl butylglycolate, butylphthalyl methylglycolate, butylphthalyl ethylglycolate, propylphthalyl butylglycolate, butylphthalyl propylglycolate, methylphthalyl octylglycolate, ethylphthalyl octylglycolate, octylphthalyl methylglycolate and octylphthalyl ethylglycolate.

A phthalic ester type plasticizer includes such as diethyl phthalate, dimethoxy ethylphthalate, dimethyl phthalate, dioctyl phthalate, dibutyl phthalate, di-2-ethylhexyl phthalate, dioctyl phthalate, dicyclohexyl phthalate and dicyclohexyl terephthalate.

A citric ester type plasticizer includes such as acetyltrimethyl citrate, acetyltriethyl citrate and acetyltributyl citrate.

A fatty acid ester type plasticizer includes such as butyl oleate, methylacetyl ricinoleate and dibutyl cebacate.

A polyhydric carboxylic plasticizer can be also preferably utilized. Specifically, polyhydric carboxylic plasticizers described in paragraph No. [0015]-[0020] of JP-A 2002-265639 can be preferably incorporated as one of plasticizers.

A phosphoric ester plasticizer includes such as triphenyl phosphate, tricresyl phosphate, cresyl diphenyl phosphate, octyl diphenyl phosphate, diphenyl biphenyl phosphate, trioctyl phosphate and tributyl phosphate.

The total content of a plasticizer in cellulose ester is preferably 5-30 weight % against the total solid content. It is preferably 5-20 weight %, more preferably 6-16 weight % and specifically preferably 8-13 weight %. Further, each content of two types of plasticizers is at least not less than 1 weight % and preferably not less than 2 weight % respectively.

(Ultraviolet Absorbent)

Cellulose ester film according to this invention may be incorporated with an ultraviolet absorbent. An ultraviolet absorbent is aimed to improve durability by absorbing ultraviolet rays not longer than 400 nm, and is incorporated so as to make a transparency of not more than 10%, more preferably not more than 5% and furthermore preferably not more than 2%, specifically at a wavelength of 370 nm.

An ultraviolet absorbent utilized in this invention is not specifically limited and includes such as an oxybenzophenone type compound, a berizotriazole type compound, a salicyclic acid ester type compound, a benzophenone type compound, a cyanoacrylate type compound, a triazine type compound, a nickel complex salt type compound and an inorganic powder.

Cellulose ester utilized in this invention can be incorporated with micro-particles.

An amount of micro-particles incorporated in film can be decreased by forming convex portions by a method of this invention. Thereby, provide can be film exhibiting excellent transparency and excellent handling characteristics.

Micro-particles of silicon dioxide are available on the market under a product name of such as Aerosil R972, R972V, R974, R812, 200, 200V, 300, R202, OX50 and TT600 (manufactured by Nippon Aerosil Co., Ltd.), which can be utilized.

Micro-particles of zirconium oxide are available on the market under a product name of such as Aerosil R976 and R811 (manufactured by Nippon Aerosil Co., Ltd.), which can be utilized.

Examples of polymer include silicone resin, fluorine resin, cross-linked acrylic resin and cross-linked polystyrene resin. Silicone resin is preferable and those having a three dimensional net work structure are preferable, and these are available on the market under a product name of such as Tosperl 103, 105, 108, 120, 145, 3120 and 240 (manufactured by Toshiba Silicone Co., Ltd.), which can be utilized.

Among them, Aerosil 200V and Aerosil R972V are specifically preferably utilized because of a large effect to decrease a coefficient of friction while keeping lower turbidity of cellulose ester. In cellulose ester utilized in this invention, a coefficient of dynamic friction on the surface side opposite to an actinic ray curable resin layer is preferably not more than 1.0 and more preferably 0.1-0.8. Further, a coefficient of dynamic friction on the surface, on which an actinic ray curable resin layer is to be provided, is not more than 1.0.

(Dye)

Cellulose ester film utilized in this invention may be incorporated with dye to adjust the tint. For example, blue dye may be added to restrain a yellowish tint of film. Preferable dye includes anthraquinone type dye.

Anthraquinone type dye may be provided with a substituent at an arbitrary position from 1-position to 8-position of an anthraquinone. A preferable substituent includes an aniline group, a hydroxyl group, an amino group, a nitro group or a hydrogen atom. It is specifically preferable to incorporate blue dye, particularly anthraquinone dye, described in paragraph No. [0034]-[0037] of JP-A 2001-154017. Further, infrared absorbing dye is preferably incorporated and preferable is any one of thiopyrilium squarylium dye, thiopyrilium croconium dye, pyrilium squarylium dye and pyrylium croconium dye which are described in JP-A 154017. Specifically, infrared absorbing dye represented by formula (1) or (2) of said patent document can be preferably incorporated.

Various additives may be added batch-wise into a dope which is a cellulose ester containing solution before casting or may be added inline-wise by separately preparing an additive solution. In particular, a part of or the total of micro-particles are preferably added inline-wise to decrease a load to a filtering material.

In the case of inline addition of an additive solution, it is preferable to dissolve a small amount of cellulose ester therein to improve compatibility with a dope. The preferable amount of cellulose ester is 1-10 weight parts and preferably 3-5 weight parts against 100 weight parts of a solvent.

To perform inline addition and mixing in this invention, an inline mixer such as Static Mixer (manufactured by Toray Engineering Corp.) and SWJ (Toray Static Type Inline Mixer, Hi-Mixer) is preferably utilized.

(Manufacturing Method of Cellulose Ester Film)

Next, cellulose ester film utilized in this invention will be explained.

Manufacturing of cellulose ester film utilized in this invention is performed by a process to dissolve cellulose ester and additives in a solvent to prepare a dope, a process to cast the dope on a belt form or a drum form metal support, a process to dry the cast dope to make a web, a process to peel off the web from a metal support, a process to stretch the web or to hold the width, a process to further dry the web, and a process to wind up the finished film.

A process to prepare a dope will be now described. The concentration of cellulose ester in a dope is preferably the higher with respect to decreasing a drying load after the dope has been cast on a metal support, while filtering precision will be deteriorated due to an increased load at the time of filtering when the concentration of cellulose ester is excessively high. The concentration to balance these is preferably 10-35 weight % and more preferably 15-25 weight %.

A solvent utilized in a dope of this invention, one type alone or at least two types in combination may be utilized, however, a good solvent and a poor solvent of cellulose ester are preferably utilized in combination with respect to manufacturing efficiency. A preferable range of a mixing ratio of a good solvent to a poor solvent is 70-98 weight % of good solvent to 2-30 weight % of a poor solvent. As a good solvent and a poor solvent, one dissolves utilized cellulose ester by itself alone is defined as a good solvent and one swells or can not dissolve cellulose ester alone is defined as a poor solvent. Therefore, a good solvent and a poor solvent may differ depending on an average acetylation degree (an acetyl substitution degree), and for example, when acetone is utilized as a solvent, it becomes a good solvent for acetic ester of cellulose ester (an acetyl substitution degree of 2.4) and cellulose acetate propionate; while it becomes a poor solvent for acetic ester of cellulose (an acetyl substitution degree of 2.8) of cellulose.

A good solvent utilized in this invention is not specifically limited, however, includes an organic halogen compound such as methylene chloride, dioxolans, acetone, methylacetate and methyl acetoacetate. Methylene chloride and methyl acetate are specifically preferable.

Further, a poor solvent utilized in this invention is not specifically limited, however, such as methanol, ethanol, n-butanol, cyclohexane and cyclohexanone are preferably utilized. Further, a dope is preferably contains 0.01-2 weight % of water.

As a dissolution method of cellulose ester at the time of preparation of the dope described above, a general method can be employed. By combination of heating and increased pressure, it is possible to heat up to higher than a boiling point at an ordinary pressure. It is preferable because generation of a granular insoluble residue, which is called as gel or flocculates, is inhibited, when cellulose ester is dissolved with stirring while being heated at a temperature in a range of not lower than a boiling point under ordinary pressure and not to boil the solvent under increased pressure. Further, preferably utilized is a method, in which cellulose ester is dissolved by further adding a good solvent after having been wetted or swelled by mixing with a poor solvent.

Pressure increase may be performed by a method to introduce an inert gas such as a nitrogen gas or a method to increase vapor pressure of a solvent by heating. Heating is preferably performed from outside, and for example, jacket type equipment is preferable with respect to easy temperature control.

Heating temperature with addition of a solvent is preferably the higher in view of solubility of cellulose ester; however, productivity may be deteriorated due to increase of a required pressure when the heating temperature is excessively high. The heating temperature is preferably 45-120° C. more preferably 60-110° C. and furthermore preferably 70-105° C. Further, pressure is adjusted not to boil a solvent at the set temperature.

In addition to these, a cold dissolution method is also preferably applied, and cellulose ester can be dissolved in such as methyl acetate by this method.

Next, this cellulose ester solution is filtered by use of a suitable filter medium such as filter paper. As a filter medium, the absolute filtering precision is preferably the smaller to eliminate insoluble residue, however, there is a problem of easy clogging of a filter medium when the absolute filtering precision is excessively small. Therefore, the absolute filtering precision of a filter medium is preferably not larger than 0.008 mm, more preferably 0.001-0.008 mm and furthermore preferably 0.003-0.006 mm.

The material of a filter medium is not specifically limited and an ordinary filter medium can be utilized, however, a filter medium made of plastic such as polypropylene and Teflon (a registered trade mark) and a filter medium made of metal such as stainless steel are preferable because of such as no release of fiber of a filter medium. It is preferable to eliminate and reduce impurities and particularly foreign matter causing a bright spot defect, having been contained in cellulose ester as a raw material, by filtration.

Foreign matter causing bright spot defects means a spot (foreign matter) which is visible due to light leak, when two sheets of polarizing plates, between which polarizing plate protective film is placed, are arranged in a crossed nicols state, and light is irradiated from one of the polarizing plate side to be observed from the other polarizing plate side. The number of bright spots having a diameter of not less than 0.01 mm is preferably not more than 200 spots/cm$^2$, more preferably not more than 100 spots/cm$^2$, furthermore preferably not more than 50 spots/cm$^2$ and most preferably 0-10 sport/cm$^2$. Further, the number of a bright spot defect of not larger than 0.01 mm is also preferably the smaller.

Filtering of a dope can be performed by an ordinary method, however, a method to filter while heating at a temperature of not lower than a boiling point of a solvent at ordinary pressure and of not to boil the solvent under an increased pressure is preferable because of small increase of a difference of filter pressures between before and after filtering (referred to as a pressure difference). The preferable temperature is 45-120° C., more preferably 45-70° C. and furthermore preferably 45-55° C.

Filter pressure is preferably the lower. The filter pressure is preferably not higher than 1.6 MPa, more preferably not higher than 1.2 MPa and furthermore preferably not higher than 1.0 MPa.

Casting of a dope will now be explained.

A metal support in a casting process is preferably those the surface of which is mirror finished, and a stainless steel belt or a drum made of castings, the surface of which is plating finished, is utilized. The cast width can be set to 1-4 m. The surface temperature of a metal support in a cast process is from −50° C. to lower than a boiling point of a solvent not to cause foaming. It is preferable the temperature is the higher since a drying speed of a web can be set faster; however, excessively high temperature may sometimes cause foaming of a web or deterioration of flatness. The support temperature is preferably 0-100° C. and more preferably 5-30° C. It is also a preferable method to make a web gelled by cooling and to peel off the web from a drum with a plenty of residual solvent contained. A method to control the temperature of a metal support is not specifically limited; however, there are a method to blow a hot wind or a cold wind on the web and a method to make hot water contact the rear side of a metal plate. A method to utilize hot water is preferable because time required to make a metal support become a constant temperature is short due to more efficient heat conduction. In the case of employing a hot wind, a wind of a temperature higher than the aimed temperature with prevention of foaming may be employed, while employing a hot wind of a temperature higher than a boiling point of a solvent, in consideration of temperature down of a web due to heat of evaporation of a solvent. In particular, it is preferable to efficiently perform drying by varying temperature of a support and temperature of a drying wind, from casting to peeling.

To provide a good flatness of polarizing plate protective film, the residual solvent amount at the time of peeling off a web from a metal support is preferably 10-150 weight %, more preferably 20-40 weight % or 60-130 weight % and specifically preferably 20-30 weight % or 70-120 weight %.

In this invention, a residual solvent amount is defined by the following equation.

$$\text{Residual solvent amount (weight \%)} = \{(M-N)/N\} \times 100$$

Herein, M is a weight of a sample picked at an arbitrary time during or after manufacturing of a web or film and N is a weight after heating at 115° C. for 1 hour. A residual solvent referred to in this invention means a solvent evaporates by the aforesaid treatment and, although not limited to the following, includes so called organic solvent such as methylene chloride, methanol, ethanol, butanol, isopropyl alcohol, methyl acetate, ethyl acetate, acetone, methyl ethyl ketone and propylene glycol monomethyl ether (PGME); however, also includes those comprising a substance, which has been added in film to provide film certain property, in the case of having been evaporated.

Further, in a drying process of polarizing plate protective film, a web is preferably peeled off from a metal support and further dried to make a residual solvent amount of not more than 1 weight %, more preferably not more than 0.1 weight % and specifically preferably 0-0.01 weight %.

In a film drying process, a roll drying method (in which a web is dried while being alternately passed through many rolls which are arranged up and down) or a method to dry a web while being transported by a tenter method will be applied, To prepare cellulose ester film for an optical film of this invention, it is specifically preferable that a web is stretched along the transport direction (MD stretching) immediately after having been peeled off from a metal support with a large amount of a residual solvent and is further stretched in the width direction by means of a tenter method to grip the both edges of the web by such as clips. The stretching magnification in either of the longitudinal and the width directions is preferably 1.05-1.3 times and more preferably 1.05-1.15 times. The area preferably becomes 1.12-1.44 times by longitudinal stretching and width stretching and more preferably 1.15-1.32 times. The value can be determined by (a stretching magnification in the longitudinal direction)×(a stretching magnification in the width direction).

To perform longitudinal stretch immediately after peel off, it is preferable to peel off at a peel-off tension of not less than 210 N/m and specifically preferably at 220-300 N/m.

A means to dry a web is not specifically limited, and it can be generally performed by such as a hot wind, ultraviolet rays, a heat roll and microwaves, however, preferably performed by a hot wind with respect to convenience.

A drying temperature in a drying process of a web is preferably raised step-wise in a range of 30-180° C., and more preferably in a range of 50-140° C. to improve dimension stability.

Variation of thickness of cellulose ester film is preferably within ±3%, more preferably within ±2% and specifically preferably within ±0.5%, with respect to either in the width direction and in the longitudinal direction.

An optical film of this invention is preferably provided with a width of 1-4 m. This invention can remarkably improve handling characteristics of large width film having a width of 1.4-4m.

(Physical Properties)

Moisture permeability of polarizing plate protective film according to this invention is not more than 850 g/m$^2$·24 h, preferably 20-800 g/m$^2$·24 h and specifically preferably 20-750 g/m$^2$·24 h, at 40° C., 90% RH. Moisture permeability can be measured according to a method described in JIB Z 0208.

Breaking ductility of cellulose ester film utilized in this invention is preferably 10-80% and more preferably 20-50%.

(Measurement of Breaking Ductility)

A sample having a size of 10 mm wide and 130 mm long is cut out from film having an arbitrary residual solvent content, and said sample, after having been stored at 23° C. and 55% RH for 24 hours, is subjected to a tensil test at a tensile speed of 100 mm/min in a chuck distance of 100 mm, whereby the breaking ductility can be determined.

Visible light transmittance of cellulose ester film utilized in this invention is preferably not less than 90% and more preferably not less than 93%.

(Measurement of Transmittance)

Transmittance T at 380, 400 and 500 nm can be calculated from spectral transmittance τ(λ) which has been determined at every 10 nm in the range of 350-700 nm of wavelength region with respect to each samples by use of Spectrophotometer U-3400 (manufactured by Hitachi Corp.).

Haze of cellulose ester film utilized in this invention is preferably less than 1%, more preferably less than 0.5% and specifically preferably 0-0.1%. Transmittance of visible light is preferably not less than 90%, more preferably not less than 92% and furthermore preferably not less than 94%.

(Haze Value)

Haze can be measured by use of Haze Meter (1001 DP Type, manufactured by Nippon Denshoku Industries Co., Ltd.) according to JIS K7105 and made to be an index of transparency.

Retardation values (Ro) and (Rt) can be determined according to the following equations.

$$Ro=(nx-ny)\times d$$

$$Rt=[(nx+ny)/2-nz]\times d$$

wherein, d is thickness of film (mm), nx is the maximum refractive index in the film plane, also referred to as a refractive index in the slow axis direction, ny is a refractive index in the direction perpendicular to the slow axis in the film plane, and nz is a refractive index in the thickness direction.

Herein, retardations (Ro), (Rt) and an angle between slow and fast axis can be measured by use of an automatic double refractometer. For example, these can be determined at 23° C. and 55% RH, at a wavelength of 590 nm, by use of KOBRA-21ADH (manufactured by Oji Scientific Instruments).

Further, the slow axis is preferably within ±1° of the width direction or within ±1° of the longitudinal direction.

In this invention, thermoplastic resin film comprising a multi-layer structure, which is prepared by co-casting, successive casting or coating, may be utilized.

Further, cellulose ester film described in paragraph No. [0036]-[0105] of JP-A 2000-352620 can be also utilized. In addition, cellulose ester film described in paragraph No. [0013]-[0124] of JP-A 2004-29199 is also preferably utilized.

In this invention, cellulose ester film available on the market can be also utilized. For example, cellulose ester film such as Konicaminolta TAC KC8UX, KC8UY, LC4UX, KC4UY, KC8UCR3, KC8UCR4 and KC8UX-H (manufactured by Konicaminolta Co., Ltd.) is utilized.

(Cycloolefin Polymer)

Cycloolefin polymer utilized in this invention is comprised of polymer resin containing an alicyclic structure.

Preferable cycloolefin polymer is resin in which cyclic olefin is polymerized or copolymerized. Cyclic olefin includes such as unsaturated hydrocarbon having a polycyclic structure such as norbornane, cyclopentadiene, tetracyclodecene, ethyltetracyclododecene, ethylidene tetracyclodecene and tetracyclo[7.4.0.110, 13.02, 7]trideca-2,4,6,11-tetraene and derivatives thereof; and unsaturated hydrocarbon having a monocyclic structure such as cyclobutene, cyclopentene, cyclohexene, 3,4-dimethylcyclopentene, 3-methylcyclohexene, 2-(2-methylbutyl)-1-cyclohexene, cyclooctene, 3a,5,6,7a-tetrahydro-4,7-methano-1H-indene, cycloheptene, cyclopentadiene and cyclohexadiene; and derivatives thereof. These cycloolefins may be provided with a polar group as a substituent. A polar group includes such as a hydroxyl group, a carboxyl group, an alkoxy group, an epoxy group, a glycidyl group, an oxycarbonyl group, a carbonyl group, an amino group, an ester group and a carboxylic acid anhydride group; and an ester group, a carboxyl group or a carboxylic acid anhydride group is preferred.

Preferable cycloolefin polymer may be those comprising monomer other than cycloolefin having been addition copolymerized. Monomer capable of addition copolymerization includes ethylene or α-olefin such as ethylene, propylene, 1-butene and 1-pentene; and dien such as 1,4-hexadiene, 4-methyl-1,4-hexadiene, 5-methyl-1,4-hexadiene and 1,7-octadiene.

Cycloolefin can be prepared by an addition polymerization reaction or a metathesis ring-opening-polymerization reaction. The polymerization is performed under the presence of a catalyst. A catalyst for addition polymerization includes such as a polymerization catalyst comprising a vanadium compound and an organo-aluminum compound. A catalyst for ring-opening-polymerization includes halogen compound of metal such as ruthenium, rhodium, palladium, osmium, iridium and platinum; a polymerization catalyst comprising nitrate salt or an acetylacetone compound with a reducing agent; and a polymerization catalyst comprising halogenide of metal such as titanium, vanadium, zirconium, tungsten and molybdenum with an organo-aluminum compound. Such as polymerization temperature and pressure is not specifically limited, however, polymerization is generally performed at a polymerization temperature of −50-100° C. and a polymerization pressure of 0-490 N/cm².

Cycloolefin polymer utilized in this invention is preferably those comprising cycloolefin, after having been polymerized or copolymerized, is subjected to a hydrogenation reaction to change an unsaturated bond in a molecule to a saturated bond. A hydrogenation reaction is performed by blowing hydrogen in the presence of a hydrogenation catalyst well known in the art. A hydrogenation catalyst includes a homogeneous phase catalyst comprising a combination of a transition metal compound/an alkyl metal compound such as cobalt acetate/triethyl aluminum, nickel acetylacetonato/triisobutyl aluminum, titanocene dichloride/n-butyl lithium, zirconocene dichloride/sec-butyl lithium and tetrabutoxy titanate/dimethyl magnesium; inhomogeneous catalyst such as nickel, palladium and platinum; an inhomogeneous type solid carrier catalyst employing a metal catalyst as a carrier such as nickel/silica, nickel/diatomaceous earth, nickel/alumina, palladium/carbon, palladium/silica, palladium/diatomaceous earth and palladium/alumina.

In addition, cycloolefin polymer also includes the following norbornane type polymer. Norbornane polymer is preferably provided with a norbornane skeleton as a repeating unit, and as the specific examples, those described in such as JP-A Nos. 62-252406, 62-252407, 2-133413, 63-145324, 63-264626 and 1-240517; Examined Japanese Patent Application Publication No. 57-8815; JP-A Nos. 5-39403, 5-43663, 5-43834, 5-70655, 5-279554, 6-206985, 7-62028, 8-176411 and 9-241484 can be preferably utilized, however, they are not limited thereto. Further, these may be utilized alone or in combination of at least two types.

In this invention, among the aforesaid norbornane type polymer, those having a repeating unit represented by any one of the following structural formula (I)-(IV) are preferable.

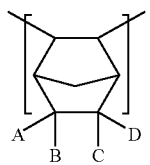

(I)

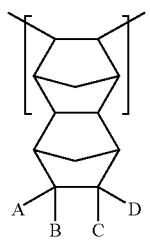

(II)

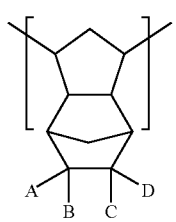

(III)

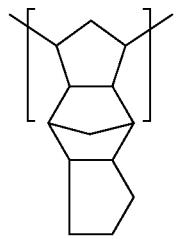

(IV)

In aforesaid structural formula (I)-(IV), A, B, C and D each independently are a hydrogen atom or a mono-valent organic group.

Further, among the aforesaid norbornane type polymer, also preferable is hydrogenated polymer which is prepared by hydrogenation of polymer prepared by metathesis polymerization of at least one type of compounds represented by following structure (V) or (VI) and unsaturated cyclic compound polymerizable therewith.

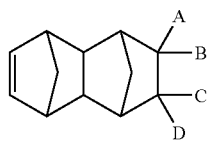

(V)

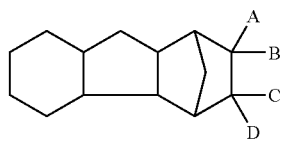

(VI)

In the aforesaid structural formula, A, B, C and D each are independently a hydrogen atom or a mono-valent organic group.

Herein, the aforesaid structural formula, A, B, C and D are not specifically limited, however, is preferably a hydrogen atom, a halogen atom, a mono-valent organic group, or may be connected with an organic group via a connecting group of at least di-valent; and these may be identical to or different from each other. Further, A or B and C or D may form a mono-cyclic ring or a polycyclic structure. Wherein, the above-described connecting group of at least di-valent contains a hetero atom represented by an oxygen atom, a sulfur atom and a nitrogen atom and includes such as ether, ester, carbonyl, urethane, amide and thioether, however, is not limited thereto. Further, the above-described organic group may be further substituted via the above-described connecting group.

Further, as other monomer co-polymerizable with norbornane type monomer, α-olefin having a carbon number of 2-20 such as ethylene, propylene, 1-butene, 1-pentane, 1-hexene, 1-octene, 1-decene, 1-dodecene, 1-tetradecene, 1-hexadecene, 1-octadecene, 1-eicosene and derivatives thereof; cycloolefin such as cyclobutene, cyclopentene, cyclohexene, cyclooctene, 3a,5,6,7a-tetrahydro-4,7-methano-1H-indene and derivatives thereof; and non-covalent diene such as 1,4-hexadiene, 4-methyl-1,4-hexadiene, 5-methyl-1,4-hexadiene and 1,7-octadiene are utilized. Among them, α-olefin is preferable and ethylene is specifically preferable.

These other monomers co-polymerizable with norbornane type monomer each can be utilized alone or in combination of at least two types. In the case of addition co-polymerization of norbornane type monomer and other monomer co-polymerizabl co-polymerizable therewith, a ratio of a structural unit arising from norbornane type monomer to a structural unit arising from copolymerizable other monomer in addition co-polymer is suitably selected to be in arrange of generally 30/70-99/1, preferably 50/50-97/3 and more preferably 70/30-95/5.

In the case of making unsaturated bonds remaining in a molecular chain of synthesized polymer be saturated by a. hydrogenation reaction, a hydrogenation ratio is not less than 90%, preferably not less than 95% and specifically preferably not less than 99%, in view of light fastness and weather-proofing.

In addition to these, cycloolefin polymer utilized in this invention includes thermoplastic saturated norbornane type resin described in paragraph No. [0014]-[0019] of JP-A 5-2108, thermoplastic norbornane type resin described in paragraph No. [0015]-[0031] of JP-A 2001-277430, thermoplastic norbornane type resin described in paragraph No. [0008]-[0045] of JP-A 2003-14901, norbornane type resin described in paragraph No. [0014]-[0028] of JP-A 2003-139950, norbornane type resin described in paragraph No. [0029]-[0037] of JP-A 2003-161832, norbornane type resin described in paragraph No. [0027]-[0036] of JP-A 2003-195268, alicyclic structure containing polymer resin described in paragraph No. [0009]-[0023] of JP-A 2003-211589, norbornane type polymer resin or vinyl alicyclic hydrocarbon polymer resin described in paragraph No. [0008]-[0024] of JP-A 2003-211588.

Specifically preferably utilized are such as Zeonex and Zeonoa manufactured by Nippon Zeon Co., Ltd.; Arton, manufactured by JSR Co., Ltd.; and Apel such as APL8008T, APL6509T, APL6013T, APL5014DP and APL6015T, manufactured by Mitsui Chemical Co., Ltd.

The molecular weight of cycloolefin polymer utilized in this invention is suitably selected depending on applications, however, it is preferable that mechanical strength of a molded body and processing property are highly balanced when the molecular weight is generally in a range of 5,000-500,000, preferably of 8,000-200,000 and more preferably of 10,000-100,000.

Further, when 0.01-5 weight parts of an antioxidant having a low volatility is blended against 100 weight parts of cycloolefin polymer, it is possible to effectively prevent decomposition and tinting of polymer at the time of a molding process.

As for an antioxidant, an antioxidant having a vapor pressure of not higher than $10^{-5}$ Pa and specifically preferably of not higher than $10^{-8}$ Pa is preferred. An antioxidant having a vapor pressure of not lower than $10^{-5}$ Pa causes problems of foaming at the time of extrusion molding and vaporization of an antioxidant from the surface of a molded product when it is exposed to high temperature.

An antioxidant utilized in this invention includes such as the followings, and one type or a combination of a few types may be utilized.

Hindered phenol type: such as 2,6-di-t-butyl-4-methylphenol 2,6-di-t-butylphenol, 4-hydroxymethyl-2,6-di-t-butylphenol, 2,6-di-t-butyl-α-methox-p-dimethyl-phenol, 2,4-di-t-amylphenol, t-butyl-m-cresol, 4-t-butylphenol, styrenated phenol, 3-t-butyl-4-hydroxyanisol, 2,4-dimethyl-6-t-butylphenol, octadecyl-3-(3,5-di-t-butyl-4-hydroxyphenyl)propionate, 3,5-di-t-butyl-4-hydroxybenzyl phosphonate-diethylester, 4,4'-bisphenol, 4,4'-bis-(2,6-di-t-butylphenol), 2,2'-methylene-bis-(4-methyl-6-t-butylphenol), 2,2'-methylene-bis-(4-methyl-6-α-methylcyclohexylphnol), 4,4'-methylene-bis-(2-methyl-6-t-butylphenol), 4,4'-methylene-bis-(2,6-di-t-butylphenol), 1,1'-methylene-bis-(2,6-di-t-butylnaphthol), 1,1'-methylene-bis-(2,6-di-t-butylnaphthol), 4,4'-butylydene-bis-(2,6-di-butyl-metha-crezole), 4,4'-butylidene-bis-(2,6-di-t-butyl-meta-crezol), 2,2-thio-bis-(4-methyl-6-t-butylphenol), di-o-cresolsulfide, 2,2'-thio-bis-(2-methyl-6-t-butylphenol), 4,4'-thio-bis(3-methyl-6-t-butylphenol), 4,4'-thio-bis-(2,3-di-sec-amylphenol), 1,1'-thio-bis-(2-naphthol), 3,5-di-t-butyl-4-hydroxybenzyl ether, 1,6-hexanediol-bis[3-(3,5-di-t-butyl-4-hydroxyphenyl)propionate], 2,4-bis-(n-octylthio)-6-(4-hydroxy-3,5-di-t-butylanilino)-1,3,5-triazine, 2,2'-thio-diethylenebis[3-(3,5-di-t-butyl-4-hydroxyphenyl) propionate], 2,2-thiobis(4-methyl-6-t-butylphenol), N,N-hexamethylenebis(3,5-di-t-butyl-4-hydroxy-hydrocynamide), bis(3,5-di-t-butyl-4-hydroxybenzyl ethylphosphonate)calcium, 1,3,5-trimethyl-2,4,6-tris-(3,5-di-t-butyl-4-hydroxybenzyl)benzene, triethylene glycol-bis [3-(3-t-butyl-5-methyl-4-hydroxyphenyl)propianate], 1,3,5-trimethyl-2,4,6-tris(3,5-di-t-butyl-4-hydroxyphenyl) benzene, tris-(3,5-di-t-butyl-4-hydroxybenzyl)-isocyanurate, and pentaerythrityl-tetrakis[3-(3,5-di-t-butyl-4-hydroxyphenyl)propionate].

Aminophenoles: such as normal butyl-p-aminophenol, normal butyroyl-p-aminophenol, normal pelagonoyl-p-aminophenol, normal lauroyl-p-aminophenol, normal stearoyl-p-aminophenol, 2,6-di-t-butyl-α-dimethyl and amino-p-cresol.

Hydroquinones: such as hydroquinone, 2,5-di-t-butylhydroquinone, 2,5-di-t-amylhydroquinone, hydroquinone methyl ether and hydroquinone monobenzyl ether.

Phosphite type triphosphite, tris(3,4-di-t-butylphenyl) phosphate, tris(nonylphenyl)phosphate, tetrakis(2,4-di-t-butylphenyl)-4,4'-biphenylene phosphanite and 2-ethylhexyloctyl phosphite Others: such as 2-mercaptobenzothiazole zinc salt, dicatecol borate-di-o-tolyguanidine salt, nickel-dimethylthiocarbamate, nickel-pentamethylene dithiocarbanate, mercapto-benzimidazole and 2-mercaptobenzimidazole zinc salt.

Cycloolefin film may appropriately contain additives which are generally blended in plastic film. Such additives include a thermal stabilizer, an anti-fading agent, an ultraviolet absorbent, an anti-static agent, a sliding agent and filler, and the addition amount thereof can be selected in a range not to disturb the object of this invention.

Cycloolefin polymer preferably has a surface wetting tension of preferably not less than 40 mN/m, more preferably not less than 50 mN/m and furthermore preferably not less than 55 mN/m. When the surface wetting tension is in the above-described range, adhesion strength between film and a polarizer will be increased. To adjust the surface wetting tension, such as a corona discharge treatment, an ozone blowing treatment, ultraviolet irradiation, a flame treatment, a chemical treatment and other surface treatment well known in the art can be provided.

A sheet before stretching is necessary to have a thickness of approximately 50-500 μm, the thickness unevenness is preferably the smaller to be within ±8%, preferably within ±6% and more preferably within ±4%.

The above-described cycloolefin polymer can be stretched in the uniaxial direction similar to cellulose ester, and may be subjected to biaxial stretching by further being stretched in the direction perpendicular to said direction. To perform stretching, it is preferable to employ such as the aforesaid tenter device.

The stretching magnification is 1.1-10 times and preferably 1.3-8 times.

Stretching is generally performed in a temperature range of Tg of resin constituting a sheet–Tg 50° C. and more preferably of Tg–Tg+40° C. Break will be caused when the stretching temperature is excessively low, while molecular orientation is not possible when it is excessively high.

Film prepared in this manner can be provided with a desired magnitude of retardation due to oriented molecules by stretching. A desired retardation value in this invention is −400-400 nm as Rt and 1-300 nm as Ro.

(Polycarbonate Type Polymer)

There are various types of polycarbonate type resins utilized to prepare polycarbonate type polymer; however, aromatic polycarbonate is preferable in view of chemical properties and physical properties, and bisphenol A type polycarbonate is specifically preferable. Among them, more preferably listed are those employing a bisphenol derivative in which such as a benzene ring, a cyclohexane ring or a aliphatic hydrocarbon group is introduced into bisphenol A, however, specifically preferable is polycarbonate which is prepared by utilizing a derivative in which these groups are asymmetrically introduced against the central carbon and has a structure in which anisotropy in a unit molecule is reduced. For example, polycarbonate prepared by substituting two methyl groups at the central carbon of bisphenol A by a benzene ring, or prepared by substituting one hydrogen of each benzene ring of bisphenol A by such as a methyl group or a phenyl group asymmetrically against the central carbon.

Specifically listed are those prepared by a phosgene method or an ester exchange method from 4,4′-dihydroxydiphenylalkane or a halogen substitute thereof such as 4,4′-dihydroxydiphenylmethane, 4,4′-dihydroxydiphenylethane and 4,4′-dihydroxydiphenylbutane.

Phase difference film comprising polycarbonate utilized in this invention may be utilized by mixing with transparent resin such as polystyrene type resin, methylmethacrylate type resin or cellulose acetate type resin, or polycarbonate type resin may be accumulated at least on one surface of cellulose acetate type film. A preparation method of polycarbonate type film utilizable in this invention is not specifically limited. That is, any one of film by an extrusion method, by a solution cast method and a calendar method may be utilized. In this invention, prepared can be polycarbonate type film satisfying the relation of equation (1) of elastic module $\epsilon_s$ and elastic module $\epsilon_f$ and the range of a phase difference value between the in-plane direction and the in-thickness direction, by employing either uniaxial stretching or biaxial stretching and according to a manufacturing method similar to a preferable manufacturing method of cellulose ester film.

As polycarbonate type film utilized in this invention, preferably utilized are those having a glass transition temperature (Tg) of not lower than 110° C. and a water absorption rate (a value measured under a condition of 23° C. water for 24 hours) of not more than 0.3%. Those having Tg of not lower than 120° C. and a water absorption rate of not more than 0.2% are more preferably utilized.

(Polylactic Acid Type Polymer)

In this invention, transparent substrate film employing polylactic acid type polymer can be also utilized. Polylactic acid type polymer includes polylactic acid or copolymer of lactic acid with other hydroxycarboxylic acid. Polylactic acid type polymer is utilized alone or in combination of at least two types.

Lactic acid includes L-lactic acid and D-lactic acid. As lactic acid, L-lactic acid is preferable. Other hydroxycarboxylic acid includes such as glycol acid, 3-hydroxybutyric acid, 4-hydroxybutyric acid, 3-hydroxyvaleric acid, 4-hydroxyvaleric acid and 6-hydroxycaproic acid. Herein, in this invention, as polylactic acid type polymer constituting substrate film, preferable is polylactic acid a polymer component thereof is comprised of only lactic acid.

A polymerization method of polylactic acid type polymer is not specifically limited and any method well known in the art such as a condensation polymerization method and a ring-opening-polymerization can be employed. The weight average molecular weight of polylactic acid type polymer is preferably approximately 10,000-1,000,000. Further, as polylactic acid type polymer, to further increase the molecular weight, utilized may be those in which a small amount of a chain elongation agent and a cross-linking agent such as polyisocyanate compound, a polyepoxy compound and acid anhydride is utilized.

Polylactic acid type film is comprised of the aforesaid polylactic acid type polymer as a primary component, however, may be blended with other polymer materials not to disturb the effects of this invention. Other polymer materials include such as polyester, polyolefin, polystyrene, poly (meth)acrylonitrile, a cellulose type material, polyvinyl alcohol, polyamide, polyvinyl acetate and polyphenyleneoxide, other than polylactic acid. Herein, it is not preferable to blend aliphatic polyester in polylactic acid type polymer. Milky whitening is liable to generated in polylactic acid type film in the case of being stored under a heated and elevated humidity condition when aliphatic polyester is blended; which is not preferable.

Further, polylactic acid type film may be added with an additive such as a plasticizer, a sliding agent, inorganic filler, an ultraviolet absorbent and an antistatic agent to adjust molding processing characteristics and film physical properties.

A manufacturing method of polylactic acid type film is not specifically limited. For example, a composition comprising the aforesaid polylactic acid type polymer as a primary component may be formed into a film form by a melt extrusion method. Further, polylactic acid type film may be uniaxially or bi-axially stretched by such as a roll method and a tenter method. Stretched film is preferable because of superior strength. Bi-axially stretched film is specifically preferable. The stretching magnification is not specifically limited, however, is preferably set to not more than 5 times and more preferably to 1.5-5 times.

The thickness of polylactic acid type film as substrate film is generally not less than 10 μm, preferably not less than 15 μm, more preferably 20-200 μm.

<Hardcoat Layer>

A hardcoat layer is preferably coated on the surface on which a micro convex structure is provided or on the opposite surface thereto, of the aforesaid thermoplastic resin. A hardcoat layer is preferably one containing an actinic ray curable resin and micro-particles.

Micro-particles include inorganic micro-particles and organic micro-particles. Micro-particles utilizable in this invention include such as silicon oxide, aluminum oxide, tin oxide, indium oxide, ITO, zinc oxide, zirconium oxide, antimony oxide, magnesium oxide, calcium carbonate, calcium carbonate, talc, clay, calcined kaolin, calcined calcium silicate, calcium silicate hydrate, aluminum silicate, magnesium silicate and calcium phosphate or complex oxide thereof.

Among these, such as silicon oxide, titanium oxide, tin oxide, indium oxide, ITO, zirconium oxide and antimony oxide or complex oxide thereof are preferably utilized.

As organic micro-particles, such as poly(meth)acrylate type resin, silicone type resin, polystyrene type resin, polycarbonate type resin, acrylstyrene type resin, benzoguanamine type resin, melamine resin, polyolefin type resin, polyester type resin, polyamide type resin, polyimide type resin and polyfluoroethylene type resin can be utilized. It is specifically preferable to incorporate conductive micro-particles.

Micro-particles having a particle size of 5 nm-10 μm are utilized, however, particles having a particle size of 5 nm-5 μm are preferable. In particular, particles having a diameter not smaller than a mean layer thickness of a hardcoat layer are useful to form an antiglare hardcoat layer. In the case of not providing antiglare property, particles having a particle size of 5 nm-1 μm are preferably incorporated. Micro-particles having different compositions, particle sizes and refractive indexes can be utilized in combination. For example, a combination of micro-particles of silicon oxide and zirconium oxide, or silicon oxide and ITO can be utilized.

Actinic ray curable resin refers to resin which cures via such as a cross-linking reaction by actinic ray irradiation of such as ultraviolet rays and electron rays. For example, a component containing monomer having an ethylenic unsaturated double bond is preferably utilized, and a hardcoat layer is formed by being cured with irradiation of actinic rays such as ultraviolet rays or electron rays. Actinic ray curable resin include such as ultraviolet curable resin and electron ray curable resin as a typical example, however, resin curable with ultraviolet irradiation is preferable.

As ultraviolet curable resin, for example, ultraviolet curable urethaneacrylate type resin, ultraviolet curable polyesteracrylate type resin, ultraviolet curable epoxyacrylate type resin, ultraviolet curable polyolacrylate type resin or ultraviolet curable epoxy resin is preferably utilized.

Ultraviolet curable acrylurethane resin can be easily prepared by making a product, which has been obtained by making polyester polyol react with isocyanate monomer or prepolymer, followed by a further reaction with acrylate type monomer having a hydroxyl group such as 2-hydroxyethylacrylate, 2-hydroxyethylmethacrylate (hereinafter, only acrylate is expressed as acrylate includes methacrylate) and 2-hydroxypropylacrylate. For example, those described in JP-A 59-151110 can be utilized.

For example, a mixture of 100 parts of Unidic 17-806 (manufactured by Dainippon Ink & Chemicals, Inc.) and 1 part of Coronate L (manufactured by Nippon Polyurethane Industry Co., Ltd.) is preferably utilized.

Ultraviolet curable polyester acrylate type resin includes those easily formed by generally making polyester polyol react with 2-hydroxyethyl acrylate or hydroxyacrylate type monomer, and those described in JP-A 59-151112 can be utilized.

Specific examples of ultraviolet curable epoxyacrylate type resin includes those prepared by making epoxyacrylate as oligomer be added and react with a reaction diluent and a photo-reaction initiator, and those described in JP-A 1-105738 can be utilized.

Specific examples of ultraviolet curable epoxyacrylate type resin include such as trimethylolpropane acrylate, dimethylolpropane tetraacrylate, pentaerythritol triacrylate, pentaerythritol tetraacrylate, pentaerythritol hexaacrylate and alkyl modified dipentaerythritol pentaacrylate.

A photo-reaction initiator of these ultraviolet curable resins specifically include benzoin and derivatives thereof; acetophenone, benzophenone, hydroxybenzophenone, Michler's ketone, α-amyloxime ester, thioxantone and derivatives thereof. A photo-reaction initiator may be utilized together with a photo-sensitizer. The above-described photo-reaction initiator can be also utilized as a photo-sensitizer. Further, at the time of utilizing a photo-reaction initiator of an epoxyacrylate type, a sensitizer such as n-butylamine, triethylamine and tri-n-butylphosphine can be employed. For example, a product available on the market such as Irgacure 184 and Irgacure 907 (manufactured by Ciba Japan K.K.) is preferably utilized. The amount of a photo-reaction initiator or a photo-sensitizer utilized in an ultraviolet curable resin composition is 0.1-15 weight parts and preferably 1-10 weight parts, against 100 parts of said composition.

Resin monomer includes general monomer such as methyl acrylate, ethyl acrylate, butyl acrylate, benzyl acrylate, cyclohexyl acrylate, vinyl acetate and styrene as monomer having one unsaturated double bond. Further, listed are such as ethylene glycol diacrylate, propylene glycol diacrylate, divinyl benzene, 1,4-cyclohexane diacrylate, 1,4-cyclohexyldimethyl diacrylate, the aforesaid trimethylolpropane and pentaerythritol tetraacryl ester, as monomer having at least two unsaturated double bonds.

As a product available on the market of ultraviolet ray curable resin utilizable in this invention, employed by appropriate selection can be such as Adekaoptomer KR•BY series: KR-400, KR-410, KR-550, KR-566, KR-567 and BY-320B (manufactured by Asahi Denka Co., Ltd.); Koeihard A-101-KK, A-101-WS, C-302, C401-N, C-501, M-101, M-102, T-102, D-102, NS-101, FT-102Q8, MAG-1-P20, AG-106 and M-101-C (manufactured by Koei Chemicals Co., Ltd.); Seikabeam PHC2210(S), PHC X-9 (K-3), PHC2213, DP-10, DP-20, DP-30, P1000, P1100, P1200, P1300, P1400, P1500, P1600 and SCR900 (manufactured by Dainichi Seika Kogyo Co., Ltd.); KRM7033, KRM7039, KRM7130, KRM7131, UVECRYL29201 and UVECRYL29202 (manufactured by Daicel•U.C.B. Co., Ltd.); RC-5015, RC-5016, RC-5020, RC-5031, RC-5100, RC-5102, RC-5120, RC-5122, RC-5152, RC-5171, RC-5180 and RC-5181 (manufactured Dainippon Ink & Chemicals, Inc.); Olex No. 340 Clear (manufactured by Chugoku Marin Paints, Ltd.); Sunrad H-601, RC-750, RC-700, RC-600, RC-500, RC-611 and RC-612 (manufactured by Sanyo Chemicals Co., Ltd.); SP-1509 and SP-1507 (manufactured by Syowa Polymer Co., Ltd.); RCC-15C (manufactured by Grace Japan Co., Ltd.); Aronix M-6100, M-8030 and M8060 (Toagosei Co., Ltd.); and DPHA (manufactured by Nippon Kayaku Co., Ltd.).

Further, specific example compounds include such as trimethylolpropane triacrylate, dimethylolpropane tetraacdrylate, pentaerythritol triacrylate, pentaerythritol tetraacrylate, dipentaerythritol hexaacrylate and alkyl modified dipentaerythritol pentaacrylate.

In addition these, to adjust refractive index, such as Desolite Z-7041 and Desolite Z-7042 (manufactured by JSR Co., Ltd.), which are hardcoat coating solutions containing zirconium oxide ultra-micro-particle dispersion can be utilized alone or by addition mixing into such as other ultraviolet curable resin.

Curing of actinic ray curable resin utilized in this invention can be performed by actinic ray irradiation of such as electron rays and ultraviolet rays. In the case of electron ray curing, electron rays having an energy of 50-1,000 KeV and preferably of 100-300 KeV irradiated from various electron ray accelerators such as a Cockroft-Walton type, a Van de Graaff type, a co-vibration transformer type, a insulation core transformer type, a straight line type, a dynamitron type and a high frequency type are utilized; and in the case of ultraviolet curing, such as ultraviolet rays generated from rays of such as an ultra high pressure mercury lamp, a high pressure mercury lamp, a low pressure mercury lamp, a carbon arc, a xenon are and a metal halide lamp can be utilized.

The ratio of micro--particles to an actinic ray curable resin composition is desirably set to 0.1-40 weight parts against 100 weight parts of a resin composition.

A refractive index of a hardcoat layer utilized in this invention is 1.5-2.0 and more preferably 1.6-1.8. A refractive index of cellulose ester film utilized as a transparent support is approximately 1.5. When a refractive index of a hardcoat layer is excessively small, anti reflection property will be decreased. While, when this is excessively large, tint of reflective light of an optical film will become strong, and it is not preferred. A refractive index of a hardcoat layer utilized in this invention is specifically preferably in a range of 1.60-1.70 in view of optical design for preparation of low reflective film. A refractive index of a hardcoat layer can be adjusted by a refractive index or a content, of the aforesaid micro-particles to be added.

A layer thickness of a hardcoat layer utilized in this invention is a mean value of 10 positions of layer thicknesses of a resin portion of a hardcoat layer when being observed by a cross-sectional electron microscopic photograph; and is preferably in a range of 0.5-10.0 μm and more preferably 1.0-5.0 μm, with respect to providing sufficient durability and anti-shock property. Further, a hardcoat layer may be constituted of at least two layers.

These hardcoat layers can be coated by a method well known in the art such as a gravure coater, a reverse coater, a wire bar coater, a die coater and an ink-jet method. The coating amount is suitably 0.1-30 μm and preferably 0.5-15 μm, as a wet layer thickness.

As a light source to cure ultraviolet curable resin via a photo-cuing reaction and to form a cured film layer, any light source emitting ultraviolet rays can be utilized without limitation. Such as a low pressure mercury lamp, a medium pressure mercury lamp, a high pressure mercury lamp, an ultra-high pressure mercury lamp, a carbon arc lamp, a metal halide lamp and a xenon lamp can be utilized. An irradiation condition will differ depending on each light source; however, an irradiation quantity of actinic rays is not more than 0.5 J/cm$^2$ and preferably not more than 0.1 J/cm$^2$.

To obtain irradiation quantity of actinic rays is preferably approximately 0.1 second-1 minute, and more preferably 0.1-10 seconds in view of curing efficiency of curable resin or working characteristics. Further, an illuminance of an irradiation portion is preferably 50-150 mW/m$^2$.

Further, irradiation of actinic rays is preferably performed while providing film with tension in the film conveying direction, and further more preferably performed while providing tension also in the width direction. Provided tension is preferably 30-300 N/m. A method to provide tension is not specifically limited, and tension may be provided along the conveying direction on a back-roll or tension may be provided by a tenter along the width direction or along bi-axial directions. Film having a more excellent flatness can be prepared according to this manner.

An organic solvent for a coating solution of a hardcoat layer can be utilized by appropriately selecting from such as hydrocarbons (toluene and xylene), alcohols (methanol, ethanol, isopropanol, butanol and cyclohexanol), ketones (acetone, methyl ethyl ketone and methyl isobutyl ketone), esters (methyl acetate, ethyl acetate and methyl lactate), glycol ethers and other organic solvents, or by mixing these. It is preferable to utilize the above described organic solvent containing not less than 5 weight % and more preferably not less than 5-80 weight % of such as propylene glycol monoalkyl ether (a carbon number of an alkyl group is 1-4) or propylene glycol monoalkyl ether acetic acid ester (a carbon number of an alkyl group is 1-4).

Further, a coating solution of a hardcoat layer is preferably added with a silicone compound. For example, such as polyether modified silicone oil is preferably added. A number average molecular weight of polyether silicone oil is 1,000-100,000 and preferably 2,000-50,000, and drying ability of a coated layer is significantly decreased when it is less than 1,000 while bleed out on the surface becomes difficult when the number average molecular weight is over 100,000.

Products of a silicone compound available on the market include DKQ8-779 (a product name manufacture by Dow Corning Corp.); SF3771, SF8410, SF8411, SF8419, SF8421, SF8428, SH200, SH510, SH1107, SH3749, SH3771, BX16-034, SH3746, SH3749, SH8400, SH3771M, SH3772M, SH3773M, SH3775M, BY-16-837, BY-16-839, BY-16-869, BY-16-870, BY-16-004, BY-16-891, BY-16-872, BY-16-874, BY22-008M, BY22-012M and FS-1265 (product names manufactured by Toray•Dow Corning Corp.), KF-101, KF-100T, KF351, KF352, KF353, KF354, KF355, KF615, KF618, KF945, KF6004, SiliconeX-22-945 and X22-160AS (product names manufactured by Shin-Etsu Chemical Industry Co., Ltd.), XF3940 and XF3949 (product names manufactured by Toshiba Silicone Corp.), DisperoneLS-009 (manufactured by Kusumoto Chemicals Co., Ltd.), Granol410 (Kyoei Fat & Oil Chemicals Industrial Co., Ltd.), TSF4440, TSF4441, TSF4445, TSF4446, TSF4452 and TSF4460 (manufactured by Toshiba Silicone Corp.), BYK-306, BYK-330, BYK-307, BYK-341, BYK-344 and BYK-361 (Big Chemie Japan), L series by Nippon Unicar Co., Ltd. (such as L7001, L-7006, L7604 and L-9000), Y series, FZ series (such as FZ-2203, FZ-2206 and FZ-2207), which are preferably utilized.

These components enhance a coating ability on a substrate or on an under-lying layer. When they are added in the outermost layer of the accumulate, a water repelling property, an oil repelling property and an anti-stain property are enhanced as well as an effect to increase an abrasion resistance of the surface is exhibited. These components are preferably added in a range of 0.01-3 weight % against a solid component of a coating solution.

(Anti-Reflection Layer)

An optical film according to this invention can be further provided with an antireflection layer on a hardcoat layer.

In this invention, a method to provide an antireflection layer is not specifically limited and includes such as sputtering, atmospheric pressure plasma processing and coating; however, coating is preferably employed.

A method to form an antireflection layer includes such as a method in which metal oxide powder is dispersed in binder resin having been dissolved in a solvent and the resulting dispersion is coated and dried, a method in which polymer having a cross-linked structure is employed as binder resin, and a method in which ethylenic unsaturated monomer and a photo-polymerization initiator are incorporated and a hardcoat layer is formed by irradiation of actinic rays.

In this invention, an antireflection layer is provided on transparent film having been provided with a hardcoat layer and at least one layer of said anti-reflection layer is a low refractive index layer.

Preferable constitutions of an optical film will be shown below, however, are not limited thereto.

Wherein, a hardcoat layer and an anti-glare layer mean the aforesaid actinic ray curable resin layers. Herein, the surface having been provided with anti-blocking processing is expressed as a back-coat layer.

Back-coat layer/transparent substrate film/clear hardcoat layer/low refractive index layer Back-coat layer/transparent substrate film/clear hardcoat layer/high refractive index layer/low refractive index layer Back-coat layer/transparent substrate film/clear hardcoat layer/medium refractive index layer/high refractive index layer/low refractive index layer Back-coat layer/transparent substrate film/anti-glare layer/low refractive index layer Back-coat layer/transparent substrate film/anti-glare layer/high refractive index layer/low refractive index layer Back-coat layer/transparent substrate film/anti-glare layer/medium refractive index layer/high refractive index layer/low refractive index layer Further, a medium refractive index layer or a high refractive index layer may also function as an antistatic layer.

In the aforesaid optical film, it is preferable to form a low refractive index layer as the uppermost layer and to form a metal oxide layer as a high refractive index layer between the uppermost layer and a hardcoat layer or to further provide a medium refractive index layer (a metal oxide layer a refractive index of which has been adjusted by varying a content of the metal oxide or a ratio thereof to resin binder, or a type of metal) between a hardcoat layer and the high refractive index layer to decrease reflectance.

In a low refractive index layer of this invention, hollow micro-particles are preferably contained.

Hollow micro-particles mentioned here are (I) complex particles comprising porous particles and a cover layer arranged on the surface of said porous particles; or (II) hollow particles having a hollow and the said hollow is filled with a solvent, a gas or a porous substance. Herein, in a low refractive index layer, either (I) complex particles or (II) hollow particles may be contained, and the both may be contained.

Herein, hollow particles are ones having a hollow inside, and the hollow is surrounded by a particle wall. The inside of the hollow is filled with a solvent, a gas or a porous substance. A average particle diameter of these inorganic micro-particles is desirably 5-300 nm and preferably 10-200 nm. A average particle diameter of inorganic micro-particles utilized is selected depending on the thickness of a transparent cover layer to be formed, and is desirably in a range of ⅔-1/10 of a layer thickness of the transparent cover layer. These inorganic micro-particles are preferably utilized in a state of being dispersed in a suitable solvent to form a low refractive index layer. As a dispersion solvent, water, alcohol (such as methanol, ethanol and isopropyl alcohol), ketone (such as methyl ethyl ketone and methyl isobutyl ketone) and ketone alcohol (such as diacetone alcohol) are preferable.

The thickness of a cover layer of complex particles or a particle wall of hollow particles is desirably in a range of 1-20 nm and preferably in a range of 2-15 nm. In the case of complex particles, when the thickness of a cover layer is less than 1 nm, particles may not be completely covered and silicate monomer or oligomer easily invades into the inside of complex particles to decrease porosity of the inside, resulting in insufficient achievement of an effect of low refractive index. While when the thickness is over 20 nm, the aforesaid silicate monomer or oligomer never invades into the inside, however, the effect of a low refractive index may not be achieved due to decrease of porosity (micro pore volume) of complex particles. Further, in the case of hollow particles, particle form may not be maintained when the thickness of a particle wall is less than 1 nm, while the effect of a low refractive index may not be sufficiently exhibited when the thickness is over 20 nm.

A cover layer of the aforesaid complex particles or a particle wall of hollow particles is preferably comprised of silica as a primary component. Further, a cover layer of the aforesaid complex particles or a particle wall of hollow particles may contains a component other than silica, which includes such as $Al_2O_3$, $B_2O_3$, $TiO_2$, $ZrO_2$, $SnO_2$, $CeO_2$, $P_2O_5$, $Sb_2O_3$, $MoO_3$, $ZnO_2$ and $WO_3$. Porous particles which constitute complex particles include such as those comprising silica, those comprising silica and an inorganic compound other than silica, and those comprising such as $CaF_2$, NaF, $NaAlF_6$ and MgF. Among them, porous particles comprising a complex oxide of silica and an inorganic compound other than silica are specifically preferable. An inorganic compound other than silica includes one type or at least two types of $Al_2O_3$, $B_2O_3$, $TiO_2$, $ZrO_2$, $SnO_2$, $CeO_2$, $P_2O_5$, $Sb_2O_3$, $MoO_3$, $ZnO_2$ and $WO_3$. In such porous particles, mol ratio $MOX/SiO_2$ is desirably in a range of 0.0001-1.0 and preferably 0.001-0.3, when silica is represented by $SiO_2$ and an inorganic compound other than silica is represented by oxide conversion (MOX). It is difficult to prepare those having mol ratio $MOX/SiO_2$ of less than 0.0001 and it is not possible to prepare having a lower refractive index even when being prepared. Further, a micro pore volume become small and particles having a low refractive index may not be prepared due to a decreased silica ratio when mol ratio $MOX/SiO_2$ of porous particles exceeds 1.0.

A micro pore volume of such porous particles is desirably in a range of 0.1-1.5 ml/g and preferably 0.2-1.5 ml/g. It is impossible to prepare particles having a sufficiently low refractive index when the micro pore volume is less than 0.1 ml/g, while strength of a cover layer prepared may be decreased when the volume exceeds 1.5 ml/g.

Herein, a micro pore volume of porous particles can be determined by a mercury injection method. Further, the content substance of hollow particles includes such as a solvent, a gas and a porous substance which have been utilized in preparation of the particles. The solvent may contain such as a non-reacted substance of a particle precursor and a catalyst employed which is utilized at the time of hollow particle preparation. Further, a porous substance includes those comprising an exemplified compound in the aforesaid porous particles. These content substances may be comprised of single component or a mixture of plural components.

As a manufacturing method of such inorganic micro-particles, a preparation method of complex oxide colloidal particles disclosed in paragraph No. [0010]-[0033] of JP-A 7-133105 can be suitably employed. Specifically, in the case of complex particles being comprised of silica and an inorganic compound other than silica, inorganic particles are manufactured according to the following first-third processes.

(Polarizing Plate)

A polarizing plate according to this invention can be prepared by an ordinary method. An optical film of this invention, the back surface of which having been subjected to an alkaline saponification treatment, is preferably pasted up on at least one surface of a polarizer, which has been prepared by immersing and stretching polyvinyl alcohol type film in an iodine solution, by use of a completely saponificated polyvinyl alcohol aqueous solution. Said optical film may be utilized also on the other surface, or another polarizing plate protective film may be utilized. As polarizing plate protective film on the other surface, cellulose ester film available on the market, such as KC8UX2M, KC4UX, KC5UX, KC4UY, KC8UY, KC12UR, KC8UCR-1, KC8UCR-2, KC8UCR-3, KC8UCR-4 and KC8UCXW-H (manufactured by Konicaminolta Opto Co., Ltd.) are preferably utilized. It is possible to form a polarizing plate either by employing a same type of these films on the both surfaces or by employing different types of film. These polarizing plates can be utilized on the front surface or on the back surface (the backlight side) of a display device. For example, a combination of such as KC8UY/polarizer/KC12UR, KC8UX2M/polarizer/KC8UCR-3, KC8UXW-H/polarizer/KC8UCR4 and KCUXW-H/polarizer/KCUCR-3 can be utilized. Against an optical film of this invention, a polarizing plate protective film utilized on the other surface is preferably optical compensation film having retardation in the plane Ro of 20-70 nm and Rt of 70-400 nm at 590 nm. These can be prepared by a method described in such as paragraph No. [0014]-[0078] of JP-A 2002-71957 and paragraph No. [0064]-[0252] of JP-A 2003-170492.

<Optical Anisotropic Layer>

In this invention, preferably utilized is polarizing plate protective film combined with optical compensation film having an optical anisotropic layer which has been formed by orientation of a liquid crystal compound such as a discotic liquid crystal. For example, an optical anisotropic layer can be formed by a method described in paragraph No. [0033]-[0053] of JP-A 2003-98348. By combination use thereof with an optical film of this invention, a polarizing plate having excellent flatness as well as exhibiting a stable viewing angle enlargement effect can be prepared.

In this invention, an optical anisotropic layer is provided on the aforesaid transparent substrate directly or via an orientation layer. An optical anisotropic layer is preferably provided with a liquid crystalline discotic compound and the optical axis of said liquid crystalline discotic compound form an inclined angle against the vertical line of a transparent support. This inclined angle preferably increases as it goes from the transparent support side to the front surface side of a transparent support. In this manner, an optical anisotropic layer in this invention is a layer having a negative double refractive index comprising a compound having a discotic (a disc form) structural unit. That is, an optical anisotropic layer is a layer of a liquid crystalline discotic compound or a polymer layer prepared by curing of a polymerizable discotic compound. A discotic compound utilizable in this invention includes such as benzene derivatives described in a research report by C. Destrade et. al. of Mol. Cryst. Vol. 71, p. 111 (1981); truxene derivatives described in Mol. Cryst. Vol. 122, p. 141 (1985), and Physic. Lett. A, vol. 78, p. 82 (1990); cyclohexane derivatives described in Angew. Chem. Soc., Vol. 96, p. 70 (1984); macrocycle of an azacrown type and a phenyl acetylene type described in a research report by J. M. Lehen et. al. of J. Chem. Commun., P. 1794 (1985) and a research report by J. Zhang et. al. of J. Am. Chem. Soc., vol. 116, p. 2655 (1994). A discotic compound generally has a tabular structure in which such a molecule having an aromatic ring as a nucleus around which such as a straight chain alkyl group, alkoxy group and a substituted benzoyloxy group are spoke-wise substituted, and exhibits liquid crystalline property to include those generally referred to as a discotic liquid crystal. However, it is not limited to the above described ones provided that a molecule itself has negative uniaxial, property and capable of being provided with certain orientation. Further, in this invention, a compound having a discotic structure also includes, in addition to the above-described compound, a low molecular weight discotic liquid crystal having a functional group cross-linkable with heat or ionization radiation and become to have a high molecular weight to lose crystalline property with heat or ionization irradiation.

An optical anisotropic layer can be formed by after coating and drying a coating solution, in which a discotic compound and other compounds are dissolved, on an orientation layer, and by cooling while keeping the orientation state. Further, polymerization may be performed by ionization radiation irradiation after heating up to a discotic nematic phase forming temperature. A transform temperature from a discotic nematic liquid crystal to a solid is preferably 50-300° C. and more preferably 70-170° C.

Herein, an optical anisotropic layer may be appropriately added with any compound such as a plasticizer, a surfactant, a polymerizing monomer and a polymer compound provided not to disturb orientation of a discotic compound. Polymerizing monomer is preferably those having an acryloyl group, a methacryloyl group, a vinyl group or a vinyloxy group, and can be utilized at 1-50 weight % and preferably at 5-30 weight % against a discotic compound.

A polymer compound is preferably provided with compatibility with a discotic compound, and cellulose ester is preferable and cellulose acetate butyrate is more preferable. A polymer compound can be utilized at 0.1-10 weight % and preferably at 0.1-5 weight % against a discotic compound. Further, the acetylation degree of cellulose acetate butyrate is preferably 30-80% and the butyration degree is preferably 30-80%.

In this invention, an optical anisotropic layer is preferably an actinic ray curable layer.

<Polarizer>

As polarizer, polyvinyl alcohol type film having been stretched and dyed is preferably utilized. In particular, ethylene modified polyvinyl alcohol having an ethylene unit content of 1-4 mol %, a polymerization degree of 2,000-4,000 and a saponification degree of 99.0-99.99 mol % is preferably utilized. Among them, ethylene modified polyvinyl alcohol having a hot water breaking temperature of 66-73° C. is preferably utilized. Further, it is further preferable that a difference in a hot water breaking temperature between two points remote by 5 cm along the TD direction is not more than 1° C. to decrease color spottiness, and it is further more preferable that a difference in a hot water breaking temperature between two points remote by 1 cm along the TD direction is not more than 0.5° C. to decrease color spottiness.

A polarizer utilizing this ethylene modified polyvinyl alcohol film is excellent in polarizing capability and durability as well as exhibits little color spottiness, therefore it is specifically preferably utilized in a large-sized liquid crystal display device.

As ethylene modified polyvinyl alcohol (ethylene modified PVA) utilized in this invention, utilized can be those in which ethylene-vinyl ester type polymer, which has been prepared by copolymerization of ethylene and vinyl ester type monomer, is saponificated to convert a vinyl ester unit to a vinyl alcohol unit. This vinyl ester type monomer includes such as vinyl formate, vinyl acetate, vinyl propionate, vinyl valerate, vinyl laurate, vinyl stearate, vinyl benzoate, vinyl pivalate and vinyl versatate, and among them preferably utilized is vinyl acetate.

A content of ethylene unit (ethylene copolymerization quantity) in an ethylene modified PVA is 1-4 mol %, preferably 1.5-3 mol % and more preferably 2-3 mol %.

It is preferable to set a content of ethylene unit into this range because polarizing capability and durability are improved and color spottiness is reduced.

Further, in ethylene modified polyvinyl alcohol, vinyl ester type monomer can be also copolymerized with the following monomer. In the case of copolymerization to vinyl ester monomer, a preferable range is not more than 15 mol % and more preferably not more than 5 mol %.

Monomer copolymerizable with such vinyl ester type monomer includes olefins having a carbon number of 3-30 such as propylene, 1-butene and isobutene; acrylic acid and salt thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate and octadecyl acrylate; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate and octadecyl methacrylate; acrylamide derivatives such as acryl amide, N-methyl acrylamide, N-ethyl acrylamide, N,N-dimethyl acrylamide, diacetone acrylamide, acrylamide propane sulfonate and salt thereof, acrylamide propyldimethylamine and salt thereof, and N-methylol acrylamide and derivatives thereof; methacrylamide derivatives such as methacryl amide, N-methyl methacrylamide, N-ethyl methacrylamide, methacrylamide propane sulfonate and salt thereof, methacrylamide propyldimethylamine and salt thereof, and N-methylol methacrylamide and derivatives thereof; N-vinylamides such as N-vinylformamide, N-vinylacetoamide and N-vinylpyrrolidone; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; nitriles such as acrylonitrile and methacrylonitrile; vinyl halogenides such as vinyl chloride, vinylidene chloride, vinyl fluoride and vinilidene fluoride; allyl compounds such as allyl acetate and allyl chloride; maleic acid, salt thereof and ester thereof; itaconic acid, salt thereof and ester thereof; vinylsilyl compounds such as vinyl trimethoxysilane; and isopropenyl acetate, N-vinylamides such as N-vinylformamide, N-vinylacetoamide and N-vinylpyrrolidone.

A polymerization degree of ethylene modified PVA constituting a polarizer is 2,000-4,000, preferably 2,200-3,500 and specifically preferably 2,500-3,000, with respect to polarizing ability and durability. Polarizing ability and durability of a polarizer will deteriorate when the polymerization degree is less than 2,000, which is not preferable. Further, a polymerization degree is preferably not more than 4,000 to hardly generate color spottiness of a polarizer.

A polymerization degree of ethylene modified PVA is a weight average polymerization degree determined by a GCP measurement. This weight average polymerization degree is a value determined by GCP measurement at 40° C., by use of hexafluoro isopropanol (HFIP) added with 20 mmol/l of sodium trifluoroacetate in a moving bed, employing monodispersed PMMA as a standard.

A saponification degree of ethylene modified PVA constituting a polarizer is preferably 99.0-99.99 mol %, more preferably 99.9-99.99 mol % and specifically preferably 99.95-99.99 mol %, with respect to polarizing ability and durability.

A manufacturing method of ethylene modified PVA is not specifically limited, however, a solution casting method and a melt extrusion casting method are preferred in view of preparing excellent ethylene modified PVA film. Further, prepared ethylene modified PVA film is appropriately subjected to drying and a heat treatment.

A solvent to dissolve ethylene modified PVA utilized at the time of preparing ethylene modified PVA film includes such as dimethylsulfoxide, dimethylformamide, dimethylacetoamide, N-methylpyrrolidone, ethylene glycol, glycerin, propylene glycol, diethylene glycol, triethylene glycol, tetraethylene glycol, trimethylol propane, ethylenediamine, diethylene triamine, glycerin and water; and utilized can be one type or not less than two types thereof. Among them, dimethylsulfoxide, water, or a mixed solvent of glycerin with water is preferably utilized.

The ratio of ethylene modified PVA in an ethylene modified PVA solution or an ethylene modified PVA containing water, which is utilized at the time of manufacturing of ethylene modified PVA film, varies depending on a polymerization degree of ethylene modified PVA, however, is preferably 20-70 weight %, more preferably 25-60 weight %, further more preferably 30-55 weight % and most preferably 35-50 weight %. When the ratio of ethylene modified PVA exceeds 70 weight %, the viscosity of an ethylene modified PVA solution or an ethylene modified PVA containing water becomes excessively high to make filtration and defoaming at the time of preparation of a starting solution of film difficult, resulting in difficulty to prepare film without foreign matter and defects. While, when the ratio of ethylene modified PVA is less than 20 weight %, the viscosity of an ethylene modified PVA solution or an ethylene modified PVA containing water becomes excessively low to make manufacturing of PVA film having an aimed thickness difficult. Further, this ethylene modified PVA solution or an ethylene modified PVA containing water may be appropriately incorporated with such as a plasticizer, a surfactant and a dichroic dye.

Polyhydric alcohol is preferably added as a plasticizer at the time of manufacturing of ethylene modified PVA film. Polyhydric alcohol includes such as ethylene glycol, glycerin, propylene glycol, diethylene glycol, diglycerin, triethylene glycol, tetraethylene glycol and trimethylol propane, and one type or not less than two types thereof can be utilized. Among them, diglycerin, ethylene glycol and glycerin are preferably utilized.

The addition amount of polyhydric alcohol is preferably 1-30 weight parts, more preferably 3-25 weight parts and most preferably 5-20 weight parts, against 100 weight parts of ethylene modified PVA. Dying capability and stretching capability may deteriorated when the addition amount is less than 1 weight part, while handling characteristics may be deteriorated due to excessive flexibility of ethylene modified PXA film when it is over 30 weight parts.

At the time of manufacturing of ethylene modified PVA film, a surfactant is preferably incorporated. The type of a surfactant is not specifically limited; however, an anionic or nonionic surfactant is preferred. As anionic surfactants, for example, a carboxylic acid type such as potassium laurate, sulfuric acid ester type such as octylsulfate and a sulfonic acid type such as dodecylbenzene sulfonate are preferable. As nonionic surfactans, for example, an alkyl ether type such as polyoxyethylene oleyl ether, an alkylphenyl ether type such as polyoxyethylene octylphenyl ether, an alkyl ester type such as polyoxyethylene laurate, an alkylamine type such as polyoxyethylene laurylamino ether, an alkylamide type such as polyoxyethylene lauric acid amide, an polypropylene glycol ether type such as polyoxyethylene polyoxypropylene ether, an alkanol amide type such as oleic acid diethanol amide and an allyl phenyl ether type such as polyoxyalkylene allyl phenyl ether are preferable. One type or a combination of not less than two types of these surfactants can be utilized.

The addition amount of a surfactant is preferably 0.01-1 weight part and more preferably 0.02-0.5 weight parts, against 100 weight parts of ethylene modified PVA. Improvement effects of film forming property and peeling property may be hardly exhibited when it is less than 0.01 parts, while a surfactant may be eluted on the surface of ethylene modified PVA film to cause blocking, which deteriorates handling characteristics, when it is over 1 weight part.

The thickness of ethylene modified PVA film, which is utilized for preparation of a polarizer, before stretching is preferably 10-50 μm and more preferably 20-40 μm. Film strength is too low to make uniform stretching difficult and color spottiness of a polarizer will easily generated when it is less than 10 μm. It is not preferable that thickness variation due to neck-in at edge portions is liable to be caused at the time of preparation of a polarizer by uniaxially stretching polyethylene modified PVA film resulting in emphasis of color spottiness of a polarizer, when the thickness is over 50 μm.

Further, to manufacture a polarizer from ethylene modified PVA film, ethylene modified PVA film is subjected to dying, uniaxial stretching, a fixing treatment and a drying treatment, and further to a heat treatment, and the order of dying, uniaxial stretching and a fixing treatment is not specifically limited. Further, not less than two or more times of uniaxial stretching may be performed.

Dying can be performed either before uniaxial stretching, during uniaxial stretching or after uniaxial stretching. As dye utilized for dying, such as iodine-potassium iodide and dichroic dye can be utilized as one type or a mixture of not less than two types. Generally, dying is performed by immersing PVA film into a solution containing the above-described dye; however, the processing condition and processing method are not specifically limited, and for example, dying is performed at the time of film formation by blending dye in PVA film.

Uniaxial stretching, in which a wet stretching method or a dry heated stretching method can be employed, can be performed in hot water of such as a boric acid aqueous solution (also in a solution containing the aforesaid dye or in a post fixing bath) or can be performed in the air utilizing ethylene modified EVA film after water absorption. A stretching temperature is not specifically limited and is preferably 30-90° C. in the case of ethylene modified film being stretched in hot water (wet stretching) and is preferably 50-180° C. in the case of dry heated stretching. Further, a stretching magnification of uniaxial stretching (a total stretching magnification in the case of multi-step stretching) is preferably not less than 4 times and specifically preferably not less than 5 times, with respect to polarizing ability of a polarizer. The upper limit of the stretching magnification is not specifically limited, however, is preferably not more than 8 times because of easy achievement of uniform stretching. The film thickness after having been stretched is preferably 5-20 μm and more preferably 5-15 μm.

To enhance adsorption of the above-described dye on ethylene modified EVA film, a fixing treatment is often performed. A processing bath utilized for the fixing treatment is generally added with boric acid and/or a boric compound. Further, an iodine compound may be appropriately added into the processing bath.

A drying treatment of a prepared polarizer is preferably performed at 30-150° C. and more preferably at 50-150° C.

A polarizer prepared in the above manner is generally utilized as a polarizing plate by being pasted up with a polarizing plate protective film on the both surfaces or on one surface thereof. As an adhesive utilized for pasting up includes such as an adhesive of a PVA type and of a urethane type, however, a PVA type adhesive among them is preferably utilized.

(Adhesive)

As an adhesive utilized to paste up polyester film of this invention and cycloolefin resin film with polyvinyl alcohol type polarizer, those having sufficient adhesion ability, being transparent, water-based and not to disturb a polarizing function are utilized; and listed are such as a polyester type adhesive, a polyacryl type adhesive, an epoxy type adhesive, a cyanoacrylate type adhesive, a polyurethane type adhesive and polyvinyl alcohol type adhesive such as polyvinyl alcohol and polyvinyl butyral. A urethane type adhesive is specifically preferable.

Urethane resin includes such as polyether type urethane resin, polyester type urethane resin and acryl type urethane resin, however, among them, polyester type ionomer type urethane resin is preferable. Polyester type ionomer type urethane resin is urethane resin having a polyester skeleton in which a small amount of an ionic component (a hydrophilic component) is introduced. Such ionomer type urethane resin is preferable as a water-based adhesive since it can be directly, emulsified in water to make an emulsion without using an emulsifier. Polyester type ionomer type urethane resin itself is well known in the art and, for example, is described in JP-A 7-97504 as an example of polymer dispersant to disperse phenol resin in a water-based medium. Such polyester type ionomer type urethane resin can be manufactured, for example, according to the following method.

Such as (1) a method, in which hydrophilic group containing polyurethane resin, which has been prepared by a reaction of a hydrophilic group containing compound (A), polyester polyol (B) and polyisocyanate (C), is emulsified in water to prepare ionomer resin;

(2) a method, in which end isocyanato group containing urethane polymer in which a hydrophilic group is introduced, which has been prepared by a reaction of a hydrophilic group containing compound (A), polyester polyol (B) and polyisocyanate (C), is emulsified in water and make react with polyamine to prepare ionomer resin.

Hydrophilic group containing compound (A) utilized here includes a sulfonate group containing compound such as 2-hydroxyethane sulfonic acid, sulfosuccinic acid, sulfanilic acid and 2,4-diaminotoluene sulfonic acid; carboxylate group containing compound such as 2,2-dimethylol propionic acid, dihydroxy maleic acid and 3,4-diaminobenzoic acid; and polyoxyethylene glycol or polyoxyethylene-polyoxypropylene copolymer glycol which is provided with at least one active hydrogen.

Polyester polyol (B) may be polyester prepared by a dehydration condensation reaction of a glycol component with an acid component, polyester prepared by a ring-opening polymerization reaction of cyclic ester such as c-caprolactone, or copolymerization polyester thereof. A glycol component utilized in polyester polyol includes such as ethylene glycol, propylene glycol, 1,3-propanediol, 1,4-butanediol, 1,5-pentanediol, 3-methy-1,5-pentanediol, 1,6-hexanediol, neopentyl glycol, diethylene glycol, triethylene glycol, tetraethylene glycol, polyethylene glycol (having a molecular weight of 300-6,000), dipropylene glycol, tripropylene glycol, 2,2-diethyl-1,3-propanediol, 2-butyl-2-ethyl-1,3-propanediol, 2-pentyl-2-propyl-1,3-propanediol, 2-butyl-2-hexyl-1,3-propanediol, 2-etyl-1,3-hexanediol, bishydroxyethoxybenzene, 1,4-cyclohexanediol, 1,4-cyclohexanedimethanol, bisphenol A, hydrogenated bisphenol A and hydroquinone; and alkyleneoxide adducts thereof. Further, an acid component includes such as succinic acid, adipic acid, azelaic acid, sebacic acid, dodecane dicarboxylic acid, maleic acid, fumaric acid, 1,3-cyclopentane dicarboxylic acid, 1,4-cyclohexane dicarboxylic acid, terephthalic acid, isophthalic acid, phthalic acid, 1,4-naphthalene dicarboxylic acid, 2,5-naphthalene dicarboxylic acid, 2,6-naphthalene dicarboxylic acid, naphthalic acid, biphenyl dicarboxylic acid and 1,2-bis(phenoxy)ethane-p,p'-dicarboxylic acid; anhydride and ester forming derivatives of these carboxylic acids; p-hydroxybenzoic acid and p-(2-hydroxyethoxy)benzoic acid; and ester-forming derivatives of these hydroxycarboxylic acid.

Herein, polyester type ionomer type urethane resin may be those utilizing another high molecular weight polyol component or an active hydrogen containing compound having a low molecular weight together in a range of not to disturb the effect of this invention. High molecular weight polyol includes such as polyether polyol, polycarbonate polyol, polyacetal polyol, polyacrylate polyol, polyesteramide polyol and polythioether polyol. Further, an active hydrogen containing compound having a low molecular weight includes a polyhydroxyl compound such as ethylene glycol, neopentyl glycol, 1,6-hexanediol, glycerin and trimethylolpropane; and a diamine compound such as ethylene diamine and piperazine. Among them, to utilize an active hydrogen containing compound together is a preferable embodiment.

Polyisocyanate (C) described above is a compound having at least two isopcyanato groups in a molecule, and specifically includes such as 2,4-trylene diisocyanate, phenylene diisocyanate, 4,4'-diphenylmethane diisocyanate, 1,6-hexamethylene diisocyanate and isophorone diisocyanate.

A reaction of the hydrophilic group containing compound (A), polyester polyol (B) and polyisocyanate (C) can be also performed in the absence of a solvent, however, may be performed in an organic solvent. Prepared resin is neutralized with non-volatile base such as sodium hydroxide and potassium hydroxide, amines such as dimethyl ethanolamine or ammonia and the resulting system is added with water, whereby water-based dispersion of polyester type ionomer type urethane resin is prepared.

Polyester type ionomer type urethane resin, in the case of being prepared in a state of containing an organic solvent arising from an organic solvent utilized in a reaction, is advantageously utilized after removing the organic solvent by such as distillation. This urethane resin can form very fine and stable colloid in water to be a water-based adhesive containing no organic solvent since it is an ionomer type.

Polyester type ionomer type urethane resin is preferably provided with a weight average molecular weight of not less than 5,000, and more preferably a weight average molecular weight of 10,000-300,000. Strength of an adhesive layer is not sufficient when the weight average molecular weight is less than 5,000, while a viscosity becomes high as a water dispersion to make handling difficult when it is over 300,000.

Such polyester type ionomer type urethane resin is utilized as a water-based adhesive in a state of being dispersed in water. A viscosity of this water-based adhesive is preferably not higher than 2,000 mPa·sec, more preferably not higher than 1,000 mPa·sec and specifically preferably not higher than 500 mPa·sec, with respect to handling characteristics. Coating is easy and a prepared polarizing plate exhibits excellent visual appearance as the viscosity is the lower. A solid content of polyester type ionomer type urethane resin in this water-based adhesive is preferably in a range of 10-70 weight % and specifically preferably not less than 20 weight % and not more than 50 weight %, with respect to viscosity and adhesion strength.

Water dispersion of polyester type ionomer type urethane resin may be further added with such as polyethylene glycol, polyoxyethylene and a surfactant. Further, water-soluble resin such as polyhydroxyethyl methacrylate, polyhydroxyethyl acrylate, polyacrylic acid and polyvinyl alcohol type resin may be incorporated.

Polyester type ionomer type urethane resin available on the market, which is preferably utilized in this invention, includes such as "Hydrane AP-20" and "Hydrane AFX-101H" from Dainippon Ink and Chemicals, Inc.

In this invention, a water-based adhesive containing an oxetane compound and an epoxy compound can be utilized in addition to above-explained polyester type ionomer type urethane resin.

To enhance adhesion, various surface treatments such as a corona discharge treatment, a glow discharge treatment, an ultraviolet treatment, a flame treatment, a discharge plasma treatment in an atmospheric pressure gas and a chemical solution treatment can be appropriately provided. Further, to enhance adhesion, a subcoat layer may be coated. As a subcoat, a hydrophilic colloid layer, which is excellent in adhesion with a polarizer, is specifically preferable.

For example, it is possible to further enhance adhesion with a polarizer as polarizing plate protective film by being subjected to a plasma treatment by means of a method described in JP-A 2000-356714.

<Display Device>

A display device of this invention can be prepared by assembling a polarizing plate of this invention in a display device. An optical film of this invention is preferably utilized in a LCD of a reflection type, a transparent type or a translucent type; or in LCD's of various driving methods such as a TN type, a STN type, a OCB type, a HAN type, a VA type (PVA type, MVA type) and a IPS type. Further, an optical film of this invention shows very little color unevenness and glitter and is excellent in flatness; therefore, it is also preferably utilized in various display devices such as a plasma display, a field emission display, an organic EL display, an inorganic EL display and an electronic paper. In particular, in a display device having an image plane of not smaller than 30 type and specifically an image plane of as large as 30-54 type, effects to decrease color unevenness and waving unevenness as well as little eye strain even in a long time observation have been confirmed.

<Liquid Crystal Display Device>

A liquid crystal display device can be prepared by arranging and pasting up a polarizing plate of this invention on at least one surface of a liquid crystal cell.

In the case of utilizing a polarizing plate according to this invention, which has been prepared in the above manner, in a liquid crystal display device, even with a liquid crystal display device having an image plane as large as not smaller than 15 type, no unevenness neither illuminated defects were observed as well as a viewing angle characteristics can be maintained for a long period and a front contrast was improved, and, in particular, remarkable effects were observed with a MVA (multi-domain vertical alignment) type liquid crystal display device. Further, image characteristics of liquid crystal display devices employing various driving methods such as TN, STN, VA, OCB, HAN and IPS can be improved.

EXAMPLES

In the following, this invention will be explain in reference to examples; however, this invention is not limited thereto.

(Preparation of Micro-particle Dispersion: Preparation of Ink-jet Coating Solution)

(Micro-Particle Dispersion)

| Silicon dioxide dispersion 1 | |
|---|---|
| Aerosil 972V (manufactured by Nippon Aerosil Co., Ltd.) (average particle diameter of primary particles of 16 nm, apparent specific gravity of 90 g/litter) | 0.12 weight parts |
| Ethanol | 99.88 weight parts |

The above composition, after having been stirred and mixed for 30 minutes by use of Dissolver, was subjected to homogenization by Manton Gaulin homogenizer, whereby silicon dioxide dispersion 1 was prepared.

(Dispersion A)

Silicon dioxide dispersion 1 of 0.1 weight part was added with 2,000 weight parts of ethanol, and the resulting system was stirred and mixed with Dissolver to prepare dispersion A.

Particle size control was performed by a dilution method (a dispersion method and a dilution rate at the time of dilution) to be a value of table 1.

| (Preparation of In-line Additive Solution A). | |
|---|---|
| 1,3,5-triazine compound (compound D having the following structure) | 12 weight parts |
| Methylene chloride | 100 weight parts |

Compound D

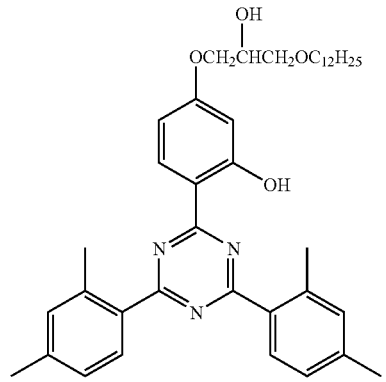

The above composition was charged in a sealed vessel and completely dissolved with heating and stirring, followed by being filtered.

The resulting system was added with 36 weight parts of silicon dioxide dispersion diluted solution A with stirring, followed by being stirred for further 30 minutes; 6 weight parts of cellulose acetate propionate (acetyl substitution degree of 1.9, propionyl substitution degree of 0.8) being added with stirring, followed by being stirred for further 60 minutes; and then the system was filtered through polypropylene wind cartridge filter TCW-PPS-1N manufactured by Advantech Toyo Co., Ltd., whereby in-line additive solution A was prepared.

(Preparation of Optical Film 1)

| (Preparation of Dope Solution A) | |
|---|---|
| Cellulose ester (cellulose triacetate synthesized from linter cotton) (Mn = 148,000, Mw = 310,000, Mw/Mn = 2.1, acetyl substitution degree of 2.9) | 100 weight parts |
| Trimethylolpropane tribenzoate (compound shown below) | 5.0 weight parts |
| Ethylphthalyl ethylglycolate | 5.5 weight parts |
| Methylene chloride | 440 weight parts |
| Ethanol | 40 weight parts |

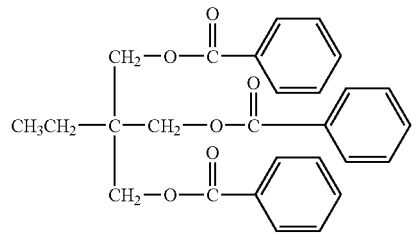

The above composition was charged in a sealed vessel and completely dissolved while heating and stirring, followed by being filtered through Azumi filter No. 24, whereby a dope solution was prepared. Dope solution A having been filtered of 100 weight parts was added with 2 weight parts of the aforesaid in-line additive solution A, followed by being sufficiently mixed with an inline mixer (Toray Static Inline Mixer, Hi-Mixer SWJ), and then uniformly cast on a stainless band support at a temperature of 35° C. and 1.8 m wide by use of a belt casting apparatus. A solvent is evaporated until a residual solvent amount reaches 120% on a stainless band support, and a web was peeled off from the stainless band support. The peeled off web, a solvent in which was evaporated at 40° C., was slit into 1.6 m wide, on which dispersion diluted solution A was coated by an ink-jet head on a back-roll having a diameter of 250 mm at a speed to make 360×90 dpi (dpi is a dot number per 2.54 cm) when a residual solvent was 50 weight %. As an ink-jet ejection apparatus, a line-head type (FIG. 5(a)) was utilized; and 100 sets of ink-jet heads having a predetermined number of nozzles having a nozzle diameter of 3.5 μm were arranged. An ink-jet head having a constitution described in FIG. 4 was utilized. A micro-particle dispersion supply system is constituted of a micro-particle dispersion supply tank, a filter, a piezo type ink-jet head and a piping; and a portion from the micro-particle dispersion supply tank to the ink-jet head was heat insulated and heated (40° C.) to perform ejection at 40° C. with a driving frequency of 20 kHz.

Air of 1,000 $cm^3$ in an atmosphere at 30 cm remote from a coating head along the conveying direction of a transparent substrate (a web) was collected, and concentrations of methylene chloride and ethanol of an atmosphere were measured by use of a gas chromatograph to be 6,000 ppm as the total concentration of ethanol and methylene chloride. The coated surface was brought in contact with a roll 2.5 seconds after coating and stretching was started 25 seconds after coating to conduct a stretching treatment at 124° C. along the direction perpendicular to the conveying direction by 1.3 times. A residual solvent amount at the start of stretching was 60 weight % and a residual solvent amount at the end of stretching was 5 weight %. Thereafter, drying was finished while a web was transported with plural rolls through heating zones of 110° C. and of 120° C., and the web was slit into 1.45 m wide and subjected to a knurling processing of 15 mm wide and having a mean height of 10 μm followed by being wound up, whereby optical film 1 comprising cellulose ester film was prepared. A residual solvent amount of optical film 1 was 0.1%; the mean layer thickness was 38 μm; and a roll length was 7,400 m.

(Preparation of Optical Film 2-Optical Film 9)

Optical film 2-optical film 9 were prepared in a similar manner to preparation of an optical film 1 by changing a residual solvent amount of a web, a type of diluted dispersion, a condition of ink-jet ejection, a back-roll diameter, a time from coating to contact with a back-roll, a time from coating to stretching, a time from roll contact to stretching, and a residual solvent amount at the time of stretching, as described in tables 1-3.

(Preparation of Optical Film 10)

An optical film described in tables 1-3 was prepared in a similar manner to optical film 1, said optical film being subjected to a saponification treatment, and a xylene solution of UCL-018 manufactured by Dainippon Ink and Chemicals, Inc. as a liquid crystal compound was coated and dried on the surface opposite to the ink-jet coated surface to make a dry layer thickness of 0.6 μm, followed by being subjected to a heat treatment at 45° C. for 35 seconds, alignment being fixed by irradiation of ultraviolet rays of 350 mJ at a substrate temperature of 35° C. and an oxygen concentration of 0.5%, whereby optical film 10 was prepared.

(Preparation of Optical Film 11)

An optical film described in tables 1-3 was prepared in a similar manner to optical film 1, the surface of said optical film opposite to the ink-jet coated surface being subjected to a rubbing treatment along the direction perpendicular to the longitudinal direction, followed by being subjected to a saponification treatment, and being coated with a xylene solution of RMS 03001 manufactured by MERCK Corp. as a liquid crystal compound and dried to make a dry layer thickness of 0.5 μm, followed by being subjected to a heat treatment at 65° C. for 110 seconds, alignment being fixed by irradiation of ultraviolet rays of 350 mJ at a substrate temperature of 35° C. and an oxygen concentration of 0.5%, whereby optical film 11 was prepared.

(Preparation of Optical Film 12)

An optical film described in tables 1-3 was prepared in a similar manner to optical film 1, the surface of said optical film opposite to the ink-jet coated surface being subjected to a rubbing treatment along the direction perpendicular to the longitudinal direction, followed by being subjected to a saponification treatment, and being coated with a xylene solution of RMS 03011 manufactured by MERCK Corp. as a liquid crystal compound and dried to make a dry layer thickness of 1.1 μm, followed by being subjected to a heat treatment at 65° C. for 110 seconds, alignment being fixed by irradiation of ultraviolet rays of 350 mJ at a substrate temperature of 35° C. and an oxygen concentration of 0.5%, whereby optical film 12 was prepared.

(Preparation of Optical Film 13-Optical Film 15)

Optical film 13-optical film 15 were prepared in a similar manner to preparation of optical film 1 by changing a residual solvent amount of a web, a type of diluted dispersion, a condition of ink-jet ejection, a back-roll diameter, a time from coating to contact with a back-roll, a time from coating to stretching, a time from roll contact to stretching, and a residual solvent amount at the time of stretching, as described in tables 1-3.

(Preparation of Optical Film 16)

An optical film described in tables 1-3 was prepared in a similar manner to optical film 1, the surface of said optical film opposite to the ink-jet coated surface was coated with a coating solution of example 2 of JP-A 2005-70745 to make a dry layer thickness of 3.3 μm, followed by being dried, whereby optical film 16 was prepared.

(Preparation of Optical Film 17)

An optical film described in tables 1-3 was prepared in a similar manner to optical film 1, the surface of said optical film opposite to the ink-jet coated surface being coated with Paliocolor LC756 added with 4.8 weight % of LC756 to make a dry layer thickness of 3.3 μm, followed by being dried, and the web was subjected to a heat treatment for 120 seconds while keeping a temperature of the coated surface of 70° C. and a temperature of the film side of 25° C., followed by being subjected to ultraviolet curing, whereby optical film 17 was prepared.

(Preparation of Optical Film 18)

An optical film described in tables 1-3 was prepared in a similar manner to optical film 1, and the surface of said optical film opposite to the ink-jet coated surface being subjected to a rubbing treatment and a saponification treatment, followed by being coated with a toluene solution (5 weight %) of compound 7 of paragraph No. [0080] of JP-A 2001-66433 so as to make a dry layer thickness of 2.2 μm, being subjected to a heat treatment to continuously prepare a film of homogeneous alignment, whereby optical film 18 was prepared.

(Preparation of Optical Film 19)

Polycarbonate resin (viscosity average molecular weight of 52,000) comprising bisphenol A of 15 weight parts was slowly added into 85 weight parts of dioxolan to prepare a dope. This dope was cast by a doctor blade having a clearance of 0.8 mm on an endless belt kept at 60° C. and dried with a wind having a temperature of 80° C and a speed of 0.9 m/sec followed by being peeled off, and then the web coated with the aforesaid diluted dispersion A by use of an ink-jet head in a similar manner to the aforesaid example, the coated surface being brought into contact with a roll 150 seconds after coating, being stretched at 175° C. by 1.1 times further 5 seconds thereafter, and then the web was subjected to a heat treatment at 150° C. and a wind speed of 1 m/sec to be dried. The roll length was 2,300 m.

Successively, an endless belt made of stainless, after having been subjected to a rubbing treatment in the width direction, was coated with a toluene solution (5 weight %) of compound 7 of paragraph No. [0080] of JP-A 2001-66433 so as to make a dry layer thickness of 2.2 μm, followed by being subjected to a heat treatment to continuously prepare film of homogeneous alignment, which was pasted on the surface opposite to the ink-jet coated surface of polycarbonate by use of an adhesive, whereby optical film 19 was prepared.

(Preparation of Optical Films 22, 25, 26 and 37)

Zeonoa 1020R (manufactured by Nippon Zeon Co., Ltd) of 100 weight parts and 300 weight parts of methylene chloride were charged in a mixing tank and stirred with heating to dissolve each component, whereby a polymer solution was prepared. The solution was successively coated on an endless belt to be peeled off with a controlled residual solvent amount by varying the drying condition, and thereafter, the aforesaid diluted dispersion A was coated by use of the aforesaid ink-jet head with controlled drying, followed by a stretching treatment under conditions described in table 3, whereby optical films 22, 25, 26 and 37 were prepared.

(Preparation of Optical Film 39)

Polylactic acid of 100 weight parts and 400 weight parts of methylene chloride were charged in a mixing tank and stirred with heating to dissolve each component, whereby a polymer solution was prepared. The solution was coated on an endless belt to be dried and peeled off, and thereafter, the resulting web was coated with a diluted dispersion of a matting agent by use of the aforesaid ink-jet head with controlled drying, followed by being stretched under conditions described in table 3, whereby optical film 39 was prepared.

(Preparation of Optical Films 20, 21, 23, 24, 27-36, and 38)

Polylactic acid of 100 weight parts and 400 weight parts of methylcn methylene chloride were charged in a mixing tank and stirred with heating to dissolve each component, whereby a polymer solution was prepared. The solution was coated on an endless belt to be dried and peeled off, and thereafter, the resulting web was coated with a diluted dispersion of a matting agent by use of the aforesaid ink-jet head with controlled drying, followed by being stretched under conditions described in table 3, whereby optical film 39 was prepared.

Optical films 20, 21, 23, 24, 27-36 and 38 were prepared in a similar manner to preparation of optical film 1 by changing a residual solvent amount of a web, a type of diluted dispersion, a condition of ink-jet ejection, a back-roll diameter, a time from coating to contact with a back-roll, a time from coating to stretching, a time from roll contact to stretching, and a residual solvent amount at the time of stretching, as described in tables 1-3.

<Coating of Hardcoat Layer>

On aforesaid optical films 1-39, the following hardcoat layer coating composition was coated on the surface opposite to the surface coated with an ink-jet coating solution and dried finally at 85° C. while enhancing a temperature and a wind velocity of a hot wind, followed by being subjected to ultraviolet ray irradiation at 0.1 J/cm2, where by a clear hardcoated layer having a dry layer thickness of 5 μm was arranged.

<Hardcoat Layer Coating Composition>

| | |
|---|---|
| Dipentaerythritol hexaacrylate monomer | 60 weight parts |
| Dipentaerythritol hexaacrylate dimer | 20 weight parts |
| Dipentaerythritol hexaacrylate component not less than trimer | 20 weight parts |
| Photoreaction initiator (Irgacure 184 (manufactured by Ciba Japan K.K.)) | 4 weight parts |
| Propylene glycol monomethyl ether | 75 weight parts |
| Methyl ethyl ketone | 75 weight parts |

Successively, the following antireflection layer was arranged on the above-described hardcoat layer to prepare antireflection film.

<Preparation of Antireflection Layer (Low Refractive Index Layer 1)>

Following low refractive index layer coating composition 1 was coated by a die coater, having been dried at 80° C. for 5 minutes, followed by being further heating cured at 120° C. for 5 minutes, and then further cured by irradiation of 175 mJ/cm$^2$ of ultraviolet rays, whereby low refractive index layer 1 was arranged so as to make a thickness of 95 nm. Herein, the refractive index of this low refractive index layer 1 was 1.45.

<Preparation of Tetraethoxy Silane Hydrolized Substance A>

Tetraethoxy silane of 580 g and ethanol of 1,144 g were mixed, and the resulting solution, after having been added with an acetic acid aqueous solution, was stirred for 1 hour at room temperature (25° C.), whereby tetraethoxy silane hydrolyzed substance A was prepared.

<Low Refractive Index Layer Composition 1>

| | |
|---|---|
| Propylene glycol monomethyl ether | 303 weight parts |
| Isopropylalcohol | 305 weight parts |
| Tetraethoxy silane hydrolyzed substance A | 139 weight parts |
| γ-methacryloxypropyl trimethoxy silane (KBM503, manufactured by Shin-Etsu Chemical Industry, Co., Ltd.) | 1.6 weight parts |
| 10% propylene glycol monomethyl ether solution of FZ-2207 (manufactured by Nippon Unicar Co., Ltd.) | 1.3 weight parts |

Herein, on optical films 21, 23, 27, 28 and 29, after an anti-glare layer having been formed by coating a solution having the following composition by use of a micro gravure coater so as to make a layer thickness after curing of 3 and the solvent having been evaporated followed by curing with irradiation of ultraviolet rays of 0.2 J/cm$^2$ by use of a high pressure mercury lamp, an antireflection layer was arranged.

| | |
|---|---|
| Dipentaerythritol hexaacrylate | 70 weight parts |
| Trimethylolpropane triacrylate | 30 weight parts |
| Photoreaction initiator (Irgacure 184 (manufactured by Ciba Japan K.K.)) | 4 weight parts |
| Ethyl acetate | 150 weight parts |
| Photoreaction initiator (Irgacure 184 (manufactured by Ciba Japan K.K.)) | 4 weight parts |
| Propylene glycol monomethyl ether | 150 weight parts |
| Silicone compound (BYK-307, manufactured by Big Chemie Japan Corp.) | 0.4 weight parts |

The above-described composition was added with zirconium oxide micro-particles (average particle diameter of 10 nm). As zirconium oxide, one dispersed in advance by use of a part of a solution to be added into a coating solution was utilized.

Next, a polarizing plate was formed by employing each antireflection film 1-39.

<Preparation of Polarizing Plate>

Polyvinyl alcohol film having a thickness of 120 μm was uniaxially stretched (temperature of 110° C., stretching magnification of 5 times). The resulting film was immersed in an aqueous solution comprising 0.075 g of iodine, 5 g of potassium iodide and 100 g of water for 60 seconds, followed by being immersed in an aqueous solution comprising 6 g of potassium iodide, 7.5 g of boric acid and 100 g of water at 68° C. The resulting film was washed and dried to prepare a polarizer.

Next, a polarizing plate was prepared by pasting up a polarizer with the aforesaid antireflection film 1-39 and the back surface side cellulose ester film according to following processes 1-5. Cellulose ester film R having a phase difference (Ro=43 nm, Rt=132 nm) prepared by the following method was utilized as the back surface side polarizing plate protective film, to prepare each polarizing plate.

Process 1: Cellulose ester film was immersed in sodium hydroxide solution of 1 mol/L at 50° C., followed by being washed and dried to prepare cellulose ester film the side of which to be pasted up with a polarizer has had been saponificated.

Process 2: The aforesaid polarizer was immersed in a polyvinyl alcohol adhesive bath having a solid content of 2 weight for 1-2 seconds.

Process 3: The excess adhesive adhered on a polarizer in process 2 was lightly wiped off, and said polarizer placed on cellulose ester film having been treated in process 1 and further antireflection film was accumulated so as to arrange an antireflection layer outside.

Process 4: The sample comprising antireflection film, polarizer and cellulose ester film having been accumulated in process 3 was pasted up at a pressure of 20-30 N/cm$^2$ and a conveying speed of approximately 2 m/min.

Process 5: A sample comprising a polarizer prepared in process 4, cellulose ester film and antireflection film 1-39 having been pasted up was dried in a dryer of 80° C. for 2 minutes, whereby polarizing plates 1-39 were prepared. Herein, for a polarizing plate utilized on the back-light side of a display device, utilized was a polarizing plate similarly prepared by employing cellulose ester film attached with a hardcoat layer (KC8UXW-H, manufactured by Konicaminolta Opto, Co., Ltd.) as polarizing plate protective film and the aforesaid cellulose ester film R.

<Preparation of Cellulose Ester Film R>

(Preparation of Dope Solution R)

| | |
|---|---|
| Cellulose ester (cellulose acetate propionate; acetyl group substitution degree of 1.9, propionyl group substitution degree of 0.8)(Mn = 100,000, Mw = 220,000, Mw/Mn = 2.2) | 100 weight parts |
| Triphenyl phosphate | 8 weight parts |
| Ethylphthalyl ethyl glycolate | 2 weight parts |
| Methylene chloride | 300 weight parts |
| Ethanol | 60 weight parts |

The above composition was charged in a sealed vessel to be completely dissolved while being heated and stirred, followed by being filtered by use of Azumi Filter Paper No. 24, manufactured by Azumi Filter Paper Co., Ltd., whereby dope E was prepared.

| (Silicon Dioxide Dispersion R) | |
|---|---|
| Aerosil 972V (manufactured by Nippon Aerosil Co., ltd.) | 10 weight parts |
| Ethanol | 75 weight parts |

The above composition was stirring mixed by Dissolver for 30 minutes, followed by being homogenized by Manton-Gaulin homogenizer. The silicon dioxide dispersion of 75 weight parts was added with 75 weight parts of methylene chloride with stirring, followed by being stirring mixed by Dissolver, whereby silicon dioxide diluted dispersion R was prepared.

| (Preparation of In-line Additive Solution) | |
|---|---|
| Methylene chloride | 100 weight parts |
| Tinuvin 109 (manufactured by Ciba Japan K.K.) | 4 weight parts |
| Tinuvin 171 (manufactured by Ciba Japan K.K.) | 4 weight parts |
| Tinuvin 326 (manufactured by Ciba Japan K.K.) | 2 weight parts |

The above composition was charged in a sealed vessel to be completely dissolved with heating and stirring, followed by being filtered.

The resulting system was added with 20 weight parts of silicon dioxide diluted dispersion R while being stirred, being further stirred for 30 minutes; then 5 weight parts of cellulose ester was added with stirring, followed by being stirred for further 60 minutes; and the resulting system was filtered through polypropylene wind cartridge filter TCW-PPS-1N, manufactured by Advantech Toyo Co., Ltd., whereby in-line additive solution E was prepared.

Dope R, which had been filtered, of 100 weight parts was added with 4 weight parts of inline additive solution R having been filtered to be completely mixed with In-line Mixer (Toray Static In-line Mixer Hi-Mixer SWJ), and the resulting dope was uniformly cast on a stainless band support at 35° C and 1.8 m wide by use of a belt casting apparatus. A solvent was evaporated on a stainless band support until the residual solvent amount reached 100% and a web was peeled off from the stainless band support. The peeled off web comprising cellulose ester was subjected to evaporation of a solvent at 55° C., being slit into 1.5 m wide, followed by being stretched by a tenter in TD direction (the direction perpendicular to the conveying direction of film) at 130° C. by 1.3 times. At this time, the residual solvent amount at the start of stretching by a tenter was 18%. Thereafter, drying was completed while being conveyed by many rolls through drying zones of 120° C. and of 110° C., being slit into 1.4 m wide and provided with a knurling treatment having a width of 15 mm and a mean height of 10 μm on the both edges of film, followed by being wound, whereby cellulose ester film R was prepared. The film had a residual solvent amount of 0.1%, a mean layer thickness of 80 μm and a roll length of 3,000 m. This cellulose ester had Ro=43 nm and Rt=132 nm, being provided with the slow axis in the width direction, and had a deviation angle of the slow axis against the width direction of within ±0.6 degree.

<Preparation of Liquid Crystal Display Device>

A liquid crystal panel was prepared in the following manner and characteristics as a liquid crystal display device were evaluated.

A polarizing plate of 32 Type liquid crystal TV (MVA type cell), which was available on the market, having been pasted up in advance was peeled off, and a polarizing plates 1-39 prepared above each were pasted up on a glass surface of a liquid crystal cell.

At that time, pasting of the polarizing plate is performed so as to make the surface of optical compensation film (phase difference film) be on the liquid crystal cell side and the absorption axis be identical to that of the polarizing plate having been pasted up in advance, whereby liquid crystal display devices 1-39 each were prepared.

The following evaluations were performed with respect to each of sample films, antireflection films, polarizing plates and liquid crystal display devices which had been prepared in the above manner.

<Evaluation>

(Measurement of Retardation)

A retardation value of an optical film is determined by the following equations.

$$Ro = (nx - ny) \times d$$

$$Rt = ((nx + ny)/2 - nz) \times d$$

wherein, d is a thickness of film (nm), nx is the maximum refractive index in the film plane (also referred to as a refractive index in the slow axis direction), nx is a refractive index in the direction perpendicular to the slow axis in the film plane, and nz is a refractive index of film in the thickness direction.

Retardation values (Ro) and (Rt) are measured by use of an automatic double refractometer. They were determined by employing KOBRA-21ADH (manufactured by Oji Scientific Instruments) at a wavelength of 590 nm under an environment of 23° C. and 55% RH.

(Evaluation of Blocking Property)

After an original roll of an optical film had been stored as a roll length of 3,000-12,000 m in a store house for 1 month, generation of blocking was visually evaluated according to the following criteria.

A: No blocking was observed.

B: Slight peeling off sound was heard, however, no marks or deformation was observed.

C: No deformation but a few marks was observed.

D: Deformation and roughness in a sample were observed.

Micro foams and foreign matter defects were visually observed at the time of pasting up of a polarizer with film in preparation of a polarizing plate sample, and a yield of a polarizing plate having been chip cut was determined by defining B, C of the following evaluation criteria and those having crease and curl generated to be NG.

A: No foams and foreign matter were observed.

B: A few foams and foreign matter were observed.

C: Many foams and foreign matter were observed.

Successively, 100 sets of each of polarizing plates 1-39 were prepared to be pasted up on a panel by use of a polarizing plate paste up device, manufactured by Yodogawa Hutch Corp., and the yield was determined by defining generation of slippage and foams (having a size of not smaller than 100 μm) to be NG.

As for measurement of a front contrast of a display device, brightness of black and white was measured in the dark by use of BM-5A manufactured by Topcon to calculate a brightness ratio thereof, which was defined as a front contrast.

The details of the above described various examples and the evaluation results will be summarized in tables 1-5.

TABLE 1

| Optical film No. | Residual solvent (weight %) | Particle size (nm) | Convex portion height (μm) | Number of convex portions (per 10,000 μm$^2$) | Atmospheric solvent concentration (ppm) |
|---|---|---|---|---|---|
| 1 (Inv.) | 50 | 110 | 0.015 | 25 | 6000 |
| 2 (Inv.) | 50 | 195 | 0.5 | 500 | 6000 |
| 3 (Inv.) | 50 | 25 | 0.01 | 25 | 6000 |
| 4 (Inv.) | 100 | 80 | 0.01 | 500 | 6000 |
| 5 (Inv.) | 100 | 100 | 0.08 | 25 | 6000 |
| 6 (Inv.) | 100 | 120 | 0.02 | 500 | 6000 |
| 7 (Inv.) | 150 | 110 | 0.2 | 5000 | 6000 |
| 8 (Inv.) | 150 | 50 | 0.1 | 5000 | 6000 |
| 9 (Inv.) | 150 | 150 | 0.15 | 5000 | 6000 |
| 10 (Inv.) | 45 | 100 | 0.15 | 9800 | 10000 |
| 11 (Inv.) | 45 | 25 | 0.15 | 9800 | 10000 |
| 12 (Inv.) | 45 | 200 | 0.12 | 9800 | 2000 |
| 13 (Inv.) | 20 | 75 | 0.48 | 9000 | 2000 |
| 14 (Inv.) | 20 | 125 | 0.22 | 2000 | 2000 |
| 15 (Inv.) | 20 | 200 | 0.22 | 2000 | 2000 |
| 16 (Inv.) | 160 | 120 | 0.01 | 2000 | 4000 |
| 17 (Inv.) | 160 | 55 | 0.02 | 6000 | 4000 |
| 18 (Inv.) | 160 | 130 | 0.04 | 100 | 4000 |
| 19 (Inv.) | 300 | 110 | 0.04 | 100 | 950 |
| 20 (Inv.) | 300 | 55 | 0.04 | 100 | 1000 |
| 21 (Inv.) | 300 | 165 | 0.1 | 200 | 500 |
| 22 (Inv.) | 18 | 45 | 0.1 | 200 | 480 |
| 23 (Inv.) | 18 | 100 | 0.1 | 200 | 10900 |
| 24 (Inv.) | 18 | 160 | 0.1 | 6000 | 11000 |
| 25 (Inv.) | 5 | 160 | 0.1 | 6000 | 45 |
| 26 (Inv.) | 5 | 130 | 0.1 | 6000 | 45 |
| 27 (Inv.) | 5 | 120 | 0.1 | 6000 | 6000 |
| 28 (Inv.) | 320 | 110 | 0.25 | 7000 | 5000 |
| 29 (Inv.) | 320 | 110 | 0.25 | 7000 | 5000 |
| 30 (Inv.) | 320 | 110 | 0.25 | 7000 | 5000 |
| 31 (Inv.) | 400 | 195 | 0.2 | 50 | 5000 |
| 32 (Inv.) | 400 | 195 | 0.2 | 50 | 5000 |
| 33 (Inv.) | 400 | 195 | 0.2 | 50 | 5000 |
| 34 (Comp.) | 4 | 100 | 0.2 | 200 | 5000 |
| 35 (Comp.) | 4 | 100 | 0.2 | 200 | 5000 |
| 36 (Comp.) | 4 | 100 | 0.2 | 200 | 5000 |
| 37 (Comp.) | 420 | 110 | 0.2 | 200 | 5000 |
| 38 (Comp.) | 0 | 100 | 0.01 | 5000 | 0 |
| 39 (Inv.) | 4 | 100 | 0.01 | 5000 | 40 |
| *1 | — | — | — | — | — |

*1: R (without coating), Inv.: invention, Comp.: compariso

TABLE 2

| Optical film No. | Back roll diameter (mm) | Coating - contact with back roll (s) | Coating - stretching (time (s)/stretching magnification) | Contact with roll - stretching (s) | Residual solvent at stretching (weight %) | Residual solvent difference between before and after stretching (weight %) |
|---|---|---|---|---|---|---|
| 1 (invention) | 250 | 2.5 | 25 s/1.3 | 22.5 | 60 | 55 |
| 2 (invention) | 250 | 2.5 | 25 s/1.3 | 22.5 | 60 | 55 |
| 3 (invention) | 250 | 2.5 | 25 s/1.5 | 22.5 | 95 | 90 |
| 4 (invention) | 250 | 2.5 | 25 s/1.5 | 22.5 | 95 | 85 |
| 5 (invention) | 250 | 2.5 | 25 s/1.7 | 22.5 | 95 | 80 |
| 6 (invention) | 400 | 2.5 | 25 s/1.7 | 22.5 | 70 | 68 |
| 7 (invention) | 400 | 25 | 50 s/1.2 | 25 | 50 | 48 |
| 8 (invention) | 400 | 25 | 50 s/1.3 | 25 | 55 | 52 |
| 9 (invention) | 400 | 25 | 50 s/1.1 | 25 | 40 | 38 |
| 10 (invention) | 400 | 10 | 18 s/1.1 | 8 | 100 | 99 |
| 11 (invention) | 400 | 12 | 183 s/1.2 | 171 | 100 | 95 |
| 12 (invention) | 400 | 12 | 250 s/1.4 | 238 | 15 | 12 |
| 13 (invention) | 400 | 12 | 205 s/1.4 | 193 | 15 | 13 |
| 14 (invention) | 650 | 12 | 180 s/1.4 | 168 | 20 | 19 |
| 15 (invention) | 650 | 12 | 180 s/2.5 | 168 | 95 | 92 |
| 16 (invention) | 650 | 0.5 | 1.1 s/2.5 | 0.6 | 95 | 93 |
| 17 (invention) | 650 | 0.5 | 0.9 s/2.5 | 0.4 | 95 | 92 |
| 18 (invention) | 110 | 0.5 | 1.1 s/2.6 | 0.6 | 95 | 90 |
| 19 (invention) | 110 | 150 | 155 s/2.5 | 5 | 20 | 15 |
| 20 (invention) | 110 | 150 | 220 s/1.4 | 70 | 22 | 19 |

TABLE 3

| Optical film No. | Back roll diameter (mm) | Coating - contact with back roll (s) | Coating - stretching (time (s)/stretching magnification) | Contact with roll - stretching (s) | Residual solvent at stretching (weight %) | Residual solvent difference between before and after stretching (weight %) |
|---|---|---|---|---|---|---|
| 21 (invention) | 110 | 150 | 280 s/1.4 | 130 | 4 | 2 |
| 22 (invention) | 650 | 0.1 | 315 s/1.2 | 315 | 2 | 0.4 |
| 23 (invention) | 650 | 0.1 | 305 s/1.4 | 305 | 105 | 100 |
| 24 (invention) | 650 | 0.1 | 70 s/1.3 | 70 | 120 | 86 |
| 25 (invention) | 650 | 0.1 | 70 s/1.3 | 70 | 0.5 | 0.4 |

TABLE 3-continued

| Optical film No. | Back roll diameter (mm) | Coating - contact with back roll (s) | Coating - stretching (time (s)/stretching magnification) | Contact with roll - stretching (s) | Residual solvent at stretching (weight %) | Residual solvent difference between before and after stretching (weight %) |
| --- | --- | --- | --- | --- | --- | --- |
| 26 (invention) | 650 | 0.1 | 70 s/1.25 | 70 | 0.4 | 0.3 |
| 27 (invention) | 90 | 200 | 305 s/1.35 | 105 | 65 | 60 |
| 28 (invention) | 95 | 240 | 300 s/1.35 | 60 | 70 | 68 |
| 29 (invention) | 950 | 240 | 310 s/1.3 | 70 | 70 | 68 |
| 30 (invention) | 960 | 242 | 130 s/1.3 | — | 70 | 66 |
| 31 (invention) | 1060 | 0.02 | 243 s/1.0 | 243 | 70 | 25 |
| 32 (invention) | 650 | 68 | 200 s/1.06 | 132 | 70 | 25 |
| 33 (invention) | 650 | 68 | 130 s/1.35 | 62 | 60 | 28 |
| 34 (comparison) | 650 | 129 | 130 s/1.35 | 0.4 | 60 | 55 |
| 35 (comparison) | 650 | 129 | 130 s/1.35 | 0.4 | 60 | 54 |
| 36 (comparison) | 650 | 13 | 13 s/1.35 | 0.3 | 60 | 54 |
| 37 (comparison) | 650 | 24 | 25 s/1.0 | 0.9 | 55 | 53 |
| 38 (comparison) | 45 | 24 | 25 s/1.0 | 0.9 | 0 | 0 |
| 39 (invention) | 500 | 15 | 130 s/1.35 | 12 | 60 | 28 |
| R (without coating) | — | — | — | — | — | — |

TABLE 4

| Optical film No. | Width (m) | Roll length (m) | Film thickness (μm) | Substrate film | R0 (nm) | Rt (nm) |
| --- | --- | --- | --- | --- | --- | --- |
| 1 (invention) | 1.45 | 7400 | 38 | cellulose ester | 45 | 120 |
| 2 (invention) | 1.45 | 7400 | 38 | cellulose ester | 45 | 120 |
| 3 (invention) | 1.45 | 7400 | 38 | cellulose ester | 60 | 120 |
| 4 (invention) | 1.45 | 7400 | 38 | cellulose ester | 60 | 250 |
| 5 (invention) | 1.45 | 7400 | 30 | cellulose ester | 85 | 120 |
| 6 (invention) | 1.45 | 7400 | 30 | cellulose ester | 85 | 140 |
| 7 (invention) | 1.45 | 7400 | 30 | cellulose ester | 20 | 140 |
| 8 (invention) | 1.45 | 7400 | 30 | cellulose ester | 35 | 120 |
| 9 (invention) | 1.45 | 7400 | 30 | cellulose ester | 15 | 35 |
| 10 (invention) | 1.45 | 10000 | 38 | cellulose ester | 15 | −250 |
| 11 (invention) | 2.25 | 10000 | 38 | cellulose ester | 350 | 75 |
| 12 (invention) | 2.25 | 10000 | 38 | cellulose ester | 120 | 120 |
| 13 (invention) | 2.25 | 2200 | 20 | cellulose ester | 60 | 45 |
| 14 (invention) | 2.25 | 2200 | 20 | cellulose ester | 55 | 40 |
| 15 (invention) | 2.25 | 2200 | 20 | cellulose ester | 135 | 40 |
| 16 (invention) | 3.56 | 2200 | 20 | cellulose ester | 135 | 40 |
| 17 (invention) | 3.56 | 2200 | 15 | cellulose ester | 25 | 45 |
| 18 (invention) | 3.56 | 2200 | 15 | cellulose ester | 25 | 90 |
| 19 (invention) | 3.56 | 2200 | 15 | polycarbonate | 135 | 400 |
| 20 (invention) | 3.56 | 2200 | 10 | cellulose ester | 50 | 85 |
| 21 (invention) | 3.56 | 200 | 4 | cellulose ester | 50 | 85 |
| 22 (invention) | 3.56 | 2000 | 5 | cycloolefin polymer | 25 | 15 |
| 23 (invention) | 3.56 | 9500 | 44 | cellulose ester | 85 | 220 |
| 24 (invention) | 3.56 | 3900 | 46 | cellulose ester | 45 | 120 |
| 25 (invention) | 3.56 | 10000 | 30 | cycloolefin polymer | 225 | 120 |
| 26 (invention) | 3.56 | 12000 | 75 | cycloolefin polymer | 200 | 110 |
| 27 (invention) | 3.56 | 10400 | 30 | cellulose ester | 60 | 150 |
| 28 (invention) | 3.56 | 7400 | 30 | cellulose ester | 60 | 150 |
| 29 (invention) | 3.56 | 7400 | 30 | cellulose ester | 60 | 150 |
| 30 (invention) | 3.56 | 7400 | 30 | cellulose ester | 60 | 150 |
| 31 (invention) | 3.56 | 7400 | 30 | cellulose ester | 1 | 75 |
| 32 (invention) | 1.35 | 7400 | 28 | cellulose ester | 2 | 100 |
| 33 (invention) | 1.35 | 7400 | 28 | cellulose ester | 60 | 75 |
| 34 (comparison) | 1.35 | 7400 | 28 | cellulose ester | 60 | 125 |
| 35 (comparison) | 1.35 | 7400 | 28 | cellulose ester | 70 | 135 |
| 36 (comparison) | 1.35 | 7400 | 28 | cellulose ester | 75 | 135 |
| 37 (comparison) | 1.35 | 7400 | 28 | cycloolefin polymer | 0 | 115 |
| 38 (comparison) | 1.35 | 7400 | 28 | cellulose ester | 45 | 120 |
| 39 (invention) | 1.35 | 7400 | 28 | polylactic acid | 200 | 250 |
| R (without coating) | 1.45 | 3900 | 80 | cellulose ester | 3 | 55 |

TABLE 5

| Optical film No. | Roll-set | Yield of polarizing plate (%) | Yield of display device (%) | Front contrast |
|---|---|---|---|---|
| 1 (invention) | A | 99 | 94 | 1480 |
| 2 (invention) | A | 98 | 98 | 1480 |
| 3 (invention) | A | 98 | 98 | 1480 |
| 4 (invention) | A | 98 | 98 | 1480 |
| 5 (invention) | A | 100 | 99 | 1540 |
| 6 (invention) | A | 100 | 100 | 1540 |
| 7 (invention) | A | 100 | 100 | 1600 |
| 8 (invention) | A | 98 | 95 | 1540 |
| 9 (invention) | A | 98 | 95 | 1480 |
| 10 (invention) | A | 90 | 95 | 1350 |
| 11 (invention) | A | 90 | 95 | 1350 |
| 12 (invention) | A | 90 | 95 | 1280 |
| 13 (invention) | A | 89 | 85 | 1250 |
| 14 (invention) | A | 90 | 88 | 1260 |
| 15 (invention) | A | 90 | 93 | 1280 |
| 16 (invention) | A | 90 | 93 | 1300 |
| 17 (invention) | A | 90 | 93 | 1320 |
| 18 (invention) | B | 90 | 93 | 1150 |
| 19 (invention) | A | 90 | 93 | 1250 |
| 20 (invention) | A | 90 | 93 | 1250 |
| 21 (invention) | B | 88 | 93 | 1200 |
| 22 (invention) | A | 88 | 92 | 1400 |
| 23 (invention) | B | 85 | 90 | 1180 |
| 24 (invention) | B | 85 | 96 | 1120 |
| 25 (invention) | A | 88 | 96 | 1300 |
| 26 (invention) | C | 84 | 94 | 1300 |
| 27 (invention) | B | 85 | 89 | 1150 |
| 28 (invention) | A | 88 | 95 | 1200 |
| 29 (invention) | A | 88 | 89 | 1150 |
| 30 (invention) | C | 81 | 89 | 1150 |
| 31 (invention) | B | 88 | 99 | 1130 |
| 32 (invention) | B | 88 | 100 | 1150 |
| 33 (invention) | B | 88 | 100 | 1130 |
| 34 (comparison) | D | 45 | 75 | 1050 |
| 35 (comparison) | D | 45 | 60 | 1050 |
| 36 (comparison) | D | 30 | 77 | 1050 |
| 37 (comparison) | D | 30 | 50 | 1100 |
| 38 (comparison) | D | 25 | 25 | 980 |
| 39 (invention) | B | 85 | 70 | 1350 |
| R (without coating) | B | 70 | 65 | 1100 |

It is clear from the above tables that an optical film of this invention, even in the case of having a large width, is excellent in sliding property and has been improved in anti-blocking and in decreasing defects due to foreign matter. Further, it has been proved that antireflection film and a polarizing plate of this invention have been improved in deceasing defects due to foreign matter as well as a liquid crystal display device exhibiting high display quality can be provided.

What is claimed is:

1. A manufacturing method of an optical film comprising a transparent substrate film and micro-particles, the method comprising the steps of:
    casting a dope of the transparent substrate film to form a web of the transparent substrate film via a solution casting method
    ejecting a micro-particle dispersion containing the micro-particles having an average particle diameter of 25-200 nm as liquid droplets by use of an ink-jet head when a residual solvent content in the web is 5-400 weight %, and depositing the liquid droplets to adhere onto one surface of the web and to form a micro convex structure, and further to form 1-10,000 points of convex parts per 10,000 $\mu m^2$ having a height of 0.01-0.5 µm.

2. The manufacturing method of the optical film described in claim 1,
    wherein an atmospheric solvent concentration around the web at the time of the micro convex structure being formed on the one surface of the web is 50-10,000 ppm.

3. The manufacturing method of the optical film described in claim 1,
    wherein the micro-particle dispersion adheres by use of the ink-jet head onto the one surface of the web in a state of the other surface being attached to a back roll having a diameter of 50-1,000 mm.

4. The manufacturing method of the optical film described in claim 1,
    wherein the web surface is brought in contact with a conveying roll within 0.1-240 seconds after the micro-particle dispersion has deposited onto the web.

5. The manufacturing method of the optical film described claim 1,
    wherein the web is subjected to a stretching treatment of 1.05-2.5 times in the direction perpendicular to the conveying direction of the web within 1-300 seconds after the micro-particle dispersion has deposited onto the web.

6. The manufacturing method of the optical film described in claim 4,
    wherein the web is subjected to a stretching treatment of 1.05-2.5 times in the direction perpendicular to the conveying direction of the web within 0.5-240 seconds after the web surface on which the micro-particle dispersion has deposited has been brought in contact with the conveying roll.

7. The manufacturing method of the optical film described in claim 5,
    wherein a residual solvent content at the time of the stretching treatment is 0.5-100 weight % and a residual solvent content difference between before and after the stretching treatment is 0.4-99 weight %.

8. The manufacturing method of the optical film described in claim 1,
    wherein a width of the transparent substrate film is 1.4-5 m.

9. The manufacturing method of the optical film described in claim 1,
    wherein a roll length of the transparent substrate film is 2,000-10,000 m and a film thickness is 5-55 µm.

10. The manufacturing method of the optical film described in claim 1,
    wherein the transparent substrate film contains at least one type of a polymer compound selected from cellulose ester, cycloolefin type polymer, polycarbonate and polylactic acid.

* * * * *